US012766790B2

(12) United States Patent
Zhang et al.

(10) Patent No.: US 12,766,790 B2
(45) **Date of Patent: *Oct. 20, 2026**

(54) HYDRAULIC 3D-PRINTING SYSTEM AND METHOD

(71) Applicant: SprintRay, Inc., Los Angeles (CA)

(72) Inventors: Jing Zhang, Los Angeles, CA (US); Dongjian Wang, Zhejiang (CN); Zhongyu Gao, Zhejiang (CN); Biqing Lu, Guangdong (CN); Yubing Ding, Zhejiang (CN); Pengzhen Ma, Zhejiang (CN); Huijian Tian, Los Angeles, CA (US); Shukun Ye, Los Angeles, CA (US); Weiyao Meng, Zhejiang (CN)

(73) Assignee: SprintRay, Inc., Los Angeles, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 18/543,791

(22) Filed: Dec. 18, 2023

(65) Prior Publication Data

US 2024/0198588 A1 Jun. 20, 2024

Related U.S. Application Data

(63) Continuation-in-part of application No. 18/198,257, filed on May 16, 2023, now Pat. No. 12,128,624.

(Continued)

(51) Int. Cl.
*B29C 64/255* (2017.01)
*B29C 64/25* (2017.01)

(Continued)

(52) U.S. Cl.
CPC ............ *B29C 64/25* (2017.08); *B29C 64/255* (2017.08); *B29C 64/264* (2017.08); *B29C 64/295* (2017.08); *B33Y 30/00* (2014.12)

(58) Field of Classification Search
CPC ... B29C 64/321; B29C 64/329; B29C 64/336; B29C 64/124; B29C 64/129;

(Continued)

(56) References Cited

U.S. PATENT DOCUMENTS 7,195,472 B2 3/2007 John
9,360,757 B2 6/2016 DeSimone et al.

(Continued)

FOREIGN PATENT DOCUMENTS

CN 111844730 B 10/2020

*Primary Examiner* — Jamel M Nelson
(74) *Attorney, Agent, or Firm* — Jafari Law Group, Inc.

(57) ABSTRACT

The invention is a system and method for printing 3D objects that employs a hydraulic device. The device may comprise a cartridge or container assembly, which may be single-use or disposable. The container assembly may unitarily house a structure such as a piston, a platform, multiple chambers, and a channel, wherein the channel and chambers are fluidly connected and configured to hold enough of a 3D printing material suitable for printing a single 3D object. In exemplary embodiments, moving the piston transfers 3D printing material from one chamber to another chamber in which the platform is situated; radiation from a light engine coupled to the chamber that includes the platform exposes the 3D printing material to a curing light on a surface of the platform or onto a cured layer of the printing material on the platform, in order to build the 3D object on the platform.

20 Claims, 48 Drawing Sheets

Related U.S. Application Data

(60) Provisional application No. 63/433,185, filed on Dec. 16, 2022.

(51) Int. Cl.
*B29C 64/264* (2017.01)
*B29C 64/295* (2017.01)
*B33Y 30/00* (2015.01)

(58) Field of Classification Search
CPC ... B29C 64/135; B29C 64/245; B29C 64/255; B33Y 10/00; B33Y 30/00; B33Y 50/02
See application file for complete search history.

(56) References Cited

U.S. PATENT DOCUMENTS

| | | | | |
|---|---|---|---|---|
| 10,766,243 | B2 | 9/2020 | Costabeber | |
| 11,458,672 | B2 | 10/2022 | John | |
| 2016/0151974 | A1* | 6/2016 | Costabeber | B29C 64/124 264/401 |
| 2017/0334129 | A1* | 11/2017 | Ebert | B29C 64/20 |
| 2018/0281280 | A1* | 10/2018 | Solorzano | C12N 5/0062 |
| 2020/0398490 | A1 | 12/2020 | Schmid et al. | |
| 2021/0122104 | A1* | 4/2021 | Holt | B29C 64/291 |
| 2021/0146616 | A1 | 5/2021 | Mansouri et al. | |
| 2021/0247325 | A1* | 8/2021 | Ong | B33Y 99/00 |
| 2021/0291453 | A1 | 9/2021 | Kong et al. | |
| 2022/0032539 | A1* | 2/2022 | Stadlmann | B33Y 40/00 |
| 2022/0161500 | A1* | 5/2022 | Stahl | B33Y 40/20 |
| 2022/0305560 | A1* | 9/2022 | Porch | B22F 12/38 |

* cited by examiner

1000

FIG. 13-3
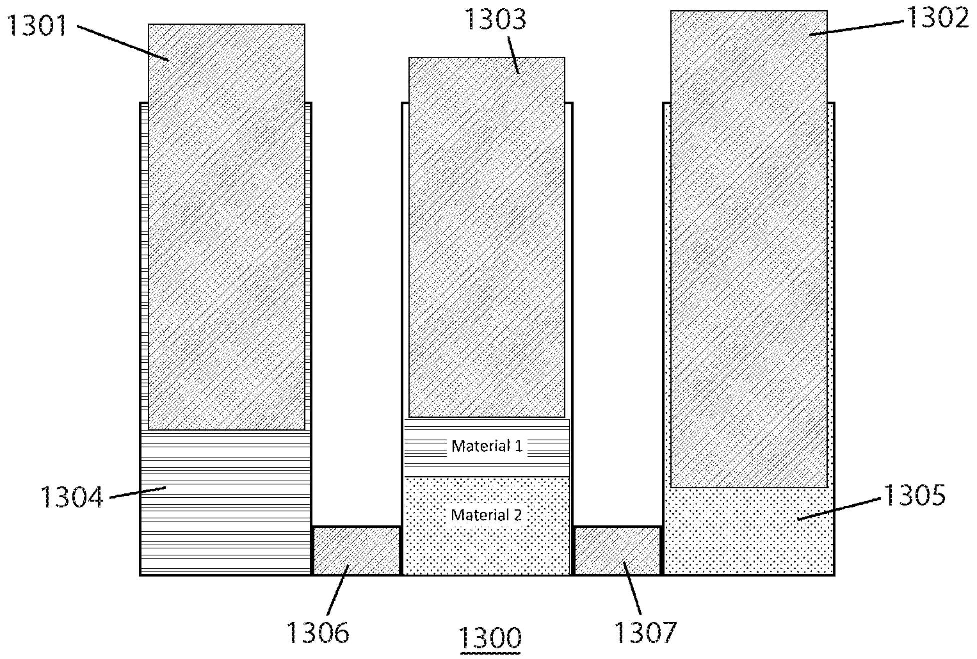
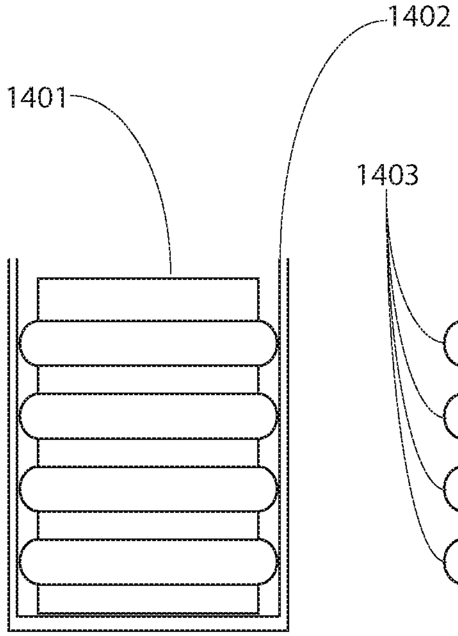
FIG. 14
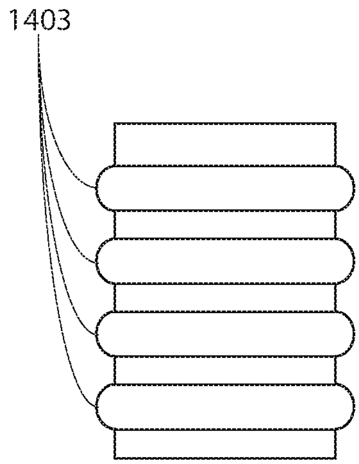
FIG. 15
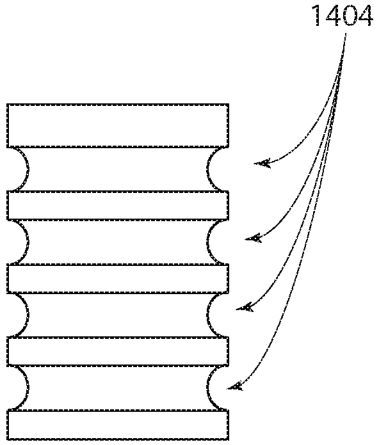
FIG. 16

FIG. 17
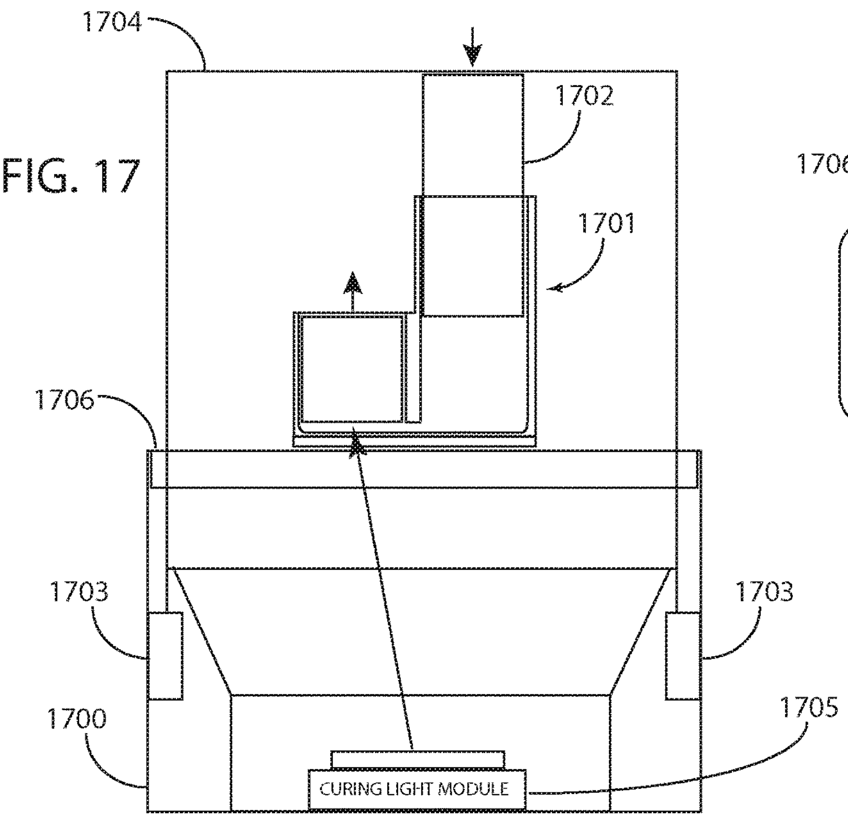
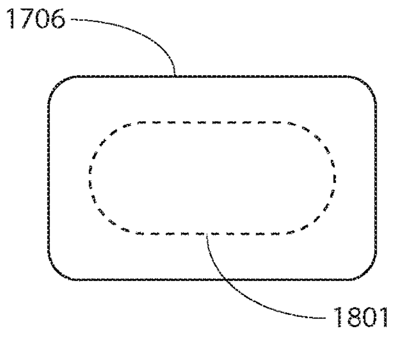
FIG. 18
FIG. 19
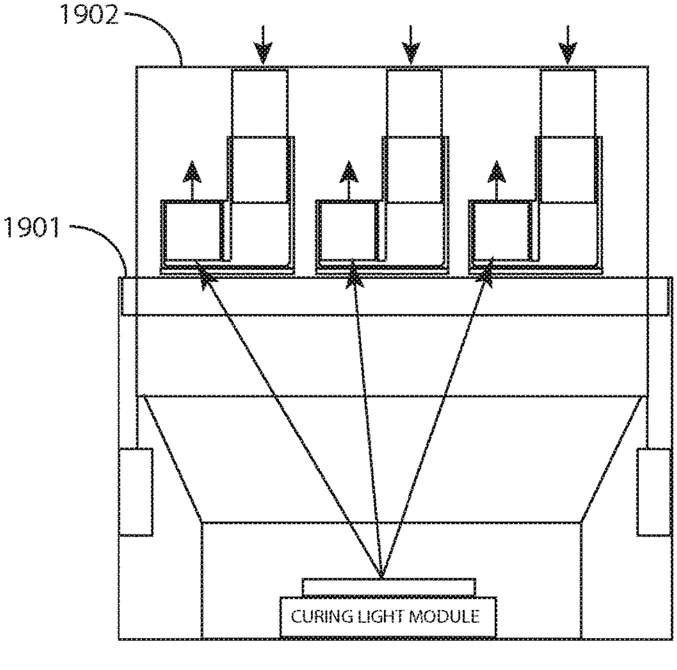

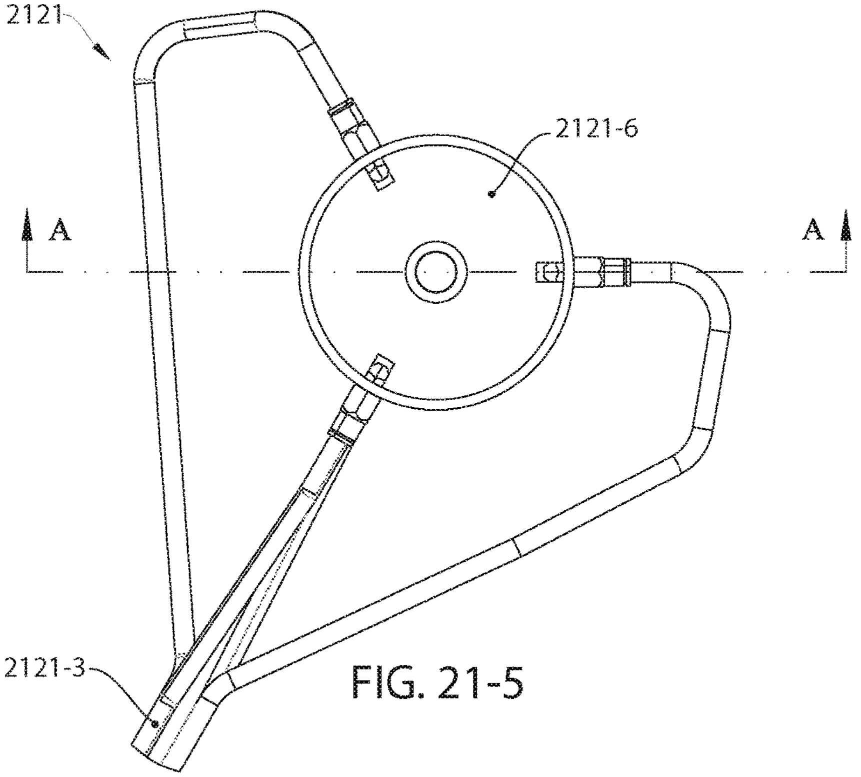
FIG. 21-5
FIG. 21-6
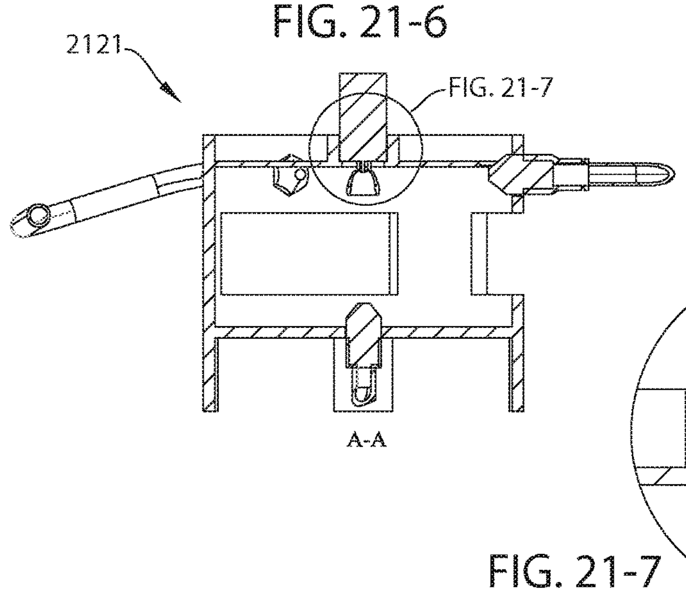
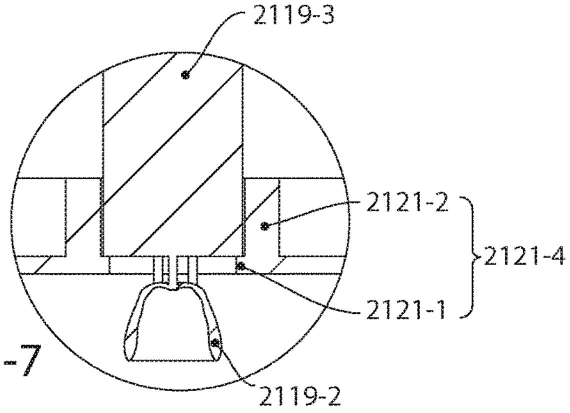
FIG. 21-7

FIG. 21-8
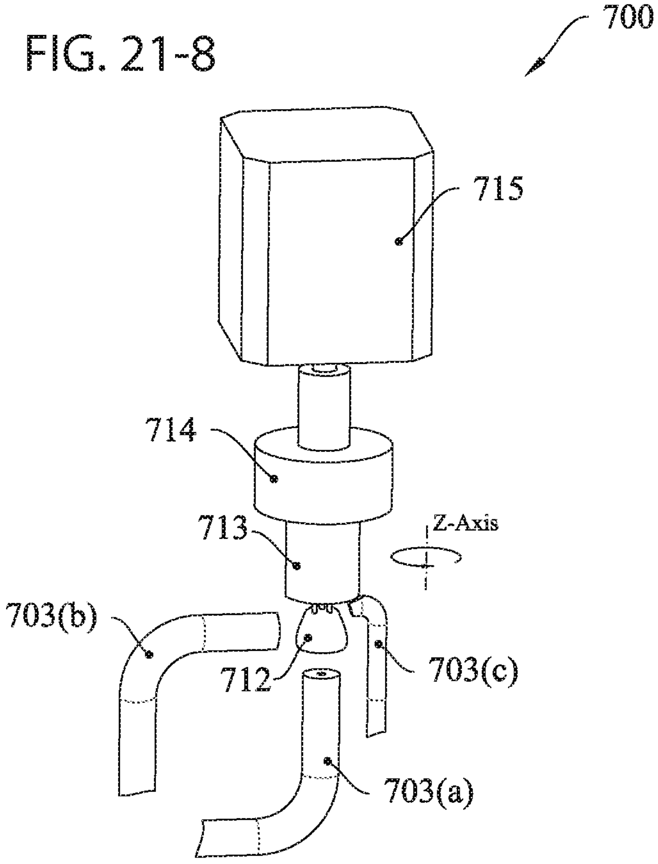
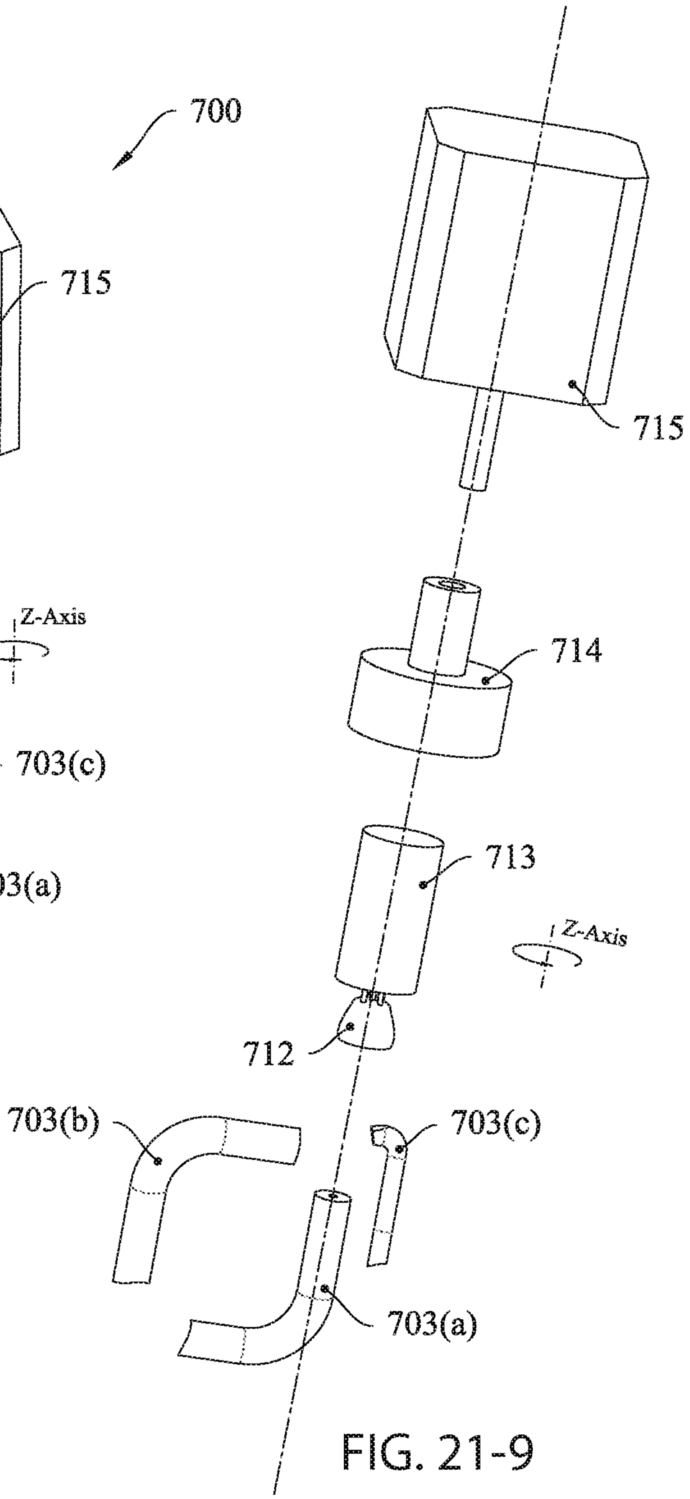
FIG. 21-9

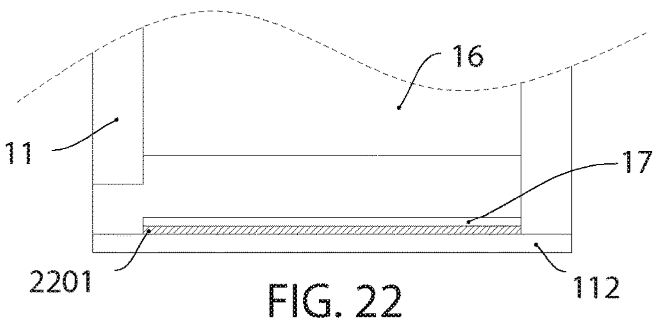
FIG. 22
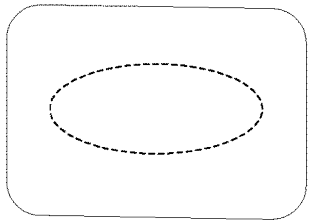
FIG. 23-2
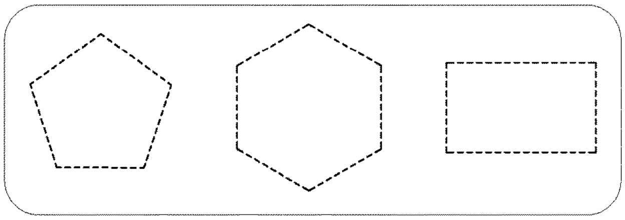
FIG. 23-1
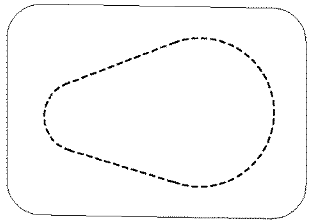
FIG. 23-3
FIG. 23-4
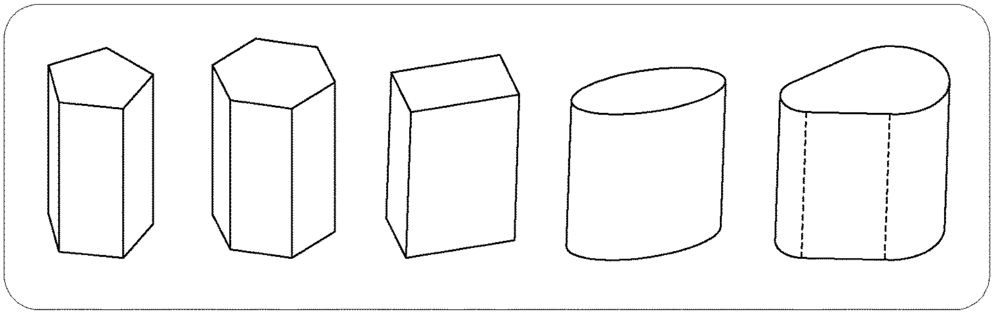
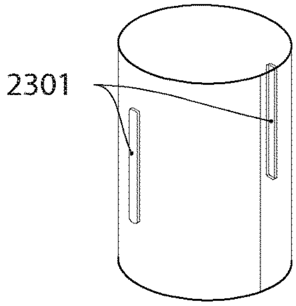
FIG. 23-5

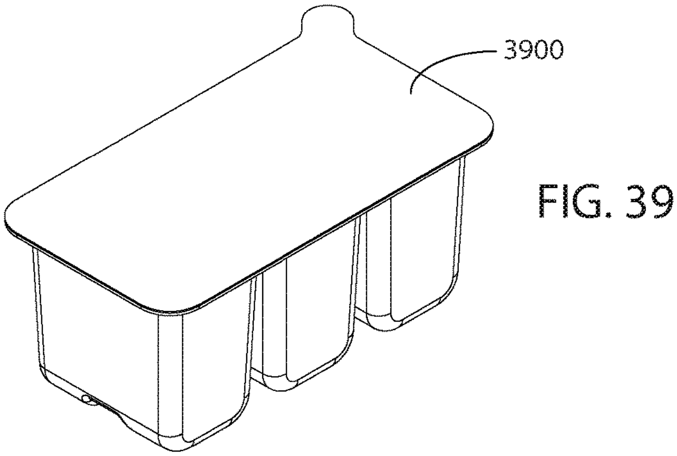
FIG. 39
FIG. 40
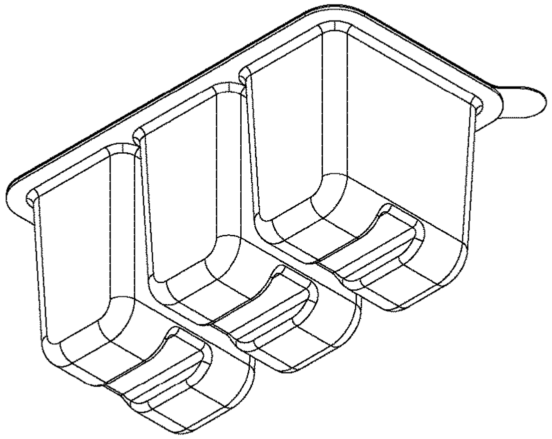
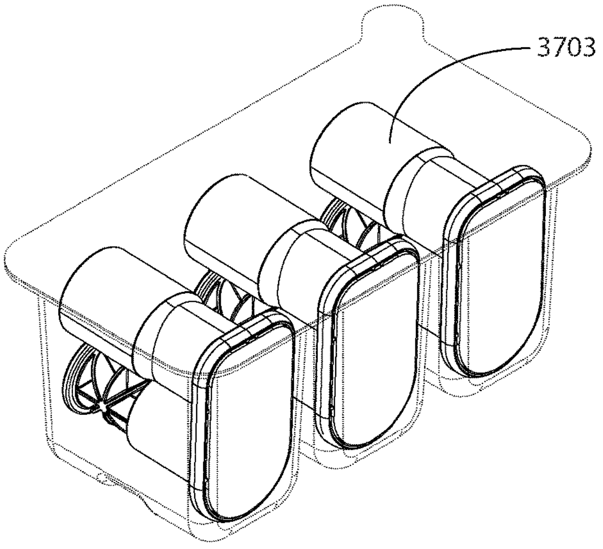
FIG. 41

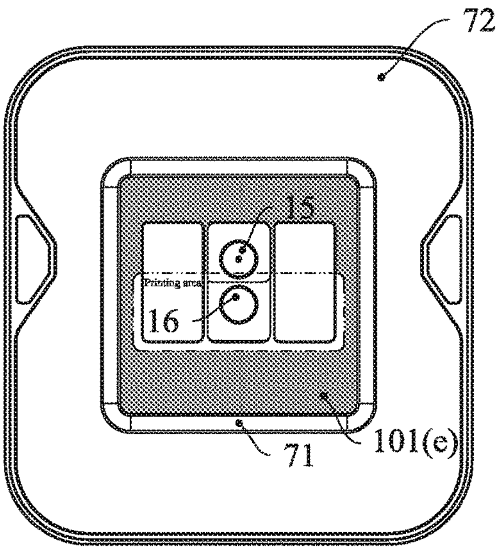
FIG. 55
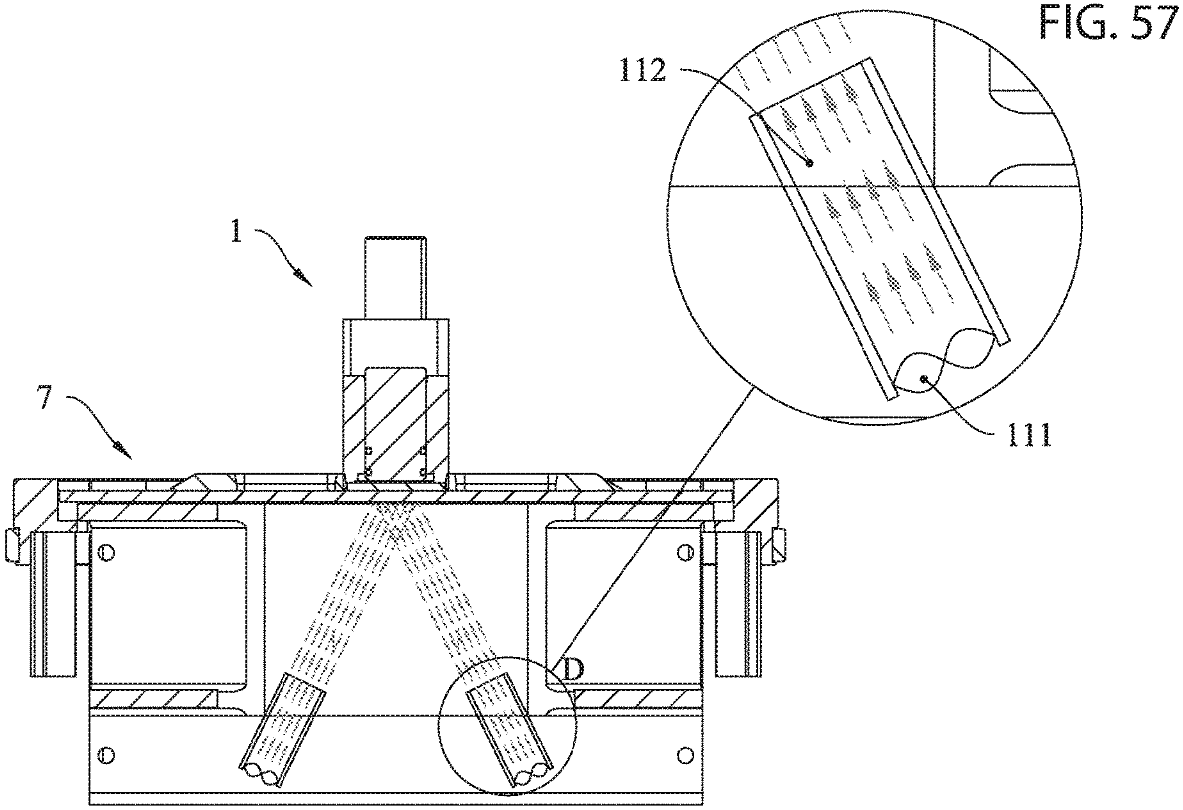
FIG. 57
FIG. 56

FIG. 58
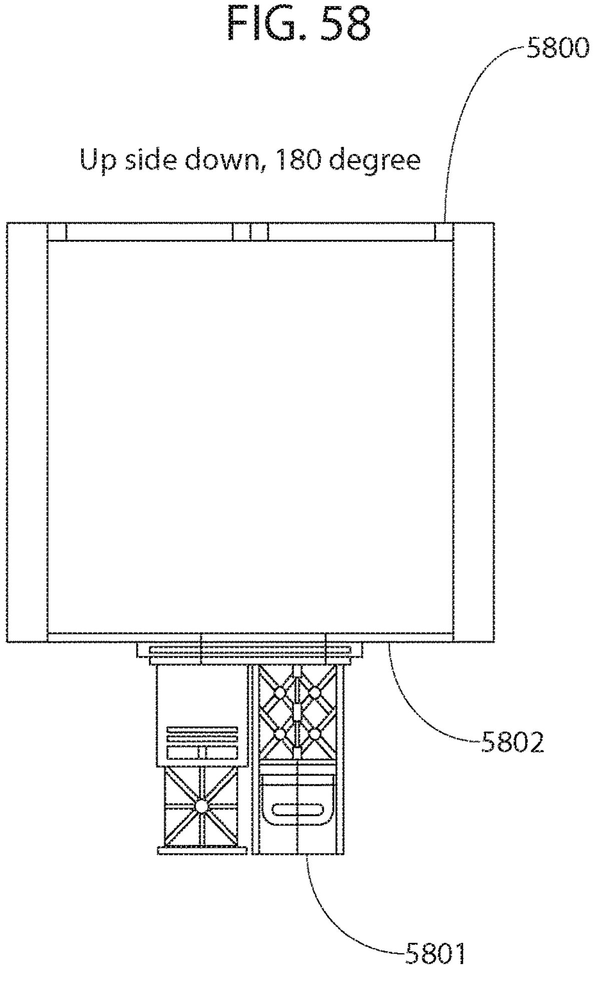
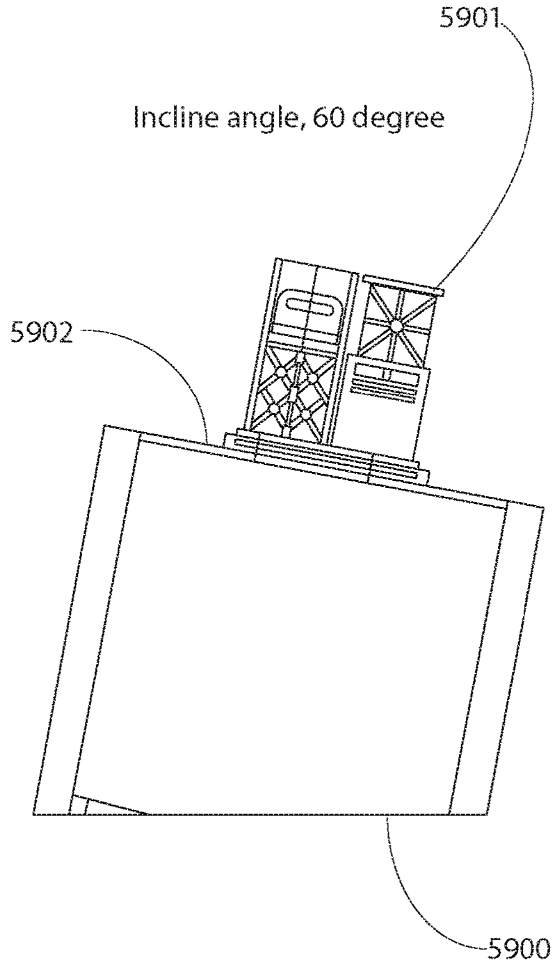
FIG. 59

HYDRAULIC 3D-PRINTING SYSTEM AND METHOD

PRIORITY AND RELATED APPLICATIONS

This application is a continuation-in-part of U.S. Non-Provisional application Ser. No. 18/198,257, filed May 16, 2023, which claims priority to U.S. Provisional Application No. 63/433,185, filed on Dec. 16, 2022, the disclosure of each incorporated by reference in their entirety.

TECHNICAL FIELD OF THE INVENTION

The present invention relates generally to additive manufacturing methods using three-dimensional (3D) printers. More specifically, the invention involves a system and method for printing 3D objects that employs hydraulic principles to efficiently build 3D-printed objects.

BACKGROUND OF THE INVENTION

Traditionally, the size of a printing material tank is designed as large as possible, so that the 3D printer may print a variety size of objects or print as many objects as possible during a single printing job. However, for some users (e.g., dentists or dental professionals), large tanks are not desirable, particularly when only a single object, typically a small object, is the subject of the print job. For example, for a dental professional, a large tank may not be desirable for printing a 3D-printed crown. There are multiple reasons for desiring a smaller tank when the printing job involves a small object, including but not limited to: the desire to maximize use of resources such as resin or printing material that may go wasted; avoiding time wasted by cleaning of the large tank between uses; having to change resin types between jobs that may be typically custom jobs; avoiding human error that naturally results from having to change and manually maintain large resin tanks; the shorten lifespan of resin that is poured into the tank but not immediately used, etc. Thus, there is clearly a need for a system and method that obviates the problems or obstacles that arise when desiring to print small, particularly customized, 3D printed objects.

By way of an example and for illustration purposes, SprintRay currently has printing devices that typically include a large size resin tank and a build platform. Before printing, a user needs to add a certain volume of resin into the resin tank. During the printing process, resin is cured on the bottom of build platform by radiation, and thus a 3D object is formed. See for example, FIG. 1 illustrating SprintRay's ProS resin tank, embodiments of which are described in U.S. Patent Application Publication No. 20210146616A1.

However, if the user wants to print a small object, for example a 3D object such as a dental crown, due to the limitations of the size of the resin tank, the user will nonetheless be required to add an unnecessary volume of resin into the tank; in fact, with a small object such as a dental crown, most of the resin in the tank will not be used, will not be cured into a layer or part of the intended object, and thus will be wasted. At the same time, the remaining resin or printing material that was typically poured into the tank, will be degraded by virtue of its exposure to air; that is any remaining printing material that was not used will have lost freshness, which will necessarily affect the freshness of the printing material for subsequent use, and possibly the quality of objects printed during subsequent jobs. This is in art because generally resin is used to fill in the bottom of the resin tank, and continuously replenish between the build platform and the resin tank after each layer of the target 3D object is printed.

By way of further example, in certain traditional printing devices that utilize a printing material or resin tank, the tanks are generally required to be filled with about 1000 ml of resin in order to print a dental crown. Yet, during the printing process, only about ~1 ml to ~2 ml of resin may actually be used or rather cured to build the dental crown. Accordingly, as little as less than 1% of the resin in a traditional tank may be used when printing small objects.

Although the remaining resin may be recycled, the recycling process affects its freshness and adequacy for future use. Not only is this very inconvenient, but when resin is continuously exposed to air, water molecules from air may in a way contaminate the resin, resulting in a decrease in quality, that of course translates to a decrease in the performance of the cured 3D object. Moreover, it's worth noting that due to resin being exposed to air even during the printing process, humidity and dust in the air may also influence the accuracy of cured 3D objects. For the same reason, particularly when printing a small 3D object, a large size resin tank and a large size build platform will lead to more resin waste, less effective 3D printed parts, with limited performance and durability.

Another common problem, including particularly in the field of dentistry, concerns the materials typically required for certain printing jobs. For example, an artificial crown may generally require higher performance than other components or parts, thus the printing material of forming the artificial crown usually requires high-viscosity resin, so as to ensure the bending strength, flexural modulus, rigidity, service life, etc. However, high-viscosity resin may not be suitable for existing 3D printers (e.g., bottom-up printers). Traditionally, in bottom-up printers, while curing each layer of the object, a build platform descends to a certain position, which make the thickness of resin between the bottom of resin tank and the lower surface of build platform is equal to a layer of object. Nevertheless, there would be tremendous fluid force between the resin and the build platform due to the high-viscosity of the resin and the large-size limitation of the build platform; that is, the fluid force may greatly limit the downward movement of build platform, so that the build platform may not descend to the required position in the predetermined time period, especially while printing the initial layer. Accordingly, because the build platform cannot descend to the predetermined position, the thickness of resin between the bottom of resin tank and the lower surface of build platform will be thicker than the predetermined layer of object, thus the layer of resin will not cure adequately, especially the portion of the layer adjacent to the build platform. Further, the layer that is not adequately cured will prevent an initial layer of the resin from adhering to the lower surface of the build platform; in this way, the print will fail. To address these issues with high-viscosity resin required for some builds, there are specialized tanks adapted for a highly viscous printing material. For example, a tank such as described in SprintRay's U.S. patent Ser. No. 11/155,028, and U.S. Patent Application Publication US20220024117A1.

Again, the problem arises when wanting to switch between small jobs that may require one type of printing material, to another job that requires another type of printing material. The practitioner (in the dental setting), or the user desiring to print several jobs may find themselves cleaning out resin tanks between jobs, changing resin tanks, adding or switching printing materials between jobs, or switching printing machines altogether.

Accordingly, there is a need that has not been adequately addressed by the prior art, and it is to these ends that the present invention has been developed.

SUMMARY OF THE INVENTION

The invention is generally a 3D printing system and method that employs a hydraulic device configured to facilitate efficiently building 3D-printed objects.

Various aspects of the present invention involve methods, systems, and devices for printing or forming 3D objects using principals in fluid mechanics, for example hydraulics, to optimize the efficiency and quality of the products built using these methods, systems, and devices.

One aspect of the present invention involves a method for printing a 3D-object. In exemplary embodiments, the method may include the steps of: (a) actuating a piston inside a first chamber, the piston adapted to actuate movement of a platform inside a second chamber in fluid communication with the first chamber; (b) transferring at least a portion of a printing material stored at least partially in the first chamber to the second chamber, the second chamber including a printing area between a surface of a window and the platform; (c) emitting a curing light through the window to cure a layer of the printing material to the platform or to a previously cured layer of the printing material already cured onto the platform; and (d) repeating steps (a)-(c) until a three-dimensional object is formed.

In some exemplary embodiments, actuating the piston inside the first chamber hydraulically actuates the platform. In some exemplary embodiments, actuating the piston inside the first chamber hydraulically actuates a piston in the second chamber, the piston in the second chamber forming at least a portion of the platform.

In some exemplary embodiments, step (a) may include (a-1) moving the piston in a single direction along an axis of the first chamber. In some exemplary embodiments, step (a-1) may include (a-2) continuously moving the piston until the three-dimensional object is formed. In some exemplary embodiments, step (a-1) may include (a-3) pausing movement of the piston at programmable intervals until the three-dimensional object is formed.

In some exemplary embodiments, step (b) may include (b-1) disposing the layer of the printing material on a glass surface of the window. In some exemplary embodiments, step (b) may include (b-2) disposing the layer of the printing material on a film or a coating layer that at least partially forms the window. In some exemplary embodiments, the film may be a flexible oxygen permeation film. In some exemplary embodiments, the film or coating layer may either be a polydimethylsiloxane (PDMS) film, a polymethyl pentene (PMP) film, a Transparent Polymer X (TPX) film, or a fluorinated ethylene propylene (FEP) film.

In some exemplary embodiments, step (d) may include (d-1) substantially consuming the printing material stored in the first chamber. In some exemplary embodiments, the method may further include (e) releasing the platform from the second chamber to allow access to the three-dimensional object formed on the platform. In some exemplary embodiments, the method may further include (f) prior to actuating the piston, breaking or removing a seal of a container assembly that houses the first and second chambers.

Another aspect of the present invention involves a system for forming or printing three-dimensional objects. In exemplary embodiments, the system may include: a cartridge or container assembly for holding one or more printing materials to print a three-dimensional object, the container assembly including: a first chamber adapted to store a first printing material; a platform movable inside a second chamber, the second chamber in fluid communication with the first chamber; and a first piston movable inside the first chamber and configured to hydraulically actuate movement of the platform inside the second chamber by transferring at least a portion of the first printing material in the first chamber to a printing area between a surface of a window and the platform in the second chamber. An actuator may be coupled to a controller and configured to move the first piston; and a curing light emitting module, in communication with the controller, may be configured to emit a curing light through the window to cure at least a portion of the layer of the printing material to the platform or to a previously cured layer of the printing material until the three-dimensional object is formed.

In some exemplary embodiments, movement of the piston hydraulically actuates movement of the platform. In some exemplary embodiments, movement of the piston inside the first chamber hydraulically actuates a piston in the second chamber, the piston in the second chamber forming at least a portion of the platform. In some exemplary embodiments, the piston is adapted to move in a single direction along an axis of the first chamber until the three-dimensional object is formed. In some exemplary embodiments, the piston is further adapted to continuously move along the axis of the first chamber until the three-dimensional object is formed. In some exemplary embodiments, the piston is further adapted to pause movement at programmable intervals until the three-dimensional object is formed.

In some exemplary embodiments, the system further includes a film or coating layer disposed over an interior surface of the window. In some exemplary embodiments, the film or coating layer disposed over the interior surface of the window may be one of a polydimethylsiloxane (PDMS) film, a polymethylpentene (PMP) film, a Transparent Polymer X (TPX) film, or a fluorinated ethylene propylene (FEP) film. In some exemplary embodiments, the window comprises a flexible oxygen permeation film.

In some exemplary embodiments, the container assembly houses the first and second chambers. In some exemplary embodiments, the system further includes a removable seal that keeps the first and second chambers airtight. In some exemplary embodiments, the system further includes a removable cover to prevent light from passing through the window of the container assembly.

In some exemplary embodiments a system for printing 3D objects in accordance with the present invention, may include: a controller; a container assembly adapted to hermetically store a printing material, including: an enclosure housing a first chamber adapted to store a printing material and a second chamber adapted to receive a platform; a channel within the enclosure connecting a side wall of the first chamber with a side wall of the second chamber so that the first chamber and the second chamber are in fluid communication; and a structure, movable within the first chamber adapted to transfer a portion of the printing material from the first chamber to a printing area between a surface of a window and the platform in the second chamber; a motor coupled to the controller and configured to move the structure; and a light emitting module, in communication with the controller, configured to emit a curing light through the window to cure at least a layer of the printing material to the platform or to a cured layer of the printing material on the platform, in order to build the 3D object on the platform.

In some exemplary embodiments, an arm may be coupled to the motor and adapted to press on the structure of the container assembly. A housing for the controller, the motor, and the light emitting module, may include, disposed on an exterior surface of the housing, a holding frame adapted to receive the container assembly. The housing may include one or more user interface devices, including but not limited to a touch screen interface disposed on an exterior of the housing.

In exemplary embodiments, the system may further include a heating module adapted to heat the printing material inside the container assembly. The heating module may include a transparent surface heater disposed over portion of the holding frame. The heating module may include a layer of an Indium Tin Oxide (ITO) coating. The heating module may include an adapter removably coupled to the holding frame, the adapter having heating elements disposed on walls of the adapter. The heating module may include a heating element disposed over the arm and adapted to transfer heat to the container assembly.

Yet another aspect of the present invention involves devices, for example a cartridge or container assembly, which holds a printing material used to print a three-dimensional object wherein the container assembly includes a platform adapted to facilitate the building of the 3D object onto the platform inside the container assembly. In some exemplary embodiments, the container assembly may include: a first chamber adapted to store a first printing material; a platform movable inside a second chamber, the second chamber in fluid communication with the first chamber; and a first piston movable inside the first chamber and configured to hydraulically actuate movement of the platform inside the second chamber by transferring at least a portion of the first printing material in the first chamber to the second chamber. The second chamber may include a printing area between a surface of a window and the platform, wherein the window is adapted to receive a curing light for curing a layer of the first printing material onto the platform in order to build a three-dimensional object on the platform.

In some exemplary embodiments, the piston is a first piston, and the platform comprises a surface of a second piston adapted to move inside the second chamber.

In some exemplary embodiments, the container assembly further includes a base including an opening exposing the window. In some exemplary embodiments, the container assembly further includes a film or coating layer disposed over an interior surface of the window. In some exemplary embodiments, the film or coating layer disposed over the interior surface of the window comprises one of: a polydimethylsiloxane (PDMS) film; a polymethylpentene (PMP) film; a Transparent Polymer X (TPX) film; or a fluorinated ethylene propylene (FEP) film. In some exemplary embodiments, the window of the container assembly comprises a flexible oxygen permeation film. In some exemplary embodiments, the flexible oxygen permeation film is adapted to rest against a glass surface of a 3D-printing device configured to support the base of the container assembly.

In some exemplary embodiments, the container assembly may further include a removable seal that keeps the first and second chambers airtight until the seal is removed. In some exemplary embodiments, the container assembly may further include a removable cover to prevent light from passing through the window.

In some exemplary embodiments, the container assembly further includes a third chamber in fluid communication with the second chamber; and a second piston movable inside the third chamber and adapted to hydraulically actuate movement of the platform inside the second chamber by transferring at least a portion of a second printing material stored in the third chamber to the printing area inside the second chamber.

Yet another aspect of the present invention involves a 3D printer or apparatus that employs a hydraulic means for printing three-dimensional objects. The apparatus may include: an actuator adapted to actuate movement of a piston movable inside a container assembly, the container assembly adapted to hold one or more printing materials and to print a three-dimensional object; a base adapted to receive the container assembly; a controller coupled to the actuator; and a curing light emitting module, in communication with the controller, wherein the controller is configured to: (a) actuate movement of the piston inside a first chamber of the container assembly, the piston adapted to hydraulically actuate movement of a platform inside a second chamber in fluid communication with the first chamber; (b) transfer at least a portion of a printing material stored at least partially in the first chamber to the second chamber, the second chamber including a printing area between a surface of a window and the platform; (c) emit a curing light through the window to cure a layer of the printing material to the platform or to a previously cured layer of the printing material already cured onto the platform; and (d) repeat steps (a)-(c) until a three-dimensional object is formed.

In some exemplary embodiments, the container assembly includes a spring that may be released by the controller, for example by actuating the actuator adapted to release the spring; the spring may be adapted to actuate movement of the piston.

In some exemplary embodiments, the actuator is configured to push directly or indirectly on the piston to move the piston inside the chamber of the container assembly. In some exemplary embodiments, the piston hydraulically actuates movement of the platform.

In some exemplary embodiments, the actuator is configured to pull directly or indirectly on the platform. In some exemplary embodiments, movement of the platform hydraulically actuates movement of the piston.

In some exemplary embodiments, releasing the spring actuates movement of the piston, and the controller actuates an actuator configured to pull directly or indirectly on the platform.

Various objects and advantages of the present invention will become apparent from the following description taken in conjunction with the accompanying drawings, wherein are set forth, by way of illustration and example, certain embodiments of the invention. The drawings submitted herewith constitute a part of this specification, include exemplary embodiments of the present invention, and illustrate various objects and features thereof.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification. None of the drawings are to scale unless specifically stated otherwise.

FIG. 2-1 illustrates a block diagram of a system in accordance with the present invention.

FIG. 2-2 illustrates a block diagram of a device adapted to hold printing material and print a three-dimensional object in accordance with the present invention.

FIG. 2-3 illustrates a block diagram of a system for printing a three-dimensional object in accordance with the present invention.

FIG. 3-1 and FIG. 3-2 illustrate a device and method in accordance with exemplary embodiments of the present invention.

FIG. 12-1-FIG. 12-4 illustrate a method of printing a 3D-printed object performed by a system in accordance with exemplary embodiments of the present invention.

FIG. 13-1 illustrates a method for printing three-dimensional objects in accordance with exemplary embodiments of the present invention.

FIG. 13-2 illustrates a system for printing three-dimensional objects using multiple materials, in accordance with exemplary embodiments of the present invention.

FIG. 13-3 illustrates a system for printing three-dimensional objects using multiple materials, in accordance with exemplary embodiments of the present invention.

FIG. 14-FIG. 16 illustrate several views of a device in accordance with exemplary embodiments of the present invention.

FIG. 17 illustrates a system for printing three-dimensional objects in accordance with exemplary embodiments of the present invention.

FIG. 18 illustrates a container assembly support configured to support or receive a container assembly or cartridge for the system shown in FIG. 17, in accordance with exemplary embodiments of the present invention.

FIG. 19 illustrates a system for printing three-dimensional objects in accordance with exemplary embodiments of the present invention.

FIG. 21-1 is a flow chart illustrating an exemplary method of washing a 3D printed object built with a system for printing three-dimensional objects in accordance with exemplary embodiments of the present invention.

FIG. 21-2 through FIG. 21-10 illustrates exemplary wash systems in accordance with exemplary embodiments of the present invention.

FIG. 22 illustrates an exemplary embodiment of a container assembly, specifically the body of the container assembly, that improves build or printing speed and streamlines the container assembly.

FIG. 23-1 through FIG. 23-4 illustrate exemplary embodiments of pistons, and more specifically different shapes of pistons that may be employed in accordance with the present invention.

FIG. 23-5 illustrates exemplary guiding structures that may be employed in accordance with the present invention.

FIG. 24-1 through FIG. 24-3 illustrate a container assembly body configuration in accordance with some exemplary embodiments of the present invention.

FIG. 24-4 through FIG. 24-5 illustrate cross-sectional views of the container assembly body configuration in accordance with the embodiment shown in FIG. 24-1.

FIG. 24-6 through FIG. 24-9 illustrate a container assembly body configuration in accordance with some exemplary embodiments of the present invention.

FIG. 36-1 and FIG. 36-2 illustrate a side view and a cross-sectional view of a container assembly in accordance with some exemplary embodiments of the present invention.

FIG. 39 through FIG. 41 depict a packaging for container assemblies in accordance with some exemplary embodiments of the present invention.

FIG. 44 through FIG. 57 illustrate different possible arrangements of heating elements on a system in accordance with exemplary embodiments of the present invention.

FIG. 58 through FIG. 59 illustrate different possible positions or orientations for a container assembly in accordance with the present invention.

DETAILED DESCRIPTION OF THE INVENTION

Figure 1:
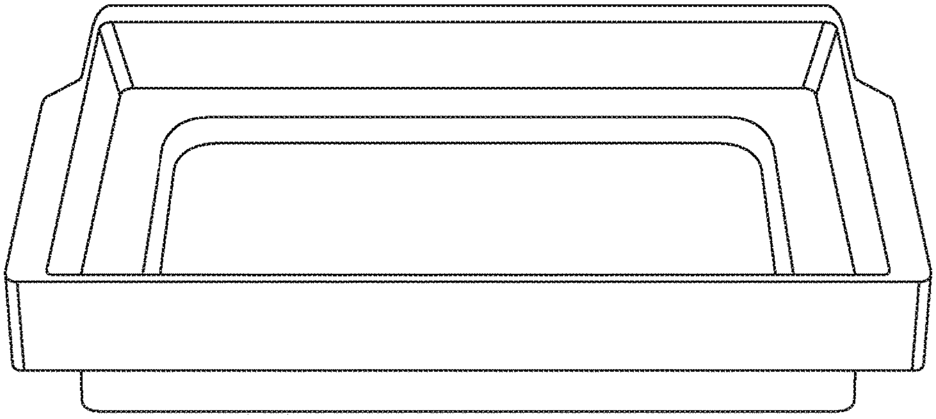
FIG. 1 (PRIOR ART)
FIG. 1 illustrates prior art resin tank.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

For purposes of this disclosure, the terms "upper", "lower", "right", "left", "rear", "front", "vertical", "horizontal" and derivatives thereof shall relate to the invention as oriented in the figures. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics related to the embodiments disclosed herein are not to be considered as limiting, unless the claims expressly state otherwise.

As used in this disclosure, the term "comprise" and variations of the term, such as "comprising" and "comprises," are not intended to exclude other additives, components, ingredients or steps.

Figures 1, 2:
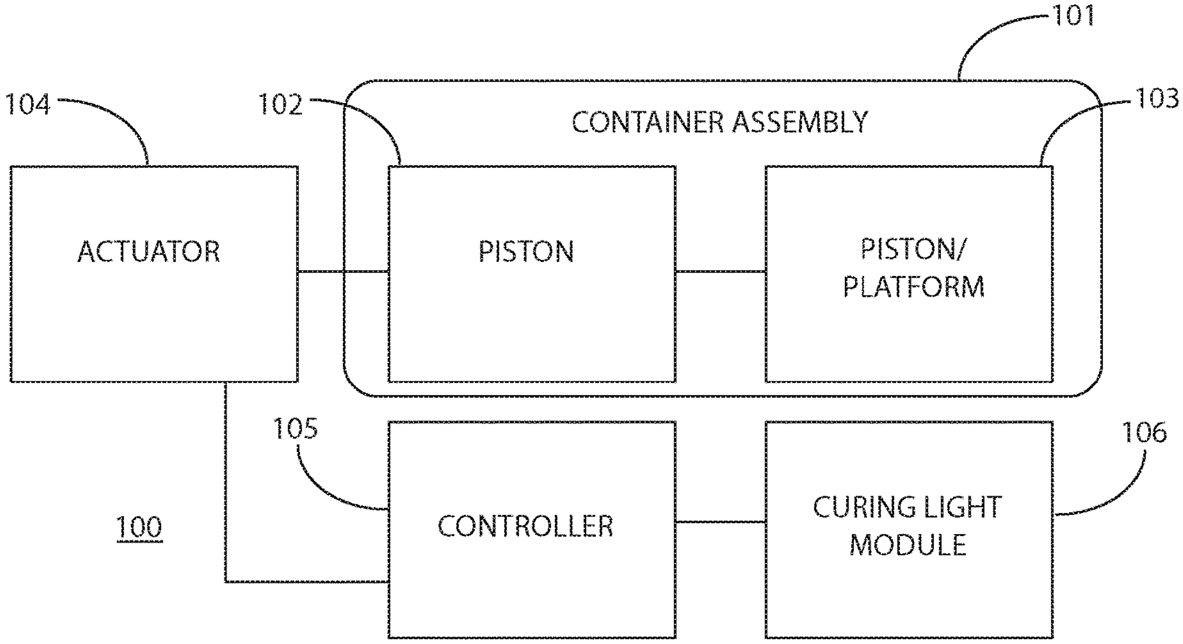
Figure 2:
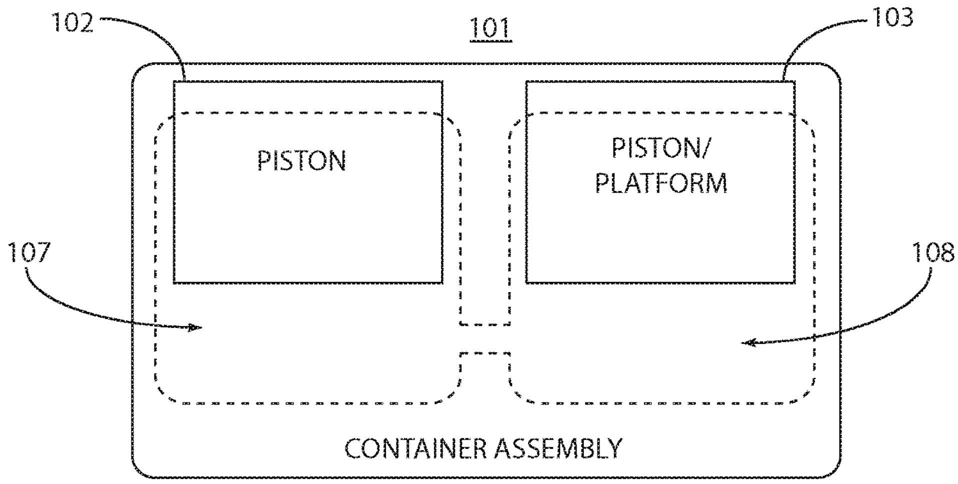

Turning now to the figures depicting embodiments of the invention, FIG. 2-1 illustrates a block diagram of a system in accordance with the present invention. More specifically, FIG. 2-1 depicts system 100, which exemplarily includes a container assembly 101 for holding a printing material to print a three-dimensional object; a piston 102 movable inside a first chamber of the container assembly 101, configured to: actuate movement of a platform 103 inside a second chamber in fluid communication with the first chamber, and transfer at least a portion, for example a layer, of the printing material stored in the first chamber to the second chamber, wherein the second chamber includes a printing area between a surface of a window and the platform 102 inside the second chamber; an actuator 104 coupled to a controller 105 and configured to move the piston; and a curing light module 106, in communication with the controller 105, configured to emit a curing light through the window to cure at least a portion of the layer of the printing material to the platform or to a previously cured layer of the printing material until the three-dimensional object is formed.

Container assembly 101 may be a container or cartridge that is adapted to hold one or more types of printing materials, and adapted to facilitate the building of a 3D object onto a platform 103 that is at least partially housed inside the cartridge or container assembly 101. A piston 102, as will be described in greater detail below, may be adapted to drive a hydraulic transfer of the printing material inside a chamber of the container assembly to a second chamber or printing area between a window and the platform of the container assembly 101.

Actuator 104 may be any type of actuator, or may be an actuator module comprising multiple types of actuators that may be configured to release a spring mechanism of the container assembly, push the piston 102, pull the platform 103, or a combination of these functions without limiting the scope of the present invention. A person of ordinary skill in the art will appreciate that a variety of actuators and actuator types may be employed to achieve the desired functions described in this disclosure.

Controller 105 is coupled to or in communication with actuator 104 and curing light module 106. Controller 105 may comprise a memory with executable instructions, the instructions configured to: (a) actuate movement of the piston 102 inside a first chamber of the container assembly 101, the piston 102 adapted to hydraulically actuate movement of a platform 103 inside a second chamber in fluid communication with the first chamber; (b) transfer at least a portion of a printing material stored at least partially in the first chamber to the second chamber, the second chamber including a printing area between a surface of a window and the platform; (c) emit a curing light through the window to cure a layer of the printing material to the platform 102 or to a previously cured layer of the printing material already cured onto the platform 102; and (d) repeat steps (a)-(c) until a three-dimensional object is formed.

Curing light module 106 is a light module configured to emit a curing light through a window of the container assembly or cartridge to cure at least a portion of, or a layer of, the printing material to the platform or to a previously cured layer of the printing material until the three-dimensional object is formed. Any suitable light source and light type may be used, so long as the light source is the type suitable for curing the printing material.

Turning to the next figure, FIG. 2-2 illustrates a block diagram of a device for holding printing material in accordance with the present invention. In exemplary embodiments, the device includes an assembly that functions as a container (for long term storage of the printing material) as a tank (for storing printing material to be used during a printing process) and as a platform on which a desired 3D-object may be formed. This device, for example a container assembly, may be reusable in some embodiments, and may be a type of cartridge that is a single-use cartridge suitable for storing just enough printing material for printing a type of desired object, as will be further explained below with reference to other figures.

In exemplary embodiments, as illustrated in FIG. 2-2, container assembly 101 may include: a first chamber 107 adapted to store a printing material (i.e., in an initial or storage stage, most (although not necessarily all, of the printing material may be stored inside the first chamber); a second chamber 108 in fluid communication with the first chamber 107; and a piston 102 movable inside the first chamber 107, configured to: actuate movement of a platform 103 inside the second chamber 108, and transfer a portion of the printing material in the first chamber 107 to the second chamber. The second chamber 108 may include a printing area between a surface of a window and the platform 103 in the second chamber 108 (see, for example, FIG. 6, FIG. 12, FIG. 25).

As will become clearer with reference to other figures below, in some exemplary embodiments, movement of the piston 102 may hydraulically actuate movement of the platform 103. In some exemplary embodiments, movement of the piston 102 inside the first chamber hydraulically actuates a piston in the second chamber, the piston in the second chamber forming at least a portion of the platform 102. In some exemplary embodiments, the piston 102 is adapted to move in a single direction along an axis of the first chamber until the three-dimensional object is formed. In some exemplary embodiments, the piston 102 is further adapted to continuously move along the axis of the first chamber until the three-dimensional object is formed. In some exemplary embodiments, the piston 102 is further adapted to pause movement at programmable intervals until the three-dimensional object is formed.

Figures 2, 3:
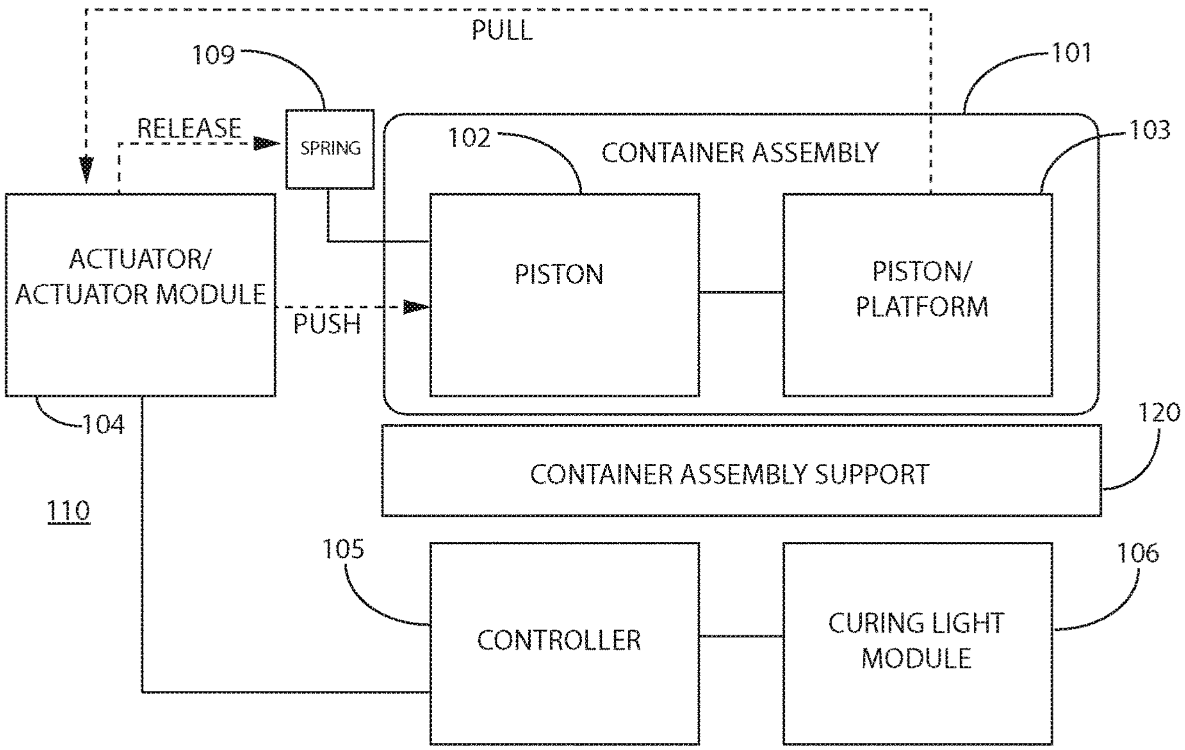
Figures 1, 3:
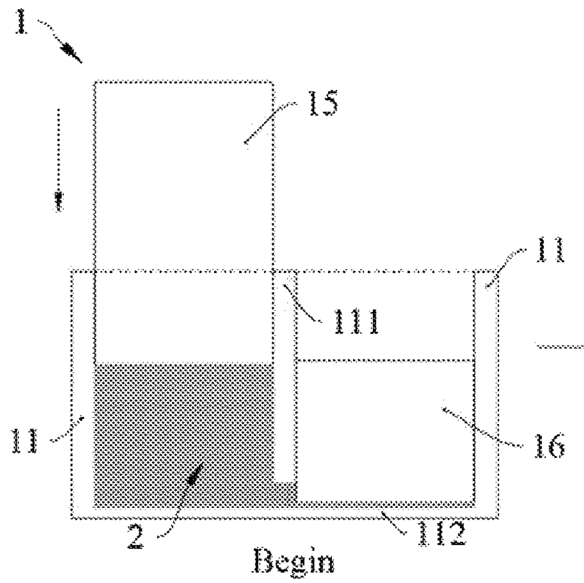
Figures 2, 3:
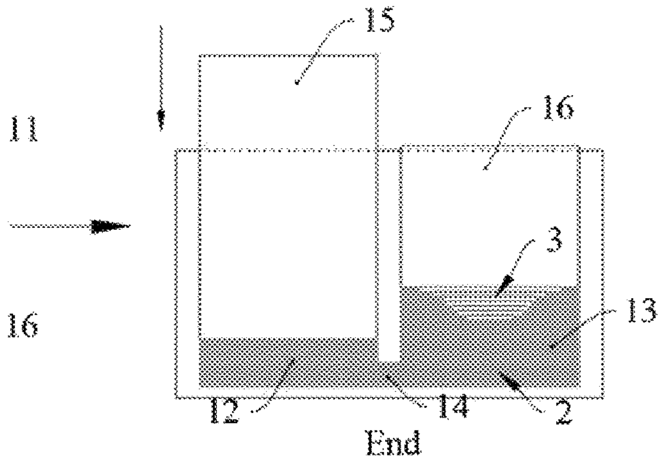

FIG. 2-3 illustrates a block diagram of a device for building or printing a three-dimensional object in accordance with the present invention. More specifically, FIG. 2-3 illustrates a block diagram of an apparatus 110, for example a 3D printing system, for printing 3D objects. Apparatus 110 may include: an actuator or actuator module 104 adapted to actuate movement of a piston 102 movable inside a container assembly 101, the container assembly 101 adapted to hold one or more printing materials and to print a three-dimensional object; a base or container assembly support 120 adapted to receive and or secure the container assembly 101; a controller 105 coupled to the actuator 104; and a curing light emitting module 106, in communication with the controller 105, wherein the controller 105 is configured to: (a) actuate movement of the piston 102 inside a first chamber of the container assembly 101, the piston 102 adapted to hydraulically actuate movement of a platform 103 inside a second chamber in fluid communication with the first chamber; (b) transfer at least a portion of a printing material stored at least partially in the first chamber to the second chamber, the second chamber including a printing area between a surface of a window and the platform (see for example, and without limiting the scope of the present invention, FIG. 6, FIG. 12, FIG. 25); (c) emit a curing light through the window to cure a layer of the printing material to the platform 102 or to a previously cured layer of the printing material already cured onto the platform 102; and (d) repeat steps (a)-(c) until a three-dimensional object is formed layer by layer.

In some exemplary embodiments, the container assembly 101 includes a spring 109 or similar mechanism that actuates the piston 102. In some exemplary embodiments, the container assembly 101 excludes the spring mechanism. In exemplary embodiments, spring 109 may be released by the controller 105, for example by actuating the actuator adapted to release the spring; the spring may be adapted to actuate movement of the piston once the spring is released or the mechanism is activated by actuator 104, or even manually by a user. In some exemplary embodiments, the actuator 104 is configured to push directly or indirectly on the piston to move the piston inside the chamber of the container assembly. In some exemplary embodiments, the piston 102 hydraulically actuates movement of the platform 103. In some exemplary embodiments, spring 109 is instead coupled to platform 103 and pulls on the platform which hydraulically actuates the piston 102.

In some exemplary embodiments, the actuator 104 is instead configured to pull directly or indirectly on the platform 103. In some embodiments, the spring mechanism on the cartridge or container assembly is actuated to move the piston, and in addition actuator 104 also pulls directly or indirectly on the platform 103. In some embodiments, the container assembly does not include the spring mechanism and actuator 104 pulls directly or indirectly on the platform 103. In some embodiments, the container assembly does not include the spring mechanism and actuator 104 pushes directly or indirectly on the piston 102. In some exemplary embodiments, actuator 104 merely releases spring mechanism 109 to actuate or move piston 102. In exemplary embodiments, releasing the spring actuates movement of the piston, and the controller actuates an actuator 104 configured to pull directly or indirectly on the platform 103.

Container assembly support 120 may be any suitable structure adapted to receive at least a portion of container assembly 101. For example, container assembly support 120 may be as simple as a generally flat base, or may be a more complex structure adapted to receive and register with a portion of container assembly 101 in order to secure container assembly 101 to the support structure 120. In exemplary embodiments, support structure 120 secures the container assembly, or even multiple container assemblies, during a printing job so that actuation of the piston or platform does not undesirably move the container assembly in a manner that interferes with the quality of the print job.

Turning to the next set of figures, FIG. 3-1 through FIG. 3-2 illustrate a device and method in accordance with exemplary embodiments of the present invention. More specifically, FIG. 3-1 shows an exemplary hydraulic device at a beginning stage and FIG. 3-2 shows the device at an end stage of an exemplary printing process during which a 3D-printed object is formed. With reference to FIG. 3-1, the hydraulic device 1 includes a body or housing 11, multiple chambers (for example, a standby resin chamber 12, and a printing chamber 13), a channel 14, a piston 15, and a platform 16. The body 11 may be generally a hollow structure with only a top region having one or more openings; the hollow structure may be divided into chamber 12 and chamber 13 by a clapboard or divider 111. In exemplary embodiments, due to the divider 111 at least partially not touching the bottom of body 11, channel 14 may be formed between chamber 12 and chamber 13, thus fluidly communicating both chambers. The printing material, in this exemplary embodiment a resin 2, may therefore flow from chamber 12 to chamber 13 through channel 14 as piston 15 is moved into chamber 12; hydraulically moving the platform 16 in chamber 13. The piston 15 at least partially installs in the standby resin chamber 12, the platform 16 also at least partially installs in the printing chamber 13.

A baseplate 112, which may form a bottom portion of body 11, may include a window situated between the platform 16 and a light engine 4 of a printing device (see for example FIG. 4), and may be preferably transparent (or, at least transparent at a region suitable for directing adequate light toward the platform 16, which is inside the printing chamber 13—the printing area, as will be discussed further below with reference to other figures), so that the radiation or curing light emitted from a light curing module may pass through and cure the exposed printing material, or resin 2, in the printing area or zone to allow the resin to cure either onto the platform or onto a previously cured layer of the printing material used.

As may be appreciated from FIG. 3-1 and FIG. 3-2, another aspect of the invention involves a method. That method may be described with reference to these figures as follows:

(1) Initial Stage:

In an initial stage, the platform 16 may be installed or positioned closer to the bottom of printing chamber 13 than to the top of the printing chamber, not necessarily touching but may be allowing for an initial layer or thickness of the printing material onto a top surface of the baseplate 112. A certain volume resin 2 may be filled into standby resin chamber 12 and channel 14. In exemplar embodiments, the type and size of the target 3D object (to be printed), for example a height of the object to be printed, may dictate the specific volume of resin 2 to be used and the height of the initial layer that is present in the second or printing chamber 13 at an initial stage. At this initial stage, the piston 15 may be installed or positioned at least partially inside the chamber 12, touching a top surface of the resin 2 inside the storage or standby chamber 12.

(2) Printing Process/Stage

During the printing process, the piston 15 is actuated down a certain distance (e.g., 0.1 mm, which may be determined in part by the thickness of each layer of the 3D object, the relative sectional area of chamber 12 and chamber 13), because resin 2 cannot be compressed, movement of the piston hydraulically moves the platform; the resin 2 flows into printing chamber 13 from chamber 12, for example by moving a single layer of thickness from chamber 12 to chamber 13, platform 16 may be actuated up a single layer of thickness as well.

During the printing process, in addition to movement of the piston and platform, light engine 4 may project a specific pattern to a printing area below or aligned with printing chamber 13, so that at least a layer of the resin 2 in the chamber 13 may be cured, and the cured resin will be adhered to the platform 16. Throughout the process, including printing a next or following layer, the hydraulic printing device will repeat the above steps, until the entire 3D object is completed.

(3) End Stage

During or at the end stage, the entire 3D object has been printed, a user may remove the platform 16 from printing chamber 13, and further, decouple the desired 3D object from the platform 16. In some exemplary embodiments a means may be provided to eject the platform from the chamber 13 and or housing 11.

Figure 4:
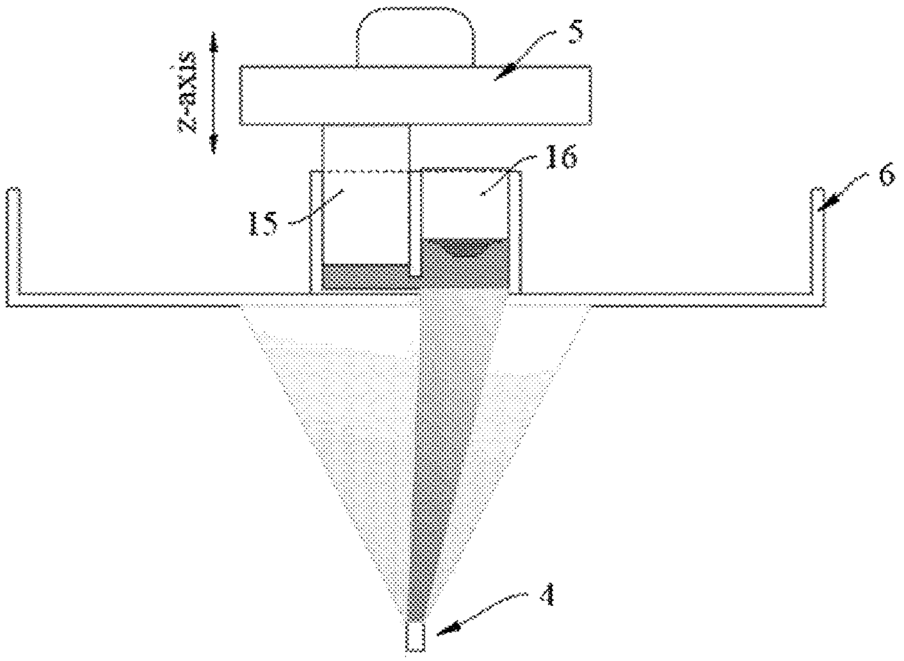
FIG. 4 illustrates a system in accordance with exemplary embodiments of the present invention.

FIG. 4 illustrates a system in accordance with exemplary embodiments of the present invention. As shown in FIG. 4, in some exemplary embodiments, in order to reduce the 3D printer's complexity, the printing device 1 may be installed on an existing 3D printer, for example and without limiting the scope of the present invention in any way, installed on top of an existing resin tank 6; in this configuration, the tank 6 will be empty but its clear or transparent bottom may be used to support a base of device 1.

In the non-limiting example shown in FIG. 4, the piston 15 of device 1 is actuated by build platform 5, and the sectional area of chamber 12 and chamber 13 is the same, so when printing a smaller 3D object, the user does not need to adjust the 3D printer's basic parameters (e.g., print speed, each stroke of build platform 5, etc.), or set other parameters to compensate. In other embodiments, the hydraulic printing device 1 may be installed on a mounting base 7 (see FIG. 9, for example) which may be configured to receive and secure the hydraulic printing device 1 in place.

Figure 5:
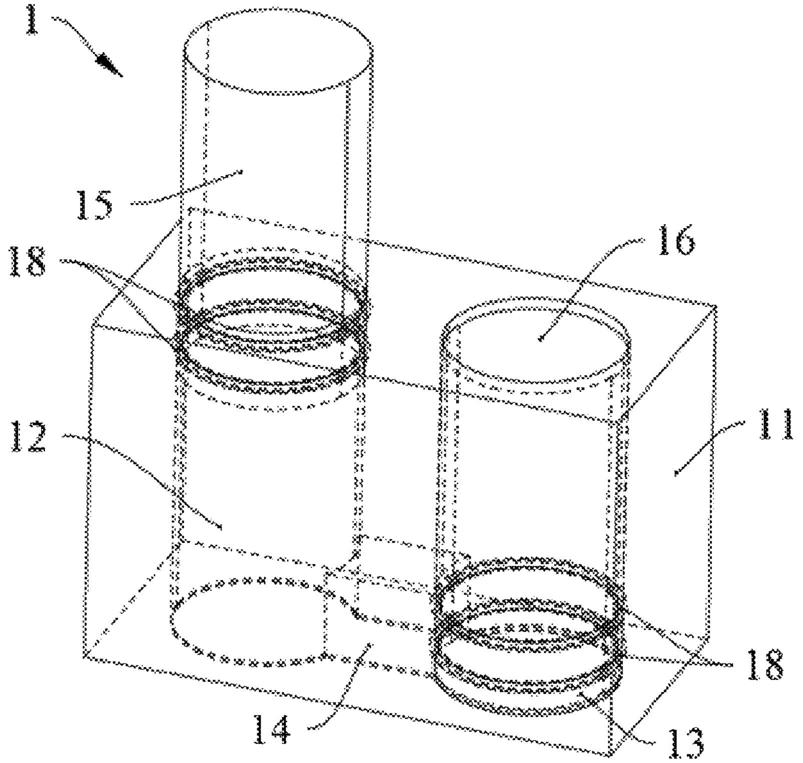
FIG. 5 illustrates a container assembly for printing 3D objects in accordance with exemplary embodiments of the present invention.

Turning to the next figure, FIG. 5 illustrates a container assembly for printing 3D objects in accordance with exemplary embodiments of the present invention. More specifically, FIG. 5 shows an exemplary embodiment of hydraulic printing device 1 that may optionally include several seal rings 18, which may be fixed on the bottom of piston 15 and platform 16, and configured to prevent printing material such as curable resin 2 from leaking outside of a housing or container body 11.

Figure 7:
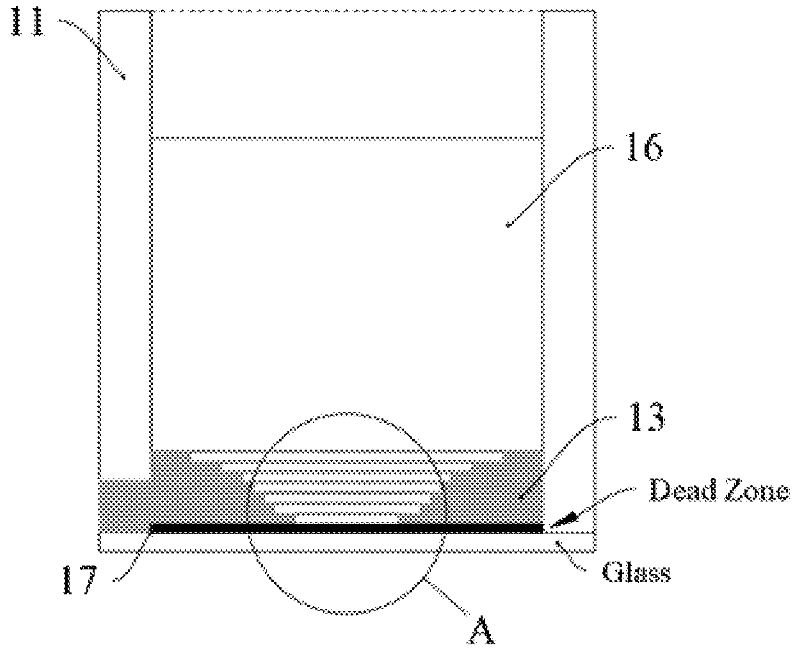
FIG. 7 illustrates an exemplary cross-sectional view of a chamber of a device for printing 3D objects in accordance with exemplary embodiments of the present invention.

In exemplary embodiments, baseplate 112 may be substituted by a flexible film 17 (e.g. PDMS Film, TPX Film, FEP Film; see for example also FIG. 7). Compared to the rigid baseplate 112, the adhered force between cured resin and film 17 will be significantly decreased, so that the cured resin will be easier to separate with flexible film 17, and further, the printing speed will increase also. However, if hydraulic printing device 1 does not include a rigid baseplate 112, then in exemplary embodiments the device may be simply placed and or fixed on a rigid structure—for example, and in no way limiting the scope of the present invention, placed on a glass of a mounting base 7 (see FIG. 9), or placed on an existing resin tank 6 (see FIG. 4). In some exemplary embodiments, the resin tank 6 may include a mounting base 7 that is fixed or integral with a base plate of the device 1 (see FIG. 9), such that the glass surface provides the rigid surface. Otherwise, if not placed on the rigid structure, the flexible film 17 will be deformed down while the piston is pushing the resin 2 and the hydraulic pressure may not be sufficient to move platform 16 and further drive it out of the second chamber. In exemplary embodiments, the flexible film 17 may be an oxygen permeation film. In this embodiment, the baseplate of the hydraulic printing device may be substituted by an oxygen permeation film 17, and it may be placed on a glass of mounting base 7.

During a printing process, oxygen permeates the film 17, and forms a 'dead zone' on the top surface of film 17. The 'dead zone' typically impedes polymerization reaction within the 'dead zone', which is beneficial to prevent the 3D-object 3 from undesirably adhering to film 17. Naturally, this contributes to decreasing the adhered force between the 3D-object 3 and film 17, and increasing the printing speed. The dead zone principle is described by Carbon, Inc. in U.S. Pat. No. 9,360,757.

Figure 8:
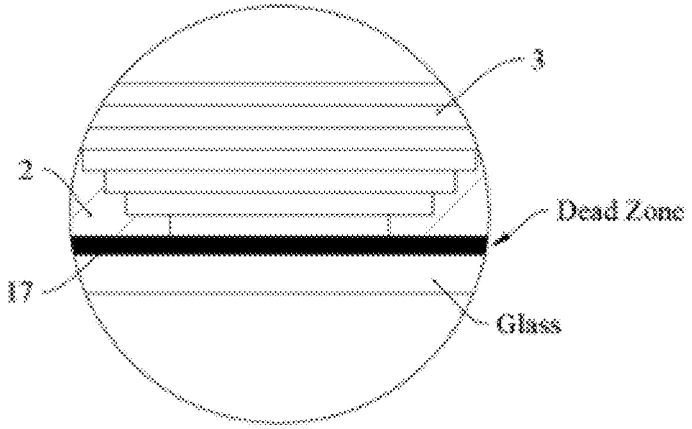
FIG. 8 illustrates an exemplary close-up view of the cross-sectional view shown in FIG. 7.

In general, the invention adopts the principle of "Liquids are basically incompressible". Based on this principle, while the stand-by resin is pushed by a piston, a certain volume resin will flow into the printing chamber 13 from chamber 12, and platform 15 will be driven up an appropriate or commensurate distance. The reduced volume of stand-by chamber 12 is equal to the increased volume of printing chamber 13. Thus, by controlling the running speed of piston 15, the relative sectional area of chamber 12 and chamber 13, printing thickness, speed, and other properties may be accurately adjusted. FIG. 8 illustrates an exemplary close-up view of the cross-sectional view shown in FIG. 7.

The present invention may be suitable for printing a wide array of objects, but may be especially suitable for printing smaller 3D-objects, for example printable dental crowns used by dental professionals on their patients. In exemplar embodiments, a device such as device 1 could be easily mounted on an existing 3D printer. As will be discussed further below with reference to other figures, in some exemplary embodiments, more specialized printers suitable for engaging with a specialized container assembly or cartridge may be employed, in accordance with the present invention.

Compared to the traditional printing method (e.g., top-down, bottom-up), in a device in accordance with the present invention, the printing material may be always in a closed chamber, and never in direct contact with air until after the desired object is completed and most or all of the printing material is for all intents and purposes used up. Thus, a printing system and method as proposed in this disclosure effectively decreases the influence of humidity and dust in the air that adversely affects printing materials and the quality and durability of the 3D printed objects formed using said system and method.

Turning now to FIG. 7, an exemplary cross-sectional view of a chamber of a device for printing 3D objects in accordance with exemplary embodiments of the present invention is illustrated.

In the traditional 3D printer, due to machine limitations (e.g., the motor and electronic control accuracy), every rise or fall of a build platform has a minimum stroke called $Z_{min}$. Under this limitation, the height of each layer that forms the intended 3D-object must be higher than $Z_{min}$, so that in the traditional 3D printer, we cannot further improve the accuracy of 3D object in Z-axis. However, in accordance with the present invention, it is possible to break the $Z_{min}$ by adjusting the relative sectional area of chamber 12 and chamber 13.

Figure 9:
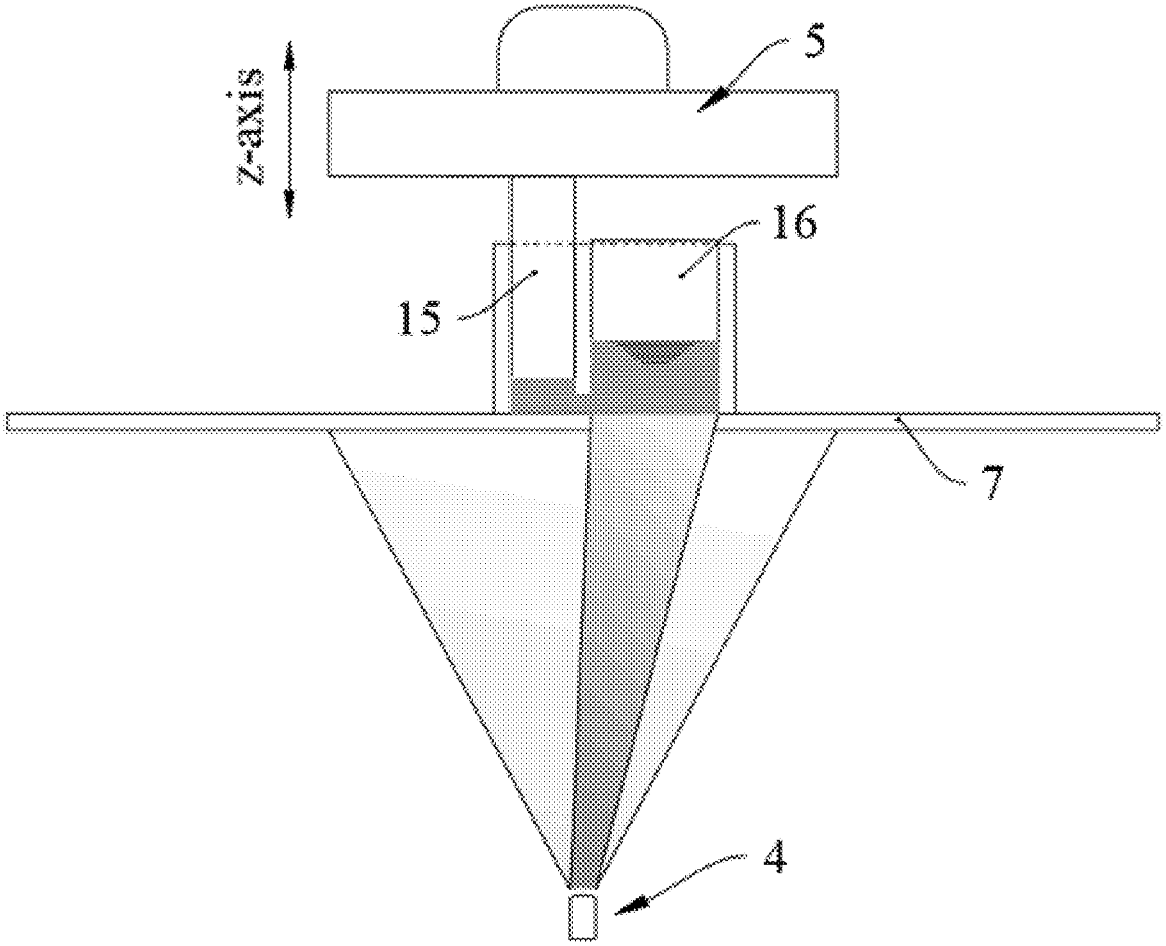
FIG. 9 illustrates a system in accordance with exemplary embodiments of the present invention.

For example, and without limiting the scope of the present invention, as shown in FIG. 9, the sectional area of printing chamber 16 may be increased so that it is twice the section area of chamber 15, so when build platform 5 is moved down the $Z_{min}$ height, the platform 16 may be driven up half of $Z_{min}$. Accordingly, with the present invention, it is possible to divide a 3D object into more layers to print, thus improving accuracy of the 3D object in Z-axis.

Figure 6:
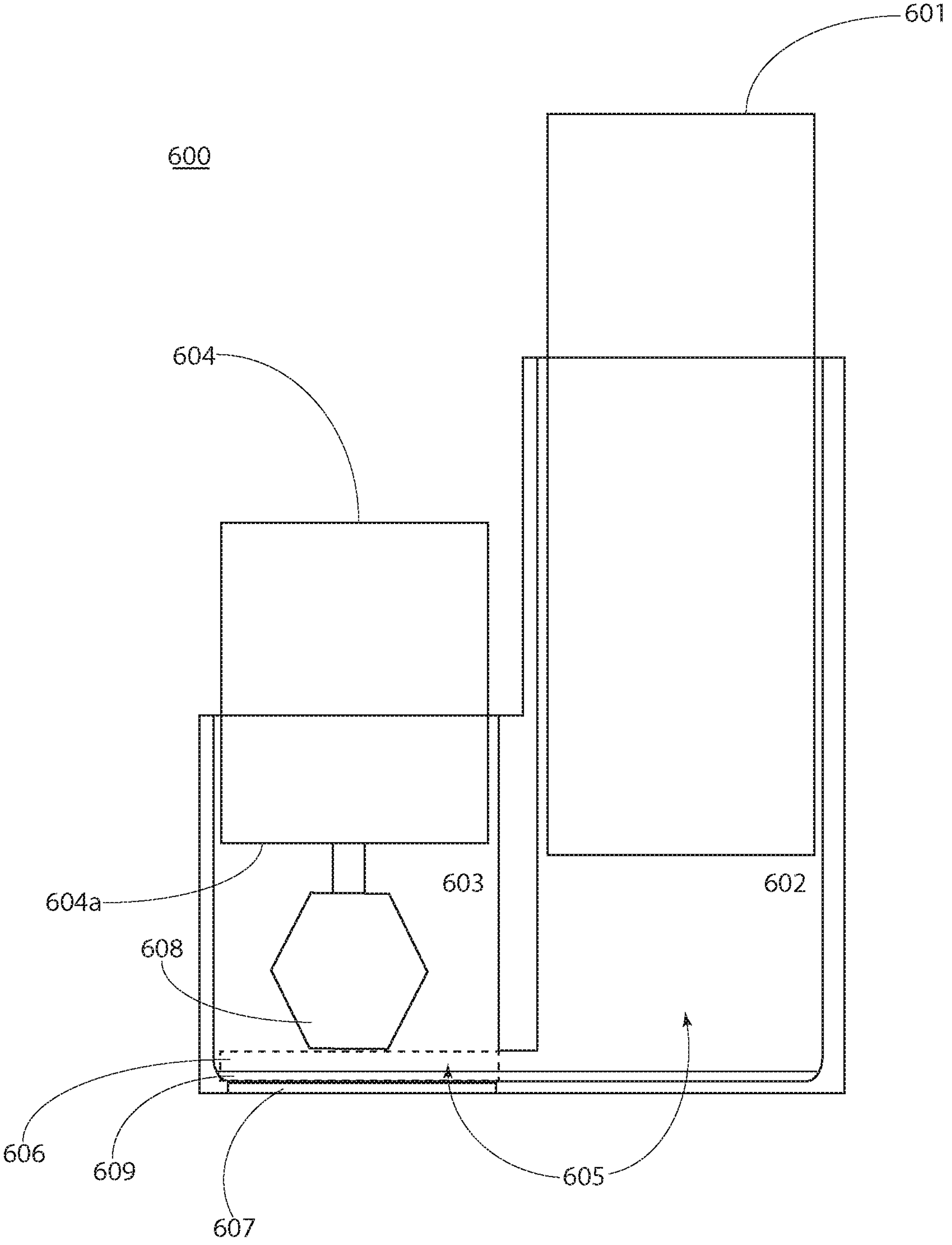
FIG. 6 illustrates a container assembly for printing 3D objects in accordance with exemplary embodiments of the present invention.

FIG. 6 illustrates a cross-sectional view of an exemplary container assembly for printing 3D objects in accordance with exemplary embodiments of the present invention. More specifically, FIG. 6 shows a container assembly 600, shown during or subsequent to having completed a printing job, thus shown with a 3D-printed object still cured onto a platform still inside a chamber of the container assembly.

As shown in this view of FIG. 6, container assembly 600 may comprising a piston 601 that moves along a z-axis of a first chamber 602 in fluid communication with a second chamber 603, piston 601 is adapted to hydraulically actuate movement of a platform 604 inside the second chamber 603, by for example moving or transferring at least a portion 605 of a printing material stored in the first chamber 602 to a printing area 606 inside the second chamber 603 (the printing area 606 shown in dotted lines, between a surface of a window 607 and a surface 604*a* of the platform 604. When container assembly 600 is actuated during a printing job, a curing light engine configured to emit a curing light, directs a curing light through the window 607 to cure a layer of the printing material within the printing area onto the platform or to a previously cured layer of the printing material that has been previously cured onto the platform. By subsequently repeating these steps, a three-dimensional object 608 may be formed. In some exemplary embodiments, window 607 may be a glass or similarly hard transparent or semitransparent surface. In some exemplary embodiments, the glass or similarly hard transparent or semitransparent surface may be treated with a coating layer 609 such as a gel, for example a PDMS gel coating on a glass surface of window 607.

Figure 10:
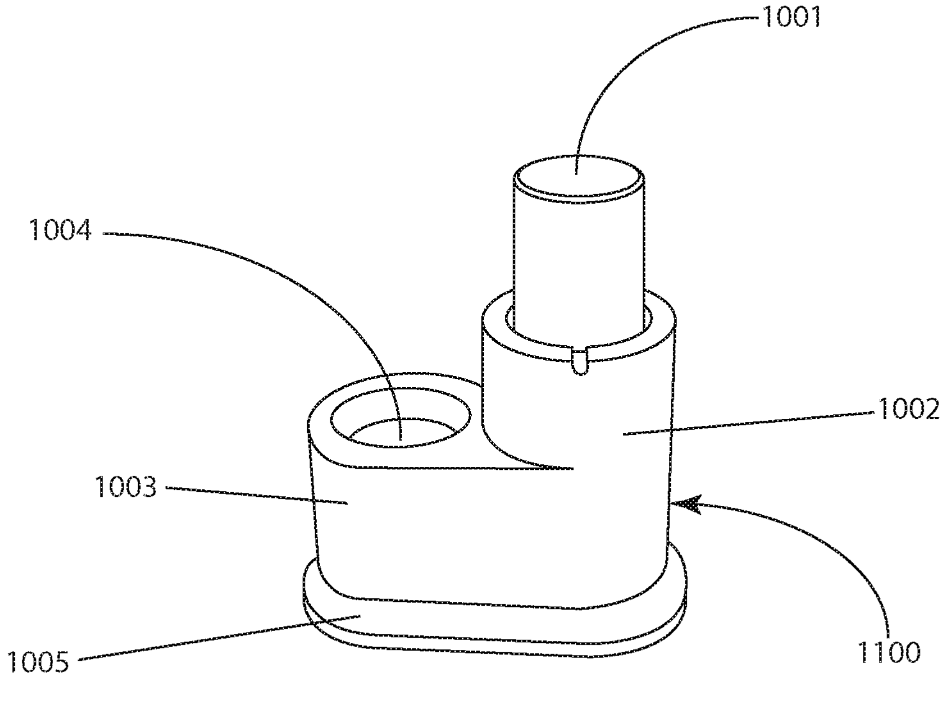
FIG. 10 illustrates a container assembly for printing 3D objects in accordance with exemplary embodiments of the present invention.
Figure 11:
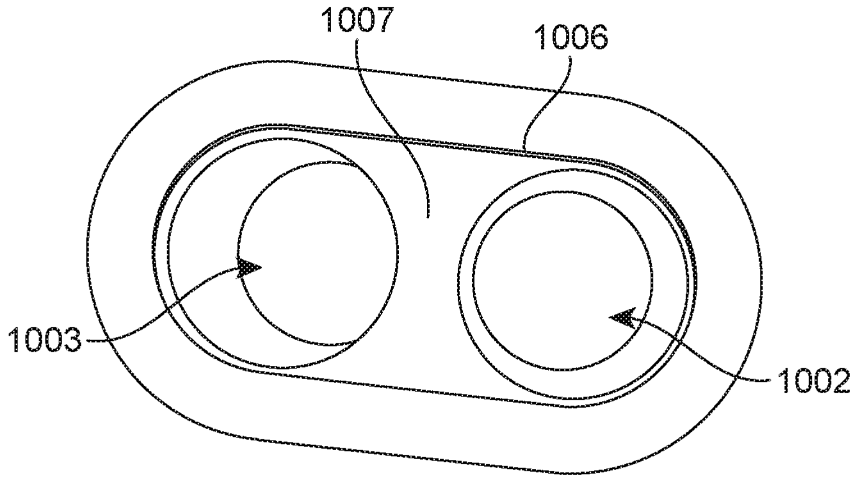
FIG. 11 illustrates an exemplary bottom view of a container assembly for printing 3D objects in accordance with exemplary embodiments of the present invention.
Figure 12:
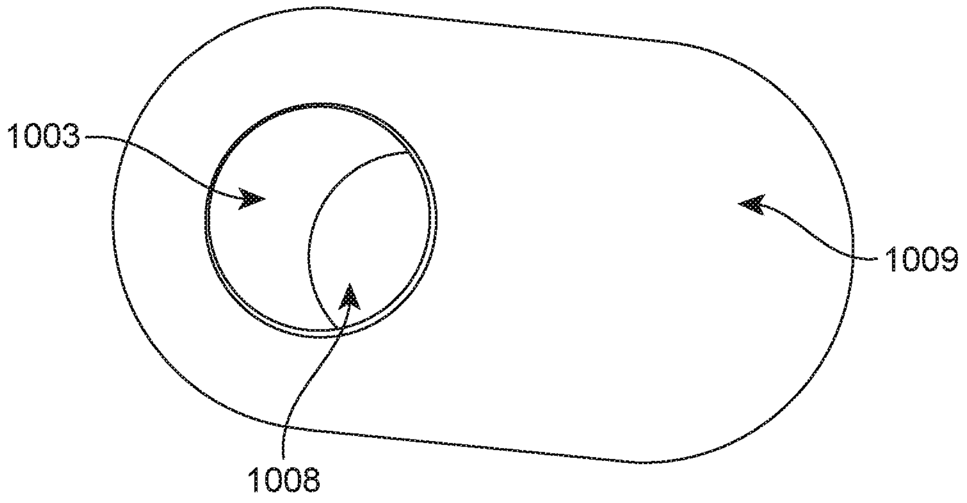
FIG. 12 illustrates an exemplary bottom view of a container assembly for printing 3D objects in accordance with exemplary embodiments of the present invention.
Figures 1, 12:
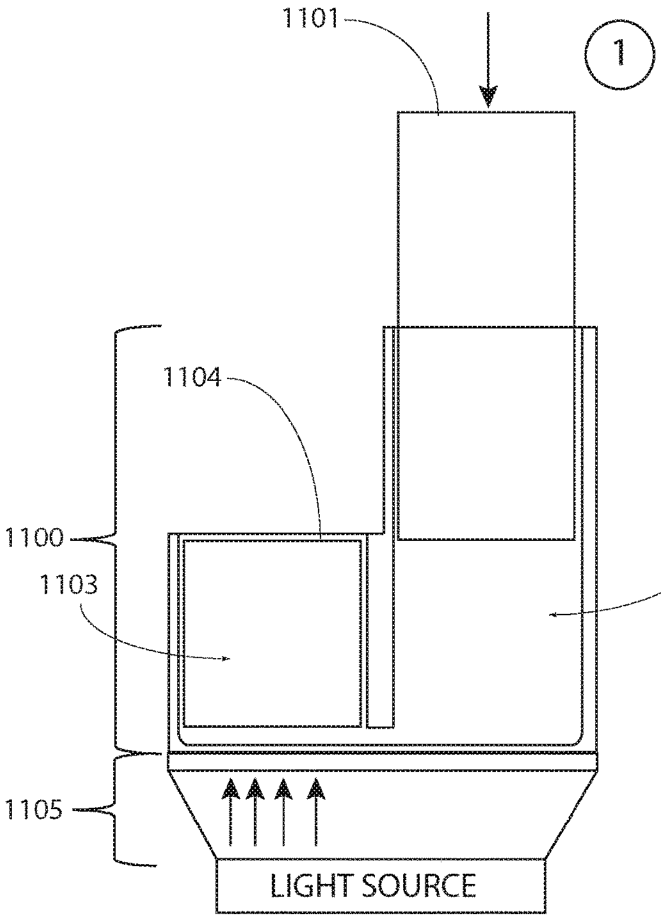
Figures 2, 12:
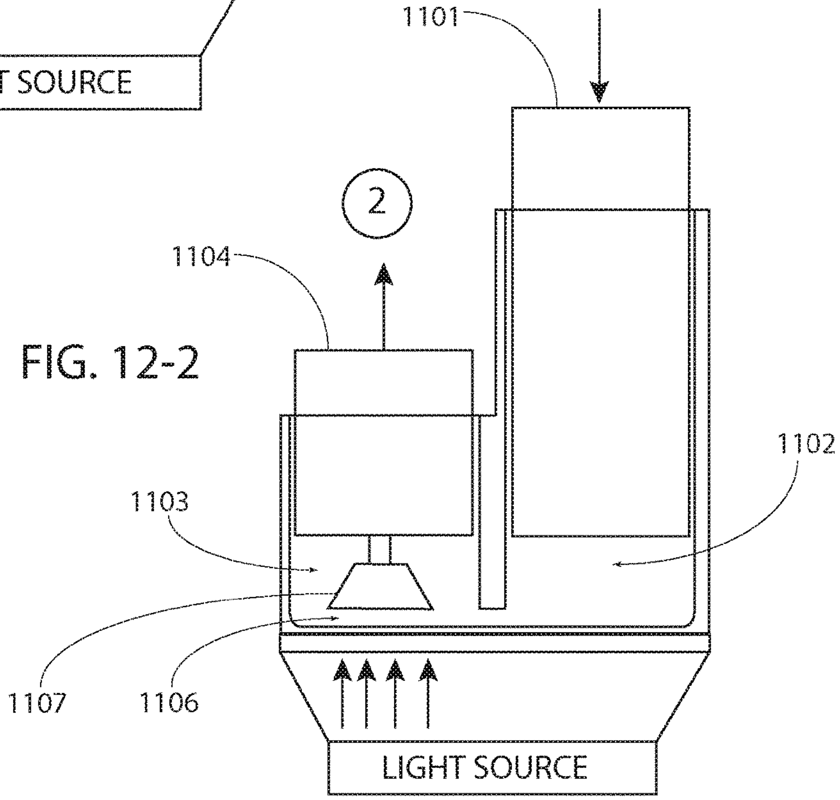
Figures 3, 12:
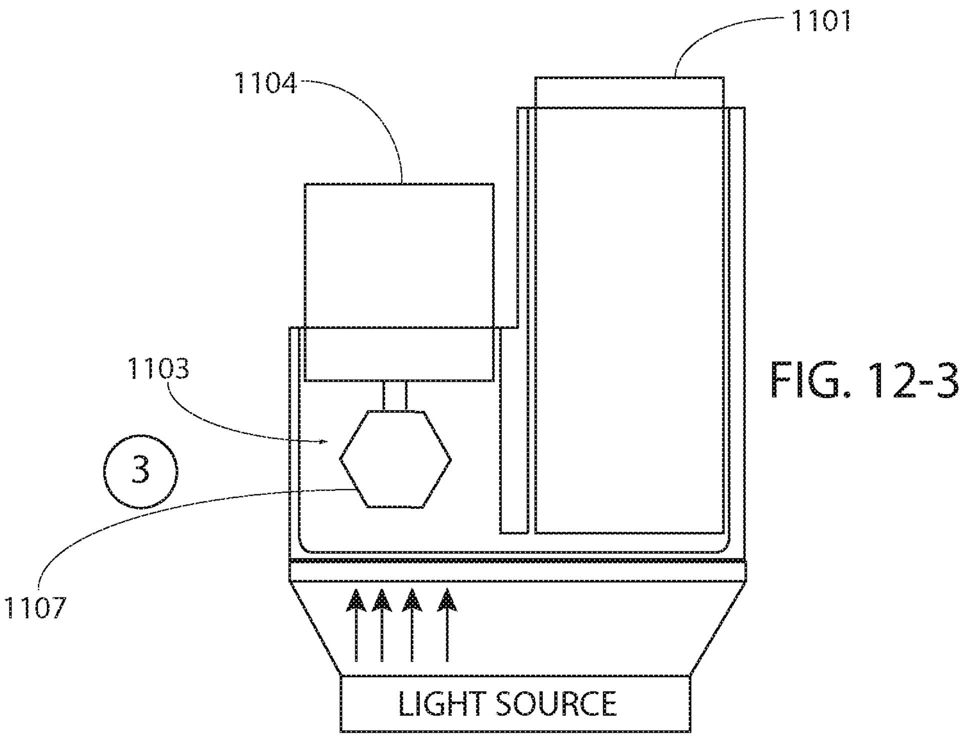
Figures 4, 12:
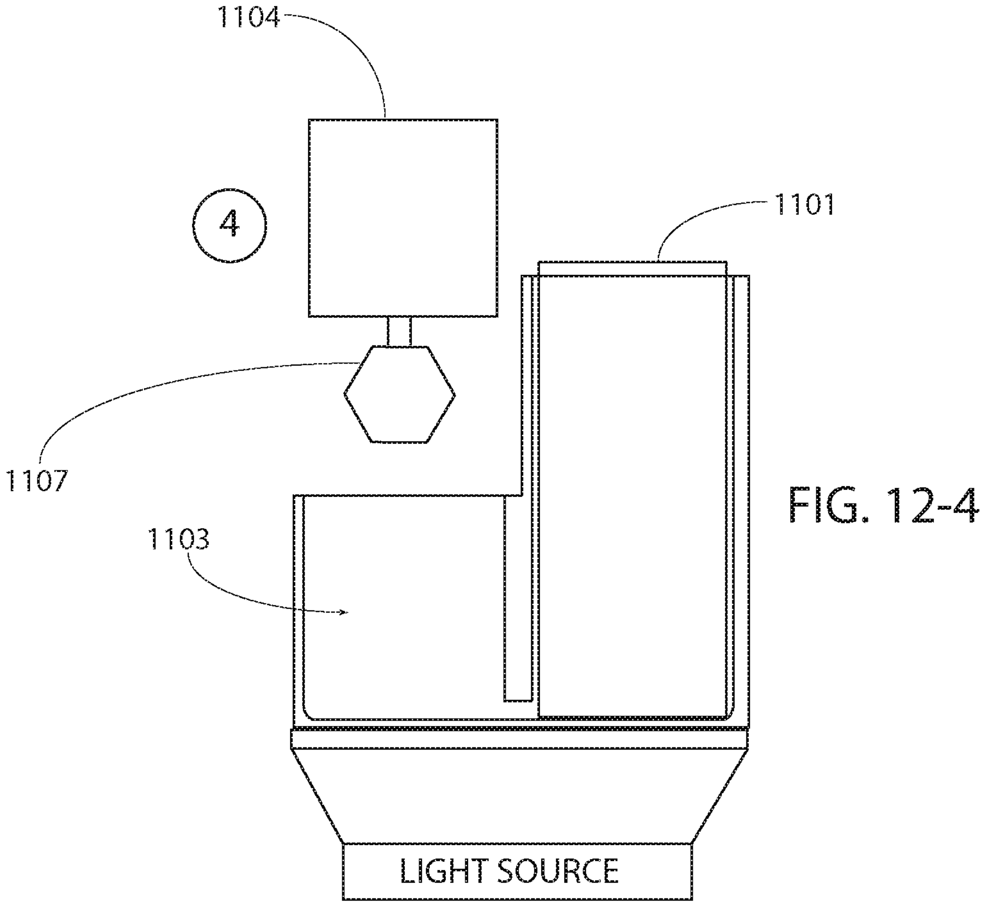

Turning now to the next set of figures, FIG. 10-FIG. 12 illustrate another exemplary embodiment in accordance with the present invention, which shows a container assembly configured for building a single 3D-printed object, whereby the container assembly comprises a body, which may be exemplarily, although in no way limiting the scope of the present invention, shaped like a boot or otherwise have a boot-shaped body that includes multiple fluidly connected chambers (i.e., similar to those chambers shown in the embodiments of FIG. 3 and FIG. 6).

In FIG. 10, the exemplary container assembly 1000 comprises a housing or body 1100 that includes a first chamber 1002, which initially holds the printing material and is adapted to receive at least a portion of a first piston 1001. A second chamber 1003 is adapted to receive at least a portion of a second piston that forms at least part of a platform 1004, wherein chamber 1002 is fluidly connected to the second chamber 1003 so that as piston 1001 is moved, or in this case pressed, the volume decreases inside chamber 1002, transferring, at least a portion of the printing material to chamber 1003, for example by hydraulically driving the printing material into chamber 1003 so that a layer of the printing material between the platform and a base or window of the container assembly may be exposed to a light source that cures the printing material onto the platform 1004.

In exemplary embodiments, a base 1005 forms or secures a window 1008 (see FIG. 12) at a bottom portion of the container assembly 1000, wherein the window is configured to allow a light source to direct a curing light onto a layer of the printing material that is transferred into chamber 1003. The light source may then be directed towards window 1008 in order to print each layer onto a surface of the build platform 1004.

FIG. 11 and FIG. 12 show images of the bottom section of container assembly 1000. From the view of FIG. 11, it may be appreciated that the chambers 1002 and 1003 are fluidly connected at a bottom region of the container assembly. More specially, a channel 1007 may be formed at the bottom of the container to fluidly connect chambers 1002 and 1003. This channel 1007 may be sealed by way of a base bottom surface, which may be glass or may be part of the container assembly body 1001, the channel 1007 in part formed by a recess 1006 that separates the bottom of each chamber 1002 and 1003 from the terminal end of the housing 1100.

In exemplary embodiments, as illustrated in the view of FIG. 12, it may be appreciated that in some exemplary embodiments, window 1008 is precisely below chamber 1003 (i.e., the chamber in which the platform 1004 is slidably housed therein), and may be positioned so that only the printing material layer below chamber 1003 is exposed to the curing light. For example, and without deviating or limiting the scope of the present invention, this may be achieved by including a base 1009 that is solid but for a transparent aperture that forms the window 1008.

Turning now to the next set of figures, FIG. 12-1-FIG. 12-4 illustrate a method of printing a 3D-printed object performed by a system in accordance with exemplary embodiments of the present invention.

By way of example, and without limiting the scope of the present invention, starting at FIG. 12-1, at step (1), a platform 1104 of a container assembly 1100 may be actuated from an initial position or state of the device. For example, initially, platform 1104 may be positioned at its lowest or most submerged position inside chamber 1103. In this initial or starting stage, a 3D-printer component such as a printing arm or the like, may be coupled to piston 1101 and adapted to actuate (for example, by pressing down on) piston 1101 into chamber 1102, which initially holds at least some or most of the printing material within.

In some exemplary embodiments, the container assembly 1100 may hold most of the printing material, for example a resin, inside chamber 1102, and have just enough printing material inside chamber 1103 suitable for curing an initial layer of the desired 3D-printed objected. In other exemplary embodiments, the piston 1101 must first be actuated in order to introduce a proper or adequate first layer of printing material into chamber 1103. Accordingly, whether a suitable layer of printing material is already in chamber 1103, or a suitable layer of printing material must be initially introduced into chamber 1103 by actuation of the piston 1101, a curing light module 1105 may be simultaneously or subsequently activated in order to start emitting a curing light onto the suitable layer of printing material to cure the layer onto a surface of the platform 1104.

At step (2), as shown in FIG. 12-2, the process proceeds so that the actuated piston 1101 continues to move, transferring printing material between the fluidly communicated chambers 1102 and 1103. In some exemplary embodiments, the process is continuous, and the piston 1101 is continuously pushed into chamber 1102 so as to continuously introduce the printing material into chamber 1103 for printing the desired 3D-printed objected 1107. In some exemplary embodiments, there may be pauses in the actuation of the piston 1101; in exemplary embodiments, the timing of the actuation of the piston 1101 coincides with the timing of the activation of the light engine so as to maximize speed, efficiency, and quality of the 3D-printed object 1107. As exemplarily illustrated in FIG. 12-2, as the piston 1101 is actuated and moved further inside chamber 1102 to transfer a portion 1106 of the printing material into chamber 1103, platform 1104 may be respectively raised or moved out of chamber 1103.

At step (3), as shown in FIG. 12-3, the process continues: printing a next or following layer, the hydraulic printing device repeating the above steps, until the entire 3D object is completed. In exemplary embodiments, most or all of the printing material stored in the first chamber may be transferred to the second chamber (although not necessarily). As mentioned above, one of the benefits of the present invention is that the container assembly can keep the printing material required for a single use safe and in a sealed environment so as to conserve and preserve an optimum state of the printing material before use. This is a clear improvement over prior art printing methods that require opening containers of printing material that may be used after opening the packaged printing material, and which are often reused or not entirely used only to be used later when their shelf life and exposure to the environment reduces their efficacy.

At step (4), as shown in FIG. 12-4, the build or printing process may be completed. In exemplary embodiments, the platform 1104 may be removed entirely from chamber 1103, either manually or mechanically, so that the completed 3D-printed object 1107 may be accessed and separated from the platform 1104. Naturally, with the build process completed, the light engine may be deactivated or inactive. As may be appreciated from this exemplary method of building a 3D-printed object, in exemplary embodiments, the container assembly is a single-use assembly. Of course, in other exemplary embodiments, the same hydraulic principle may be applied in a multi-chamber tank assembly similar to the container assembly, which is not single-use and may be subsequently filled and used again.

As may be appreciated from the exemplarily described method of printing a 3D-printed object in accordance with the present invention, actuation of piston 1101 (or otherwise moving the piston 1101) may be achieved by movement in a single direction. That is, in the illustrated embodiment, piston 1101 is moved down into chamber 1102 in a single direction (i.e., piston 1101 is not pulled out of the chamber 1102 during the build process); this results in the platform 1104 also moving in a single direction (i.e., platform 1104 is never moved into chamber 1103, only in a single direction out of chamber 1103). Movement in a single direction facilitates a more efficient process overall since no time is wasted moving the platform towards and away from the printing material as is the case in prior art 3D printers that use stereographic methods of building 3D objects.

Figures 1, 13:
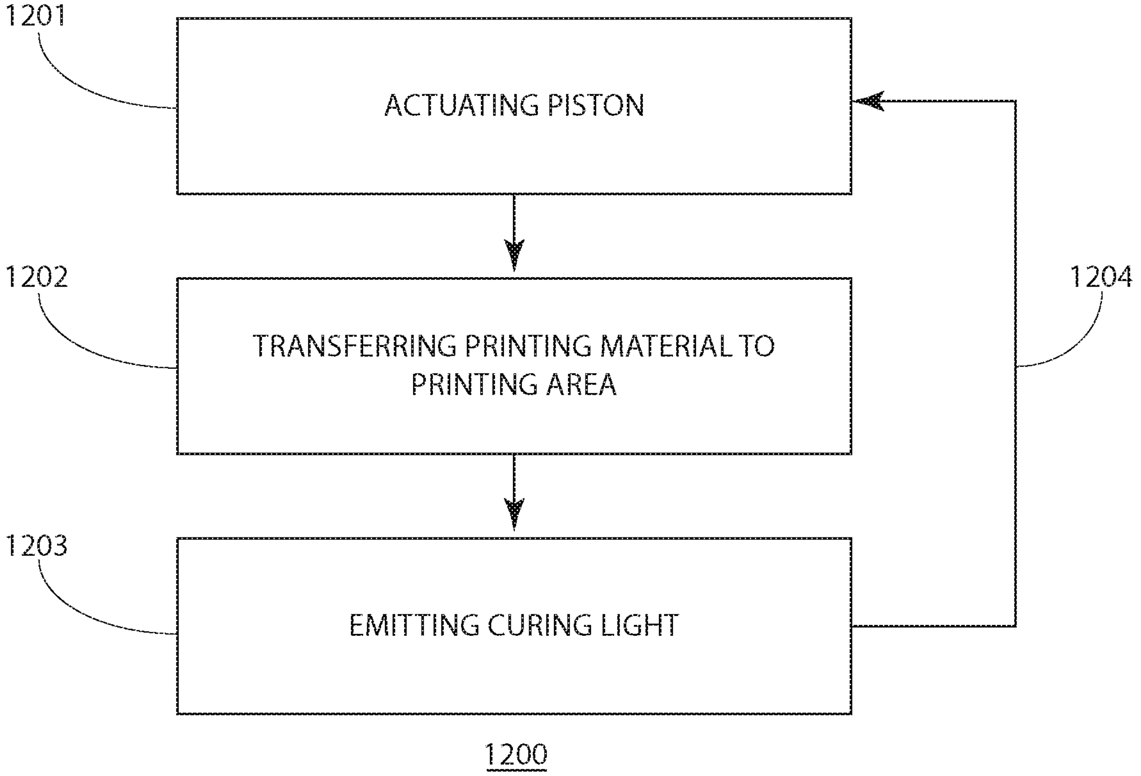
Figures 2, 13:
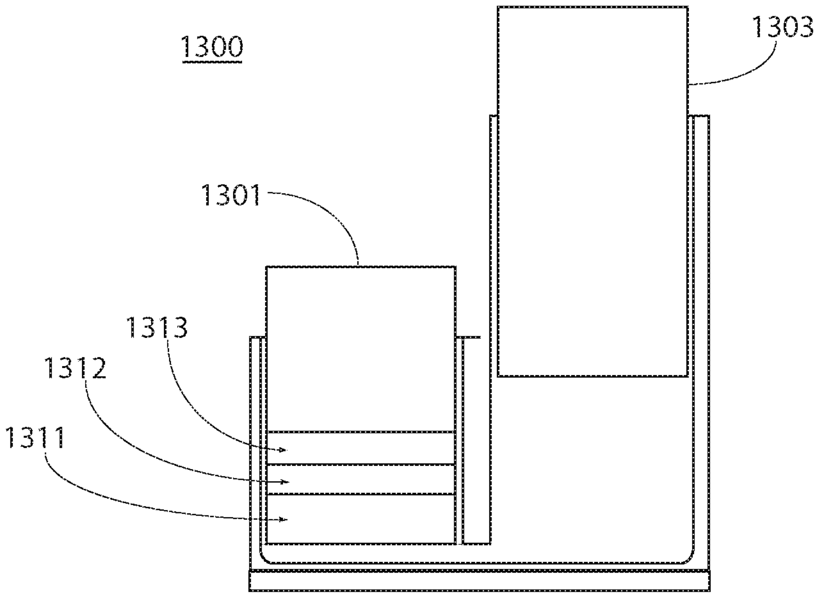

Next, FIG. 13 illustrates a method for printing three-dimensional objects in accordance with exemplary embodiments of the present invention. More specifically, FIG. 13 illustrates an exemplary method 1200. It should be understood that although method 1200 is shown in a particular sequence, it is conceivable that a different sequence with less or more steps may be performed without deviating from the scope of the present invention. In exemplary embodiments, method 1200 may include the following steps:

In step 1201, a piston on a device in accordance with the present invention, for example a container assembly, may be actuated or otherwise moved For example, the piston may be slidably moved into or through a chamber of the container assembly. This may involve actuating a piston inside a first chamber, wherein the piston is adapted to actuate movement of a platform inside a second chamber in fluid communication with the first chamber.

In step 1202, at least a portion of a printing material stored in a chamber may be transferred to a printing area between a surface of a window and the platform. This may typically involve transferring at least a portion of the printing material from a first chamber into a second chamber where the platform resides, and thus allowing a suitable layer of the printing material to be exposed to a curing light through the window.

In step 1203, a curing light may be emitted through the window to cure at least a portion of the layer of the printing material to the platform (i.e., if it is the first layer, for example) or to a previously cured layer of the printing material (i.e., if a preceding layer was already cured and a new layer is being formed onto an existing cured layer of the 3D object being formed).

In step 1204, steps 1201 through 1203 may be repeated until the desired 3D object is ultimately formed.

In some exemplary embodiments, step 1201 may include moving the piston in a single direction along an axis of the first chamber. In some exemplary embodiments, moving the piston in a single direction along an axis of the first chamber may include continuously moving the piston until the three-dimensional object is formed. In some exemplary embodiments, moving the piston in a single direction along an axis of the first chamber may include pausing movement of the piston at programmable intervals until the three-dimensional object is formed.

In some exemplary embodiments, step 1202 may include disposing the layer of the printing material on a glass surface of the window. In some exemplary embodiments, step 1202 may include disposing the layer of the printing material on a film or a coating layer that at least partially forms the window. In some exemplary embodiments, the film may be a flexible oxygen permeation film. In some exemplary embodiments, the film or coating layer may either be a polydimethylsiloxane (PDMS) film, a polymethyl pentene (PMP) film, a Transparent Polymer X (TPX) film, or a fluorinated ethylene propylene (FEP) film.

In some exemplary embodiments, step 1204 may include substantially consuming or transferring the printing material stored in the first chamber to the second chamber where the platform is housed.

In some exemplary embodiments, method 1200 may further include, after completion of the printing process, releasing the platform from the second chamber to allow access to the three-dimensional object formed on the platform. In some exemplary embodiments, method 1200 may further include, prior to step 1201—before actuating the piston—breaking or removing a seal of a container assembly that houses the first and second chambers.

In exemplary embodiments, method 1201 may be performed in part or completely by a controller of a system in accordance with the present invention. For example, and without limiting the scope of the present invention, controller 105 in FIG. 2-1 or FIG. 2-3. Accordingly, controller 105 may comprise a memory with executable instructions, the instructions configured to: (a) actuating a piston inside a first chamber, the piston adapted to actuate movement of a platform inside a second chamber in fluid communication with the first chamber; (b) transferring at least a portion of a printing material stored at least partially in the first chamber to a second chamber including a printing area between a surface of a window and the platform; (c) emitting a curing light through the window to cure a layer of the printing material to the platform or to a previously cured layer of the printing material already cured onto the platform; and (d) repeating steps (a)-(c) until a three-dimensional object is formed.

In some exemplary embodiments, actuating the piston inside the first chamber hydraulically actuates the platform. In some exemplary embodiments, actuating the piston inside the first chamber hydraulically actuates a piston in the second chamber, the piston in the second chamber forming at least a portion of the platform.

FIG. 13-2 illustrates a system for printing three-dimensional objects using multiple materials, in accordance with exemplary embodiments of the present invention. More specifically, FIG. 13-2 shows container assembly 1300 which is configured to build 3D-printed objects that may include multiple types of materials, such as printing materials 1311, 1312, and 1313, which may be cured onto platform 1301, for example by transferring multiple printing materials from a first chamber that houses a piston 1303 into a second chamber that houses the platform 1301. Each of the materials is used in accordance with the build specifications or parameters of the desired 3D-printed object, so that each material is introduced into the chamber housing the platform 1301 at a predetermined sequence so that the desired material sequence is cured as needed. With this exemplary embodiment, a 3D-printed object may be formed using different materials inside a container assembly or boot cartridge, to facilitate printing multi-color or multi-material products. In some exemplary embodiments, this may be achieved by way of implementing multiple pistons in separate fluidly connected chambers that are configured to transfer different printing materials from other cambers into the chamber that houses the build platform. Such an exemplary embodiment is shown with reference to the next figure.

FIG. 13-3 illustrates a system for printing three-dimensional objects using multiple materials, in accordance with exemplary embodiments of the present invention. More specifically, FIG. 13-3 depicts a first chamber housing a first piston 1301 and a first printing material 1304. A second chamber houses a second piston 1302 and a second printing material 1305. Both the first and second chambers are adapted for selective fluid communication with a third chamber that houses platform 1303. Selective fluid communication may be controlled by way of valves 1306 and 1307, for example one-way valves that allow either the first or second pistons to transfer printing material into the third chamber housing the platform.

In exemplary embodiments, the valves 1306 and 1307 may be configured to control the different materials' feeding speed. Platform 1303 is adapted to accept different materials during printing, and the system allows the same 3D-printed object to be printed with different materials at different layer heights.

Turning now to the next set of figures, a variety of structures and or components may be exemplarily disposed inside each chamber and or on an exterior of the piston and platform, in order to preserve a desired pressurized environment within the hydraulic system of the container assembly. In exemplary embodiments, these structures or components inside each chamber facilitate an airtight seal. For example, and without limiting the scope of the present invention, the airtight seal or pressurized environment may include treating the surfaces with materials that facilitate the same, and or employing structures such as O-rings and the like.

FIG. 14-FIG. 16 illustrate several views of a device in accordance with exemplary embodiments of the present invention. More specifically, FIG. 14 through FIG. 16 show cross-sectional views of a container's chamber with a piston or platform 1401, the walls 1402 forming the walls of the chamber. In exemplary embodiments, as shown in these views, a piston (or platform) may include at least one or a plurality of structures, for example O-rings 1403 that reside inside recessed walls 1404 of the piston 1401, to provide a tight seal that prevents spillage of the printing material, which is typically highly viscous.

As mentioned above, the airtight seal or pressurized environment helps maintain an optimum state of the printing material until it is used up during a printing protocol. Moreover, another of the benefits of the present invention is that the pressurized environment lends itself to utilization of highly viscous materials for building or printing 3D-objects. This is especially helpful for certain applications, including but not limited to applications in the dental field. For example, and without limiting the scope of the present invention in any way, in the field of dentistry, it may be desirable to print an object such as a crown. The inability to properly handle highly viscous printing materials is a problem that has yet to be adequately addressed by the prior art, and the present invention does by way of the hydraulic system of the tank or container assembly described herein.

In exemplary embodiments, the volume ratios of chambers 1 and 2 is 1:1; in some embodiments a different ratio may be used so as to optimize the efficiency of the build process, as well as the quality of the 3D-printed object built. As such, the present invention may be practiced with similar or different sized chambers, lengths of chambers, volumes of chambers, and or the number of chambers, without deviating from or limiting the scope of the present invention.

Turning now to the next set of figures, FIG. 17 illustrates a system for printing three-dimensional objects in accordance with exemplary embodiments of the present invention, and FIG. 18 illustrates a base support configured to support or receive a container assembly or cartridge for the system shown in FIG. 17, in accordance with exemplary embodiments of the present invention.

More specifically, FIG. 17 illustrates printing system 1700, which includes a container assembly 1701 for holding a printing material to print a three-dimensional object; a piston 1702 movable inside a first chamber of the container assembly 1701, configured to: actuate movement of a platform inside a second chamber in fluid communication with the first chamber, and transfer a layer of the printing material stored in the first chamber to a printing area between a surface of a window and the platform in the second chamber.

Moreover, system 1700 includes at least one or more actuators 1703 coupled to a controller and configured to move the piston 1701 (for example by means of an arm 1704); and a curing light emitting module 1705, in communication with the controller, configured to emit a curing light through the window to cure at least a portion of the layer of the printing material to the platform or to a previously cured layer of the printing material until the three-dimensional object is formed.

In some exemplary embodiments, system 1700 includes a base support 1706 that is configured to receive a single cartridge or container assembly 1701. The base support may be a transparent base or have at least a transparent portion to enable the curing light module 1705 to direct a curing light into a printing area of the container assembly 1701.

As shown in FIG. 18, base support 1706 may have a region, such as region 1801 that optionally, although not necessarily, registers with a base portion of container assembly 1701; this may be useful to secure the container assembly 1701 to system 1700 during a printing process, so that the container assembly does not necessarily move and the curing light may be accurately projected during the printing process.

Figure 20:
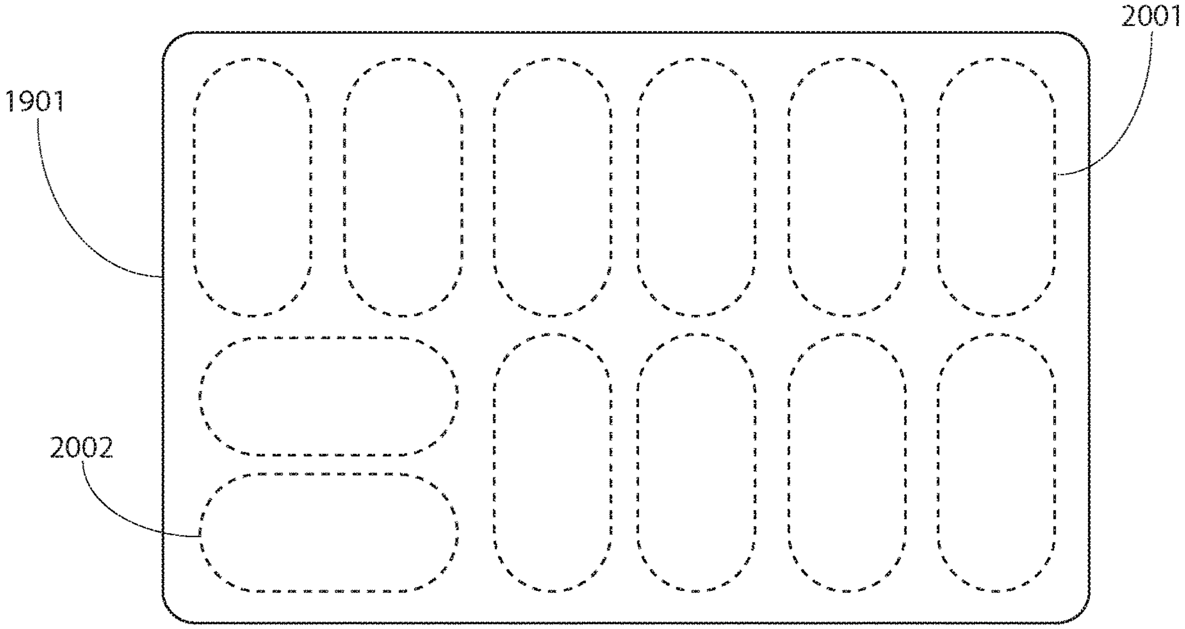
FIG. 20 illustrates a container assembly support configured to support or receive one or more container assemblies or cartridges for the system shown in FIG. 19, in accordance with exemplary embodiments of the present invention.

Next, FIG. 19 illustrates a similar system 1900, and FIG. 20 illustrates a similar base support 1901 configured to support or receive multiple container assemblies or cartridges, in accordance with exemplary embodiments of the present invention. An arm 1902 may be configured to simultaneously actuate each of a plurality of pistons of a plurality of container assemblies that may be secured to base support 1901. From the view in FIG. 20, it may be appreciated that a base support 1901 suitable for receiving multiple container assemblies need not be limited to a particular orientation—that is, a container assembly may be positioned along a width or along a length of the base support without deviating from the scope of the present invention, and may support multiple container assemblies or cartridges in multiple orientations; a surface of the base support may have individual recessed portions such as recessed areas 2001 and 2002 to register with one or more container assemblies.

Figure 21:
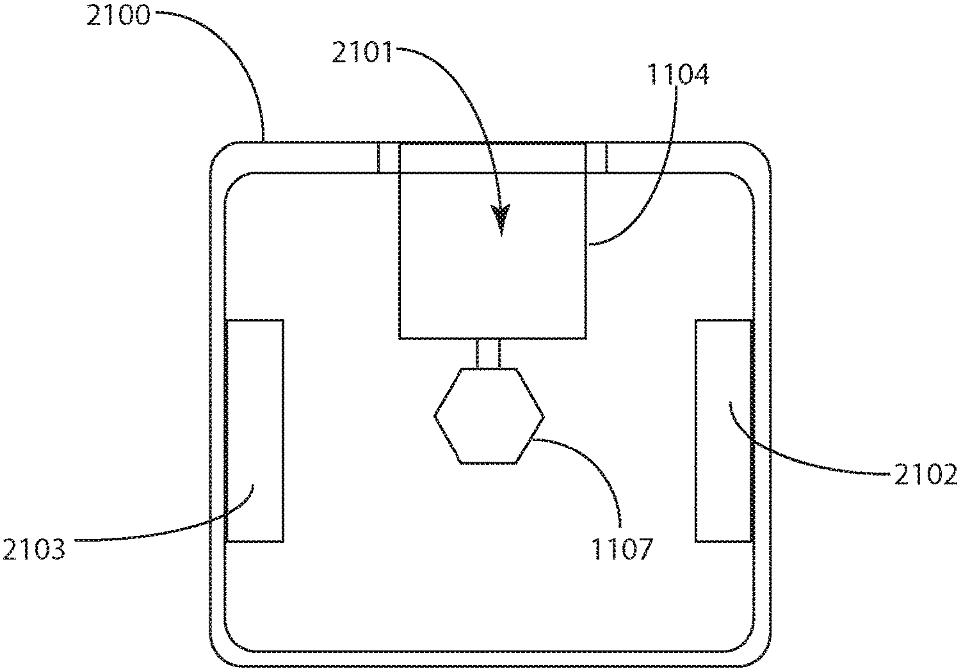
FIG. 21 illustrates a wash system adapted to receive a platform for a system for printing three-dimensional objects in accordance with exemplary embodiments of the present invention.
Figures 1, 21:
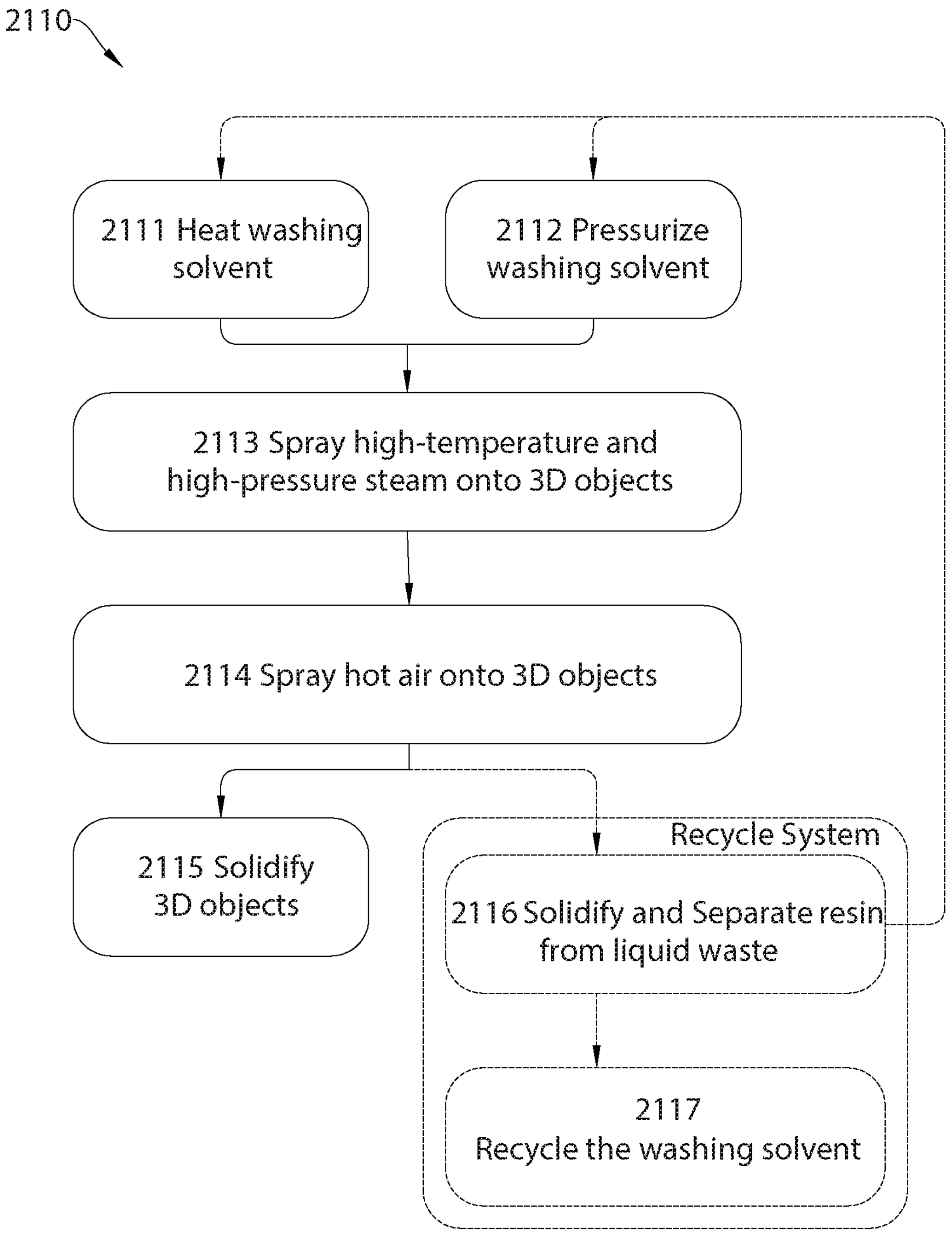
Figures 2, 21:
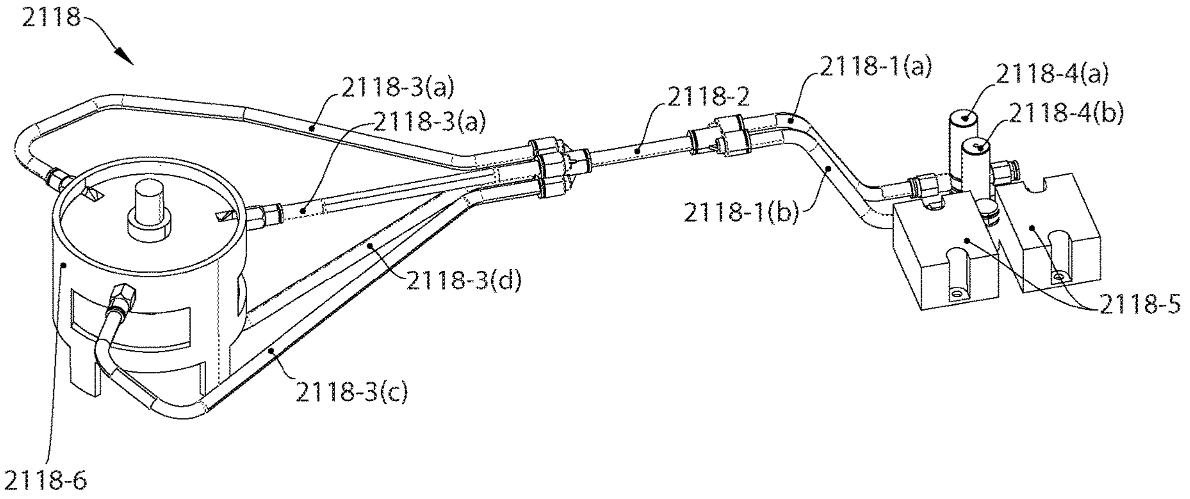
Figures 3, 21:
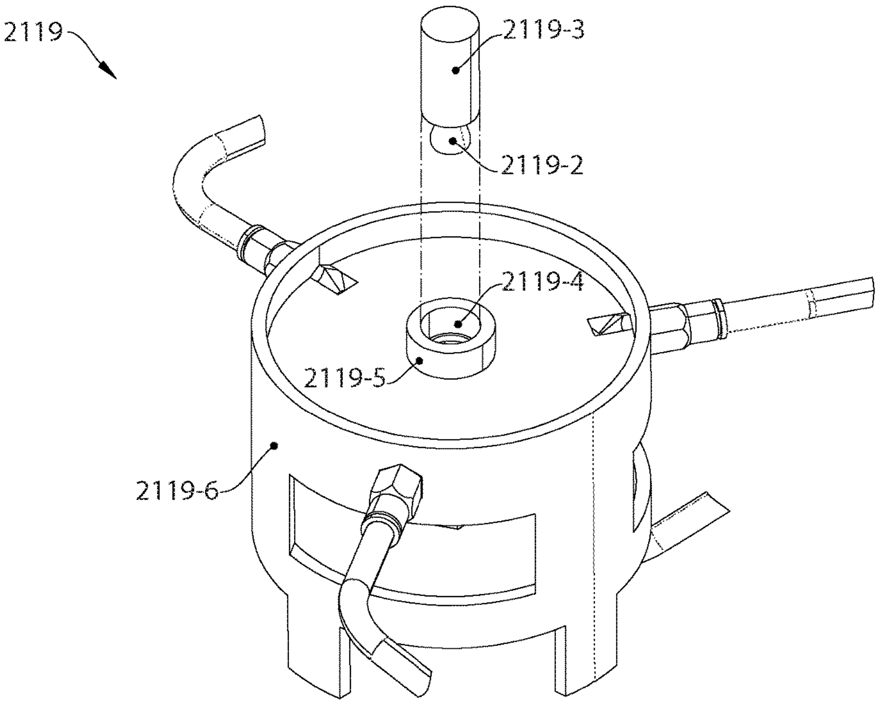
Figures 4, 21:
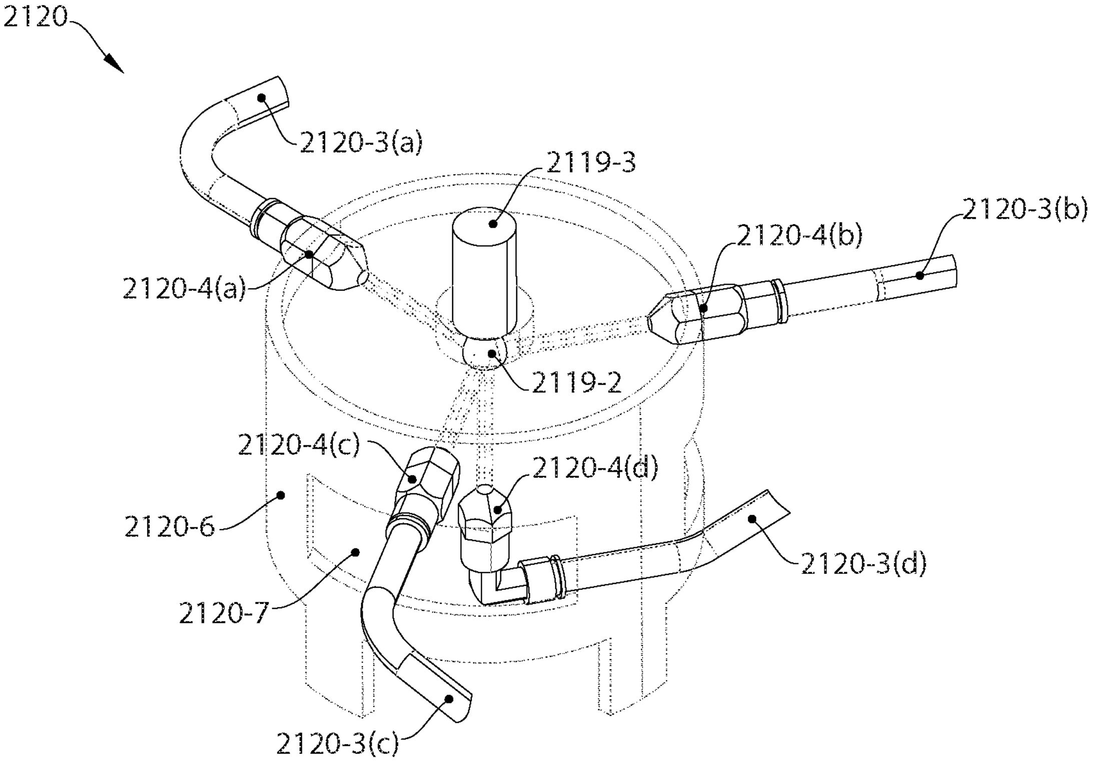
Figures 10, 21:
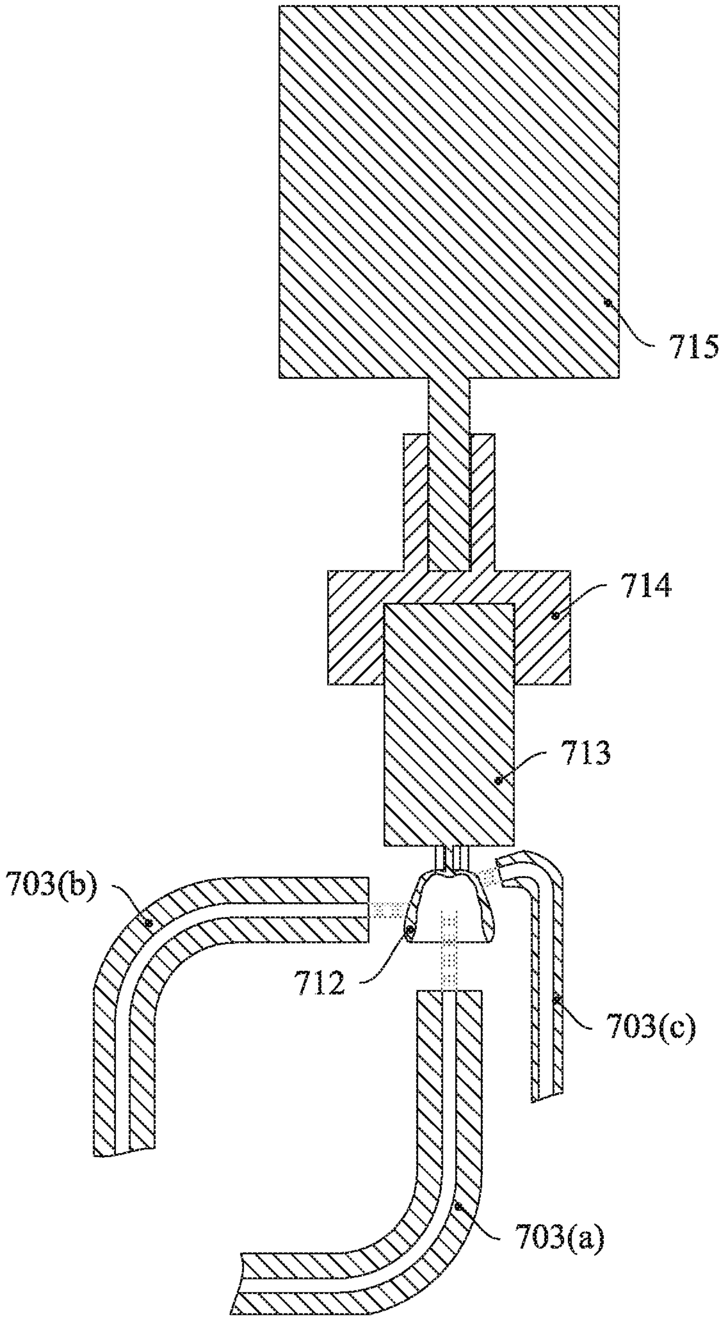

Now turning to the last figure, FIG. 21 illustrates a wash system adapted to receive a platform for a system for printing three-dimensional objects in accordance with exemplary embodiments of the present invention.

In exemplary embodiments, a system may include an ancillary wash component that is suitable for a platform component as discussed in this disclosure. That is, a wash device 2100 for washing off residual printing material off of a newly 3D-printed part (and platform) may be retrofitted or designed with an aperture 2101 adapted to register with a portion of a platform 1104 of a container assembly or cartridge in accordance with the present invention, thereby exposing the platform 1104 (and the attached 3D-printed object 1107, for example, to an interior chamber where the part may be exposed to a wash module 2102 for applying a solvent and or a light module 2103 for applying a post-curing exposure to post-cure the newly printed 3D-printed part.

In FIG. 21-1, exemplary steps of cleaning and solidifying 3D objects, as well as the step of recycling the cleaning solvent, are illustrated by way of method 2110 in accordance with embodiments of the present invention. Method 2110 may include the steps of: heating a washing solvent (2111); pressurizing the washing solvent (2112), so as to generate high-temperature and high-pressure steam in pipelines; and spraying high-temperature and high-pressure steam onto 3D objects (2113). The steams away a viscosity of the resin remains on the surface of the 3D object; the resin remains gradually decrease, and ultimately are removed from the surface of the 3D object by the steam.

In step 2114, hot air may be sprayed onto the 3D objects; despite the surface of the 3D object appearing clean of residual resin after exposure to the high-temperature and high-pressure steam, there is still a possibility that some resin may remain dissolved in droplets on the surface of the 3D object. Thus, hot air sprayed in step 2114 can blow off these droplets (and the residual resin in them) from the surface of the 3D object, and dry the 3D object clean.

At step 2115, after completing cleaning steps 2111 to 2114, the 3D objects may be solidified; the 3D object can be placed in a curing chamber for further curing in order to obtain a higher-performance 3D object. As mentioned with reference to FIG. 21, this step may be performed in a single device that includes a chamber for both exposing the 3D object to a cleaning protocol as well as a post-curing protocol—such as by way of post-curing lights, adequate heat, and the like. Alternatively, this step may employ use if a different post-curing device.

At step 2116, resin may be solidified and separated from any liquid waste; after the used washing solvent steam is cooled and condensed into liquid waste, the liquid waste may be placed in sunlight or a UV environment, where the resin is solidified, and the washing solvent is separated and recycled for reuse in the next washing process.

Accordingly, at step 2117, the washing solvent may be recycled.

FIG. 21-2 illustrates an exemplary structure of a cleaning device in accordance with the present invention. More specifically, device 2118 is shown in more exemplary detail, including a pipeline, comprising of three parts: an intake pipeline 2118-1, a mixing pipeline 2118-2, and a transmission pipeline 2118-3. In the part of the intake pipeline 2118-1, high-temperature steam, high-temperature and high-pressure air respectively are input through two separate intake pipelines 2118-1(*a*) and 2118-1(*b*); in the part of the mixing pipeline 2118-1, the high-temperature steam form the intake pipeline 2118-1(*a*), the high-temperature and high-pressure air from the intake pipeline 2118-1(*b*) are mixed together, to form high-temperature and high-pressure steam; In the part of the transmission pipeline 2118-3, the high-temperature and high-pressure steam from the mixing pipeline 2118-2 is respectively transferred to the transmission pipelines 2118-3(*a*), 2118-3(*b*), 2118-3(*c*), and 2118-3 (*d*), then it will enter cleaning chamber 2118-6 through nozzles from different angles.

Electromagnetic valve 2118-4 includes valves 2118-4(*a*) and 2118-4(*b*), configured to control the opening or closing of the intake pipelines 2118-1(*a*) and 2118-1(*b*), respectively. Relay 2118-5 may be configured to send commands to the electromagnetic valve 2118-4, to open or close the valve. Cleaning chamber 2118-6 may be where the cleaning steps 2113 and 2114 described with reference to FIG. 21-1, for example, are performed.

Turning now to FIG. 21-3, an assembly relationship between platform 2119-3 and cleaning chamber 2119-6 in cleaning device 2119 is illustrated, in accordance with exemplary embodiments of the invention. At the top surface of cleaning chamber 2119-6, there is a groove 2119-4 that matches the shape of platform 2119-3, the outer edge of the groove 2119-4 extends upward, to form groove body 2119-2. At the bottom of platform 2119-3, there is an 3D object that has been solidified and connected thereto by way of a printing or build process in accordance with the present invention; platform 2119-3 may be inserted into cleaning chamber 2119-6 by passing through the groove or aperture 2119-4.

Turning now to the next figure, FIG. 21-4 displays the schematic diagram of cleaning device 2120 in working, particularly displays the internal structure of cleaning chamber 2120-6. As mentioned earlier, after the high-temperature and high-pressure steam travels through transmission pipelines 2120-3(*a*), 2120-3(*b*), 2120-3(*c*), and 2120-3(*d*), it will be sprayed into cleaning chamber 2120-6 from different angles through nozzles 2120-4(*a*), 2120-4(*b*), 2120-4(*c*) and 2120-4(*d*), respectively. While the platform 2119-3 may be mounted to the pointed position, and the system received the "start" command from users, nozzles 2120-4 will spray steam flow to the 3D object 2119-2.

In addition, one or several windows 2120-7 may be provided on the side wall of the cleaning chamber 2120-6, to prevent steam flow from accumulating inside the cleaning chamber and causing high pressure, which may result in a decrease in the pressure of the steam flow sprayed from the nozzles 2120-4, or even prevent the steam from being sprayed out, thereby affecting the cleaning effect.

It should be noted that the cleaning chamber 2120-6 is typically located within a larger sealed chamber, after the steam flow is sprayed from the nozzles 2120-4 to clean the 3D object 2119-2, it may be transferred from the cleaning chamber 2120-6 to the outside through the windows 2120-7, but it always remains within the sealed chamber. And after the cleaning process is completed, the sealed chamber may be cooled down (or the steam flow will be transferred to a specific container first, and then be cool down), causing the steam containing residual resin to condense into liquid waste. In the next steps, the liquid waste may be further solidified and separated under the UV light or sunlight, and thereby the cleaning solvent may be separated from the liquid waste and recycled for further use.

Preferably, nozzles 2120-4(*a*), 2120-4(*b*), and 2120-4(*c*) are arranged on a same horizontal plane, and spaced 120° apart, spraying steam flow to the 3D object 2119-2. Besides, nozzle 2120-4(*d*) may be located directly below the 3D object 2119-2 and sprays steam flow upwards to the 3D object 2119-2. This nozzles arrangement can effectively clean the surface of the 3D object 2119-2, particularly clean a dental crown.

On to the next figure, FIG. 21-5 displays the top view of cleaning device 2121, it respectively displays the transmission pipeline 2121-3, and cleaning chamber 2121-6. FIG. 21-6 displays the sectional view of cleaning device 2121, at the area of A-A in FIG. 21-5, and particularly displays the partial enlarged drawing at B area. As shown in FIG. 21-6, the groove 2121-4 not only extends upwards to form the groove body 2121-2, and also extends inward to form step 2121-1, to support the platform 2119-3. But it's worth noting that the 3D object 2119-2 which is mounted on the bottom of platform 2119-3, will pass through the groove 2121-4 and enter into the cleaning chamber.

In exemplary embodiments, the groove body 2121-2 is designed high enough, for instance, the height of the groove body is ⅕ of the platform, or ¼, ⅓, ½, or even higher, in order to enhance the stability of the platform and its connected 3D object during the cleaning process. In exemplary embodiments, the inner diameter of the groove body and the outer diameter of the platform are designed to fit tightly together, such as in an interference fit, in order to enhance the stability of the platform and its connected 3D object during the cleaning process. In exemplary embodiments, the washing solvent during heating and pressurizing is water. In exemplary embodiments, the temperature of the steam flow at the nozzle is 110° C.~150° ° C., more preferably, the temperature is 120° C.~140° C., and even more preferably, the temperature is 130° C. In exemplary embodiments, the pressure of the steam flow at the nozzle may be 0.03 Mpa~0.2 Mpa, more preferably, the pressure is 0.05 Mpa~0.1 Mpa, and even more preferably, the pressure is 0.08 Mpa.

In exemplary embodiments, except the two electromagnetic valves in the intake pipeline, there are still four extra electromagnetic valves (not shown) are mounted on the transmission pipelines. These valves may be opened and/or closed in a certain sequence to clean the various surfaces of the 3D object step by step, thereby avoiding interference between the steam flows and improving the cleaning effect.

In some exemplary embodiments, such as illustrated in FIG. 21-8, FIG. 21-9, and FIG. 21-10, a cleaning device 2122 may be configured with a rotational structure. As shown in FIG. 21-8, in the cleaning process, the platform 713 and its connected 3D object 712 continuously rotate under the drive of motor 715. The platform 713 is connected to the output shaft of the motor 715 by the coupling sleeve 714.

In this exemplary embodiment, since the platform 713, and its connected 3D object 712 are able to rotate around the Z-axis continuously, it may not be necessary to arrange nozzles space a certain distance or angle(s) apart.

In this embodiment, the cleaning device 700 may include a nozzle (not shown, at the end of the transmission pipeline 703(*a*) at the bottom, and a nozzle (not shown, at the end of the transmission pipeline 703(*b*) at the side wall, to clean the bottom and the side of the 3D object 712. With the rotation of 3D object 712, the residual resin which remains on the side surface will be removed. If necessary, the cleaning device 700 may include a additional nozzle (not shown, at the end of the transmission pipeline 703(*c*), to clean the top of the 3D object 712.

FIG. 21-9, FIG. 21-10 respectively display the explosive view and sectional view of cleaning device 700, for reference. As shown in FIG. 21-10, the platform 713 and the output shaft of the motor 715 may be connected tightly together to the coupling sleeve 714, for instance, as an interference fit. Alternatively, mechanical locking methods such as threading, or keyway may also be used.

Although basic embodiments have been described above, here are some alternatively/optional embodiments: Optionally, the inner diameter of the pipeline may be 5 mm and the diameter of nozzle may be 1.8 mm to reduce the kinetic energy loss of the steam flow. The pipeline may be made of high-temperature and high-pressure resistant fluororubber to improve its service life. Optionally, the cleaning chamber may include several grooves, so as to clean several 3D objects together, and improve the cleaning efficiency. Alternatively, the groove(s) may be substituted to a cage (as disclosed on U.S. Ser. No. 11/279,089B2 by SprintRay, Inc), after users take down the several 3D objects, and put them into the cage, the cleaning device will spray steam flow to clean the 3D objects together, improving the cleaning efficiency. Optionally, the material of the cleaning chamber may be plastic or metal.

In exemplary embodiments, the washing solvent may be organic. In exemplary embodiments, the cleaning process may be completed without any solvents, relying solely on high-temperature and high-pressure air to achieve cleaning.

Optionally, the cleaning device may be modified to rotate the support base through the motor to drive the rotation of the platform. For example, a groove may be designed as a component that moves independently of the cleaning chamber and may be driven to rotate by the motor. The platform may be configured to rotate synchronously with the groove.

Turning now to the next figure, FIG. 22 illustrates an exemplary embodiment of a container assembly, specifically the body of the container assembly, that improves build or printing speed and streamlines the container assembly. More specifically, this embodiment is similar to the embodiment described with reference to FIG. 3-1 and FIG. 3-2, wherein the baseplate 112 forms the bottom portion of housing or body 11, which is preferably transparent; similarly, baseplate 112 may be, as explained above, substituted by a flexible film. As mentioned above, in exemplary embodiments of the present invention, the flexible film may be disposed over a top surface of the baseplate 112 (e.g., glass) so that the film and the baseplate 112 together form a bottom portion of body 11—this configuration of the hydraulic device results in an increase to the printing speed, but also facilitates transport as a single product (i.e., the container assembly functions as a printing material container, as well as a platform and printing material tank, all in one device or product). However, one potential drawback of this configuration is that disposing the flexible film over the baseplate 112 (e.g., glass) without any means to affix or steadily position the film, can result in an undesired deformation during interaction with fluid and or adherence forces during operation, which may result in the formation of an irregular surface of the film holding the printing material. If this occurs, the deformation may undesirably decrease the accuracy of the 3D-object and may even lead to a printing failure.

Accordingly, FIG. 22 illustrates an exemplary embodiment in which a binding material 2201 is applied between the film 17 and glass 112, so as to fix the film 17 tightly to the glass 112, and further prevent an otherwise creeping deformation. In some exemplary embodiments, the binding material 2201 may be one of a silicone adhesive (e.g., such as a PDMS adhesive), a UV adhesive, or any suitable transparent adhesive capable of affixing film 17 on top of glass 112.

FIG. 23-1 through FIG. 23-4 illustrate exemplary embodiments of pistons, and more specifically different shapes of pistons that may be employed in accordance with the present invention. For example, and in no way limiting the scope of the present invention, the embodiments shown and discussed with reference to FIG. 5 and FIG. 10 show a generally cylindrically shaped piston that forms platform 1004. In some exemplary embodiments, as illustrated by FIG. 23-1 through FIG. 23-3, other shapes may be employed. These other shapes, some polygonal, other oval, rectangular, oblong, or having diverse dimensions such as the shape shown in FIG. 23-2, may provide an advantage of preventing tiny rotations inside the container assembly which may undesirably cause a series of uncontrolled consequences, for example, decrease in 3D-object accuracy or even failed printing altogether.

Accordingly, in some exemplary embodiments, regular prismatic structures may be employed, for example, pentagonal prism, hexagonal prism, tetragonal prism, and the like. Notably, a traditional O-ring seal maybe not be suitably employed with these shapes. Similarly, FIG. 23-2 shows a regular prismatic structure also, the terms of "regular" specifically means the cross section is a simple geometric shapes, and the sectional area is easy to calculate; the benefit of this configuration is that a manufacturer may ensure and adjust the relative sectional area conveniently between the first chamber and the second chamber. In FIG. 23-2, an elliptic cylinder piston is provided; this shape is not only useful for preventing an undesired rotation, but it is also adapted to apply a more typical O-ring seal. FIG. 23-3 shows an irregular prismatic structure having a water-drop shape; this shape may be more in line with an ornamental industrial design for a piston in accordance with the present invention. FIG. 23-4 illustrates a series of pistons that complement the cross-sections illustrated in FIG. 23-1 through FIG. 23-3.

FIG. 23-5 illustrates exemplary guiding structures that may be employed in accordance with the present invention. More specifically, this view shows an exemplary guiding structure or structures 2301 that may be disposed or formed on a contact surface between a side wall of a chamber and a piston; this configuration assists in the prevention of an undesirable rotation of the platform—thus in some exemplary embodiments of the present invention, a guiding or an anti-rotation structure may be provided along a surface of a support structure such as a piston or platform, or walls upon which these structures register with, in accordance with the present invention. As shown in FIG. 23-5, the guiding structure 2301 may be included as several raised linear ribs on a piston outer surface, and or several linear grooves on the chamber.

Figures 1, 24:
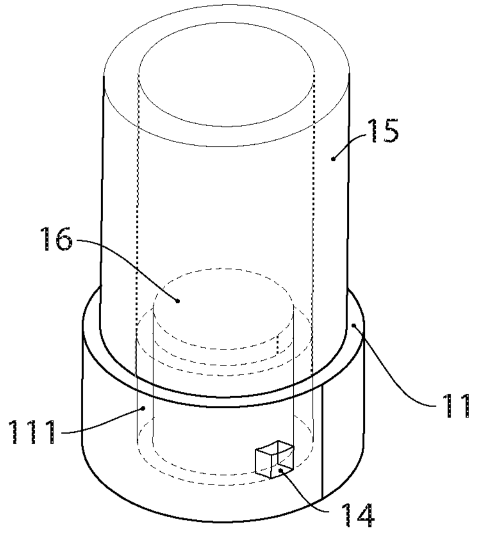
Figures 3, 24:
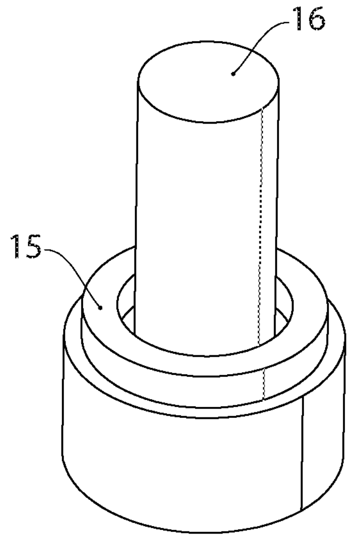
Figures 2, 24:
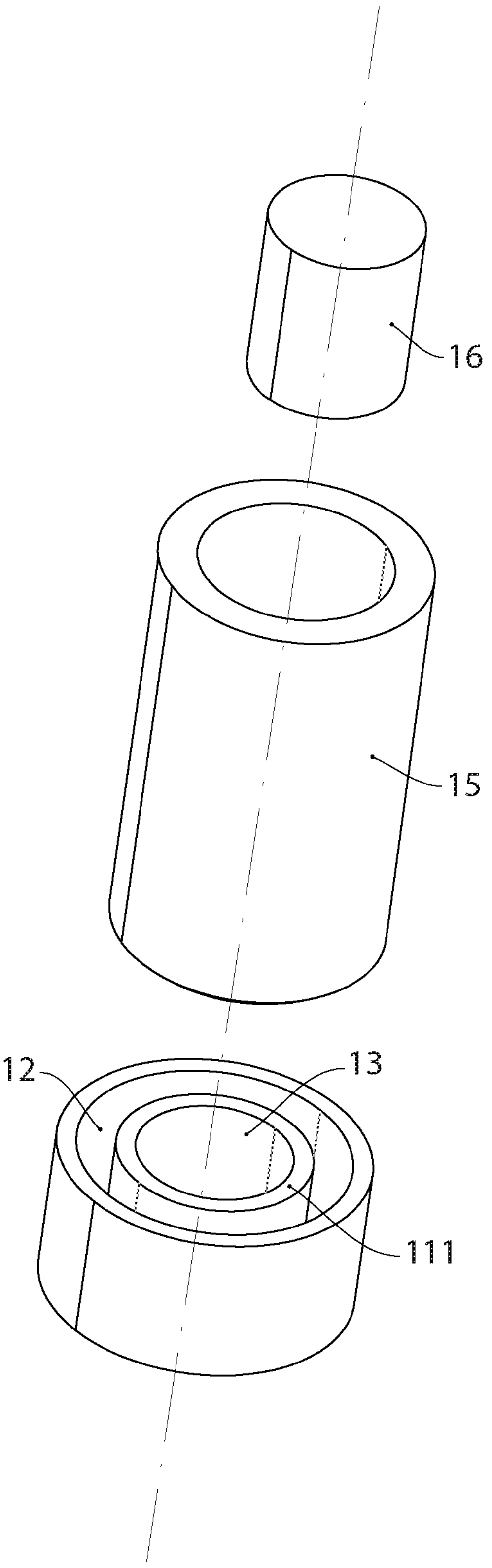
Figures 4, 24:
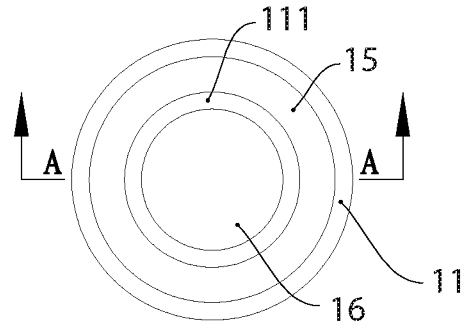
Figures 5, 24:
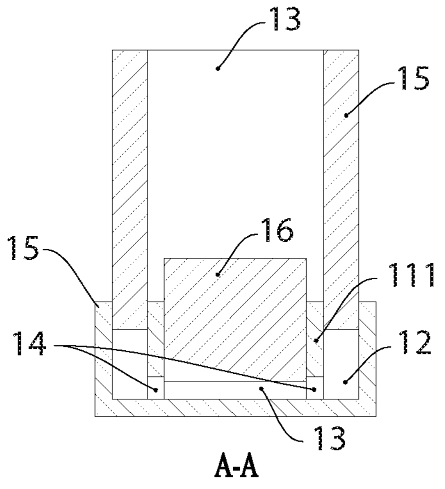
Figures 6, 24:
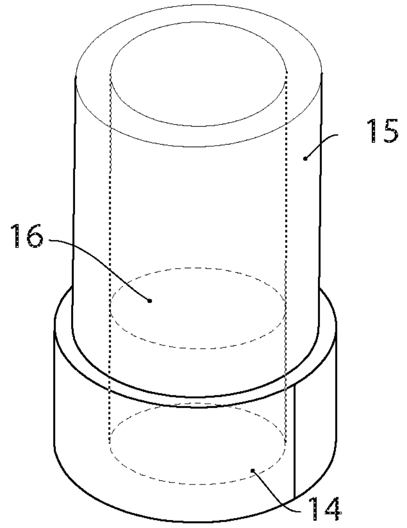
Figures 7, 24:
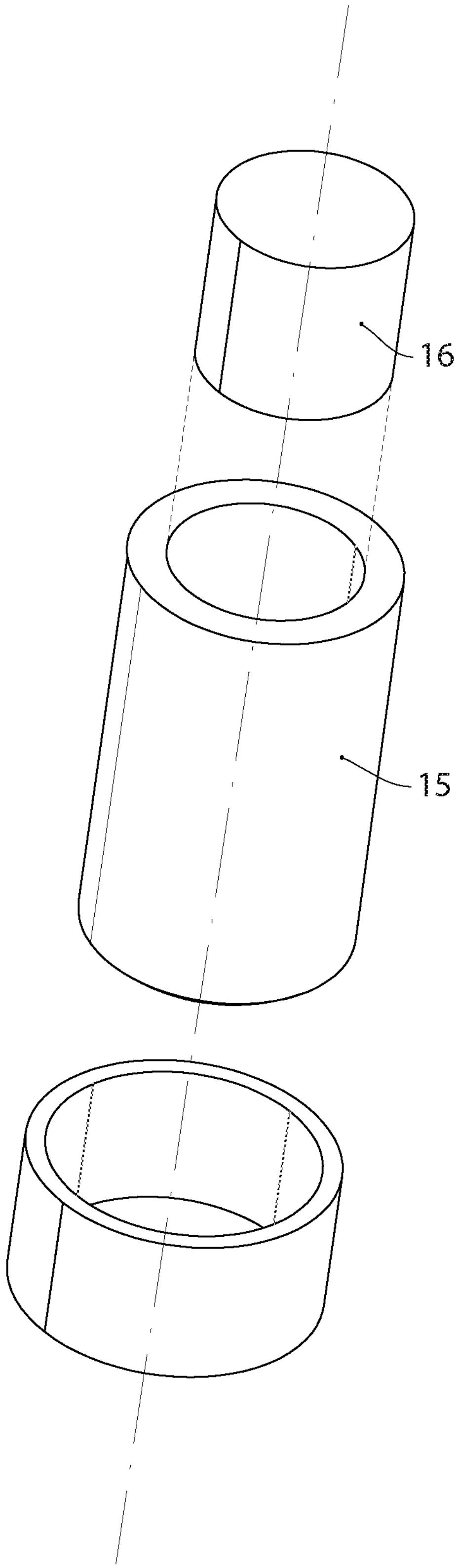
Figures 8, 24:
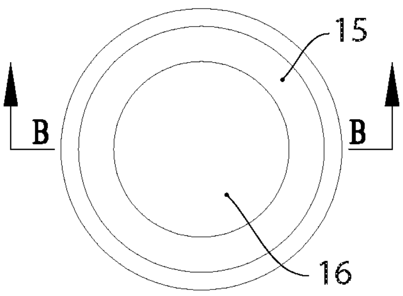
Figures 9, 24:
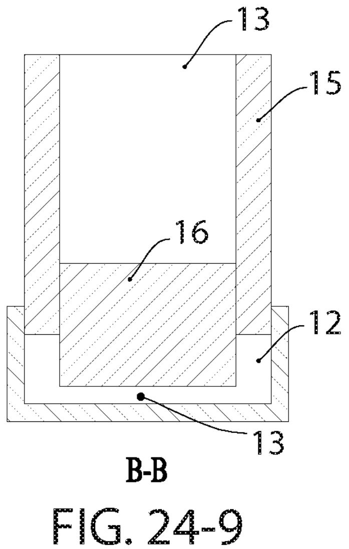

FIG. 24-1 through FIG. 24-3 illustrate a container assembly body configuration in accordance with some exemplar embodiments of the present invention. More specifically, this view shows another embodiment of a container assembly or hydraulic device in accordance with the present invention. In this exemplary embodiment, a platform 16 resides inside of the piston 15, wherein the piston 15 and the platform 16 are concentrically positioned; the piston 15 formed as a hollow cylindrical structure that receives the platform 16 slidably inside. Both the piston 15 and the platform 16 reside inside a housing 11 that houses the entire structure. The body of the hydraulic device is generally a hollow structure, and the hollow area is divided into O-ring shaped chamber 12 (namely a standby resin or printing material chamber) and printing chamber 13 by the divider 111. One or more channels, such as channel 14, may be formed at the bottom of divider 111 to fluidly communicate chamber 12 and chamber 13. In exemplary embodiments, a seal structure as described in embodiments above may be employed, and the platform may have varying shapes as described previously. In some exemplary embodiments, the divider 111 may not be included so that the hollow area may form an undivided chamber; that is, there is no division forming a standby chamber 12 and a printing chamber 13.

Instead, platform 16 may be out of the piston 15, and a 3D-object can be cured beneath the O-ring shaped lower surface of the platform 16. Both the design shown in FIG. 24-1 and FIG. 24-3 are beneficial to reduce the size of the hydraulic device, and allow for the arrangement and use of more devices on a base support (as described with reference to FIG. 20). FIG. 24-4 through FIG. 24-5 illustrate cross-sectional views of the container assembly body configuration in accordance with the embodiment shown in FIG. 24-1. FIG. 24-6 through FIG. 24-9 illustrate a container assembly body configuration in accordance with the embodiment shown in FIG. 24-1, except that this configuration excludes the use of divider 111; instead, the chambers 12 and 13 are formed by tightly positioned piston 15 and platform 16. As with the previous embodiment, chamber 13 can extend to an area or cavity formed between the outer concentric cylinder forming piston 15 and the piston 16 moving along a length of the piston 15 and thus allowing printing material to be transferred into this region or chamber 13 therein.

Figure 25:
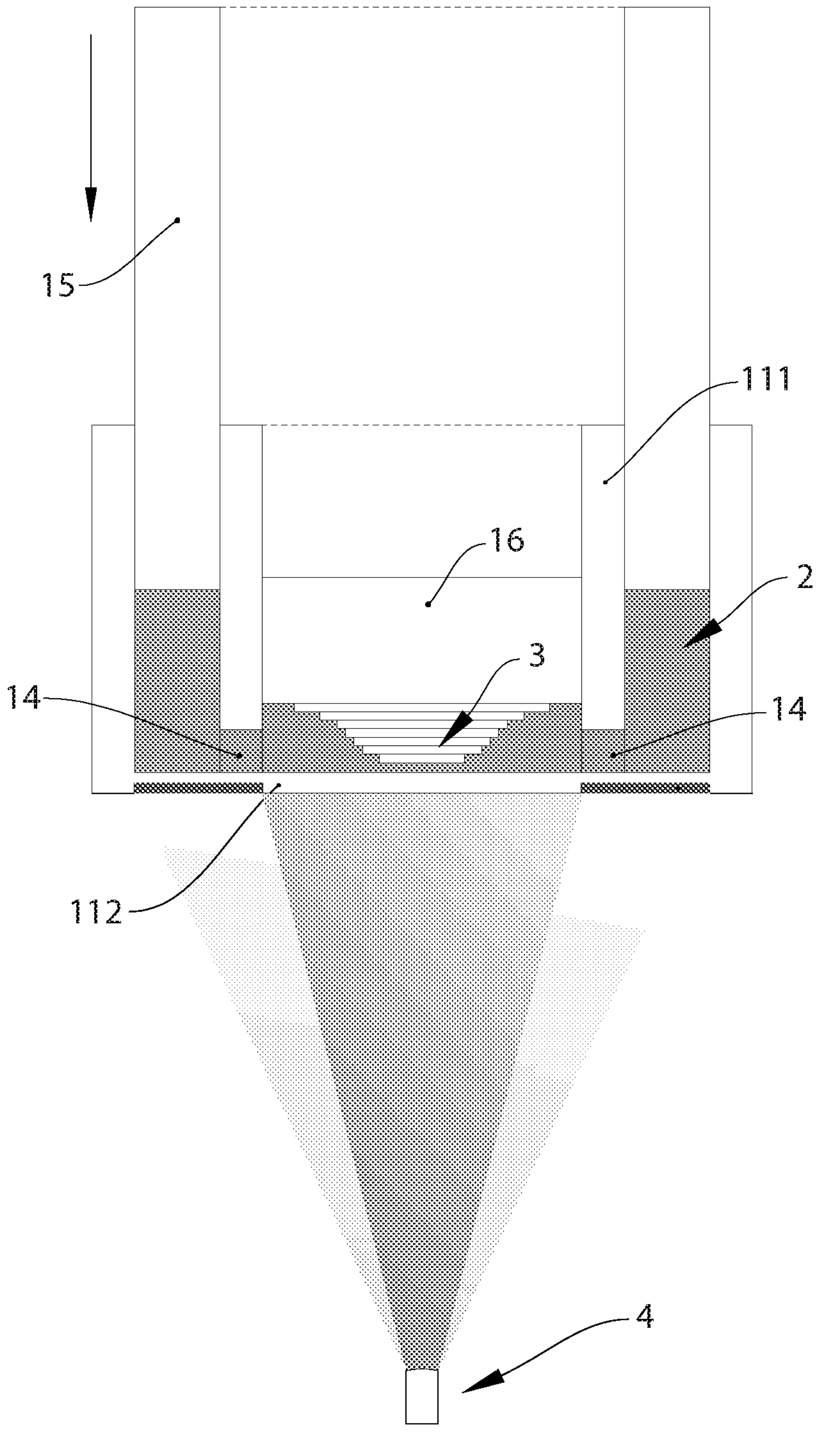
FIG. 25 illustrates a system in accordance with some exemplary embodiments of the present invention.

FIG. 25 illustrates a system in accordance with the exemplary embodiments similar to the embodiments shown and described with reference to FIGS. 24-1-24-2.

Figure 26:
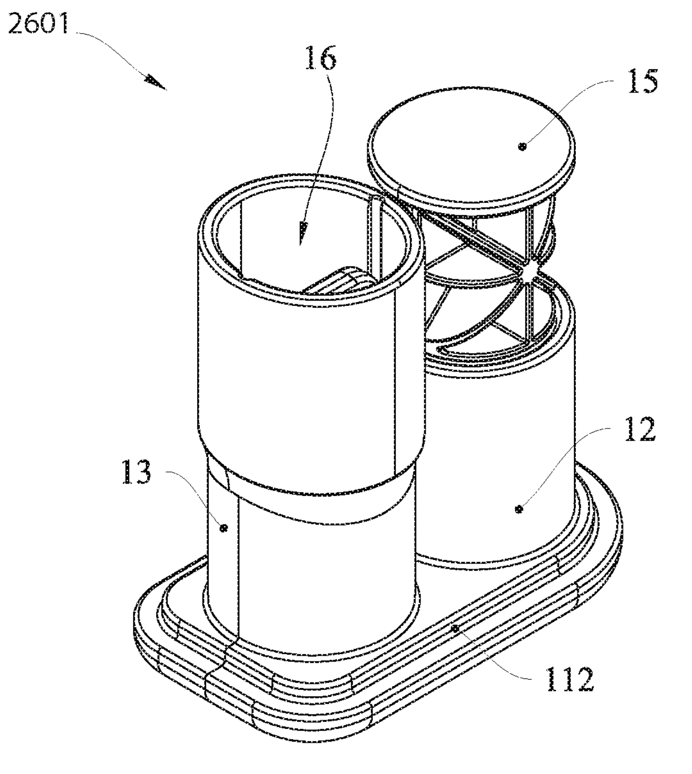
FIG. 26 illustrates an exemplary hydraulic printing device or container assembly.
Figures 27, 28:
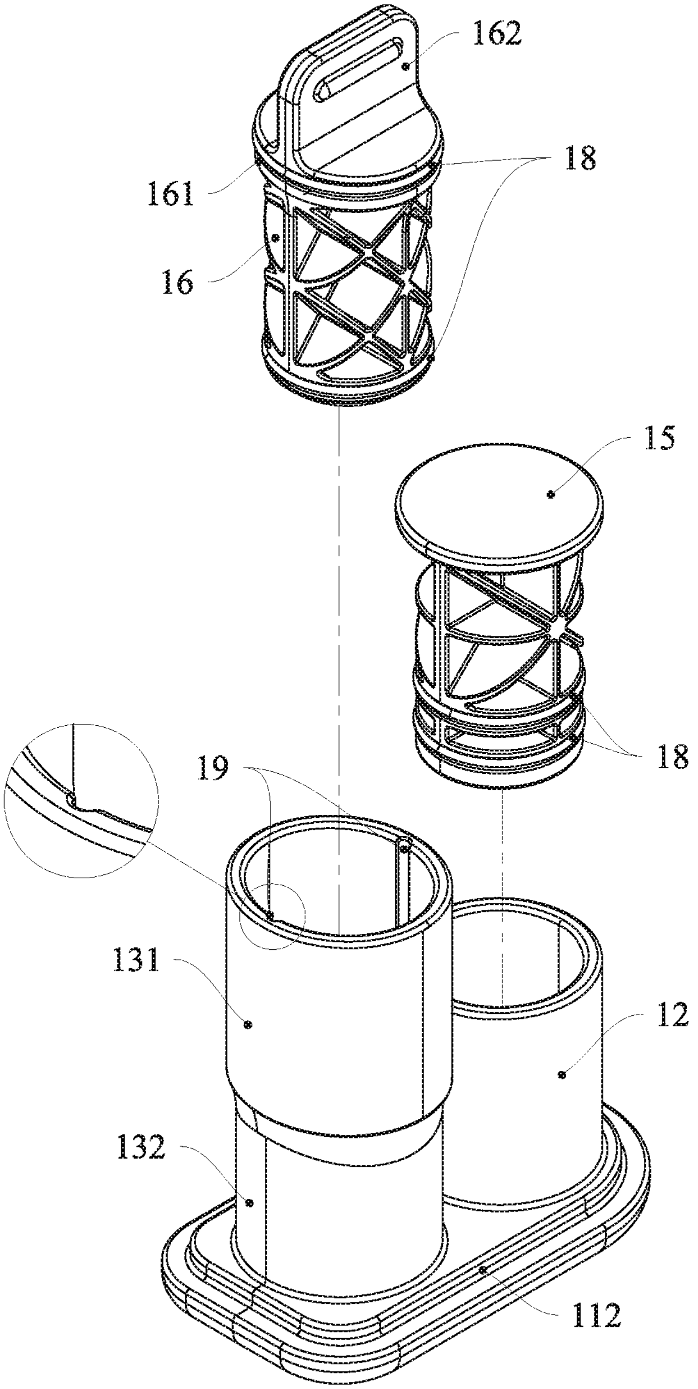
FIG. 27 illustrates an exploded view of the container assembly in FIG. 26.
FIG. 28 is a close-up view of one of the chamber walls of the container assembly in FIG. 26.

Turning now to the next figure, FIG. 26 illustrates an exemplary hydraulic printing device, or container assembly 2600, which includes several structures that facilitate an anti-rotational function—that is, prevent its components from rotating in an undesirable manner; FIG. 27 illustrates an exploded view thereof; and FIG. 28 is a close-up view of a structure along a chamber side wall that facilitates an airflow in order to allow movement in spite of any negative pressure resulting from the printing process.

In some exemplary embodiments, container assembly 2600 includes piston 15, a platform 16, chambers 12 and 13, a baseplate 112, and several seal rings 18, just as the previous embodiments described. However, in exemplary embodiments, such as the one shown in these views, a body of the chamber 13 further includes an anti-rotation portion 131, which may be formed as a non-cylindrical cavity. For example, and without deviating from or limiting the scope of the present invention, chamber 13 may include a first portion with a circular cross-section extending a first length along an axis of the chamber, and a non-circular cross-section extending a second length along the axis of the chamber; by way of example, the second length may have an elliptical cross-section. Furthermore, the platform 16 may include a corresponding structure; this may comprise of an elliptically shaped cap 161 to ensure that the platform 16 cannot rotate during the printing process, but a cylindrical body (i.e., a body with a circular cross-section) to ensure that the platform snuggly registers with the portion of chamber 13 that has a circular cross-section.

As with the embodiments described above, container assembly 2600 may be a single-use cartridge; that is a, a type of disposable cartridge that may be used but a single time, and then the empty cartridge may be thrown away, or preferably recycled, or sent to a service provider to be refilled. In other exemplary embodiments, the container assembly 2600 may be a cartridge that is not necessarily disposable and may be refilled by an end-user, to be used again.

In exemplary embodiments, in order to conveniently control the relative sectional area, and to ensure the sealing effort, the main body of the platform 16 is still set as a cylinder, and cooperates with the cylindrical shaped portion 132 of the chamber's body to seal. In some exemplary embodiments, the relative sectional area of the chamber 12 and the chamber 13 may be 1:1. In exemplary embodiments, a top portion of the platform 16 may include a cap 161, which may further include a handle portion 162 adapted for an end-user to easily pull out the platform 16 after a printing process is complete, in order to expose the 3D-printed part built onto a build surface of the platform 16 as discussed above.

In exemplary embodiments, container assembly 2600 is a one-time use, or disposable (i.e., may be recyclable) cartridge, which is defined in part by a unitary housing that houses the multiple chambers adapted to hydraulically transfer a printing material from a first chamber wherein the printing material is primarily stored, to a second chamber where a layer of the printing material may be disposed over a platform within the second chamber for building a 3D object thereon. In exemplary embodiment, the unitary, single-use or disposable cartridge, comes prefilled with the printing material, such as a photosensitive resin, that is stored and sealed inside the cartridge until it is unsealed prior to or during use of the cartridge. After the 3D object is built onto the platform, the 3D object is removed from the platform the cartridge may be disposed of.

Container assembly 2600 facilitates introduction of the building material for the 3D object into the build chamber 16 through the application of pressure; for example, a positive pressure (i.e., in this case a positive pressure applied to piston 15) facilitates the introduction (or transfer) of the build material into the build chamber 16 where it is exposed to the curing light. The other structures employed (such as the non-cylindrical portions, the negative pressure cavity, or the air vents 19 in this exemplary embodiment) are adapted to ensure a sealed, controlled environment, which both protects the efficacy of the building material prior to use, as well as facilitate the design of the additive manufacturing system. Of course, as is evidence from this disclosure and the embodiments discussed throughout, introduction of the build material may be achieved by pushing or pulling a structure, by pressing down or pressing up, by injection or my squeezing, or may any other means of applying a pressure in order to transfer, move, inject, or otherwise introduce the build material into the build chamber of a controlled environment.

Figure 29:
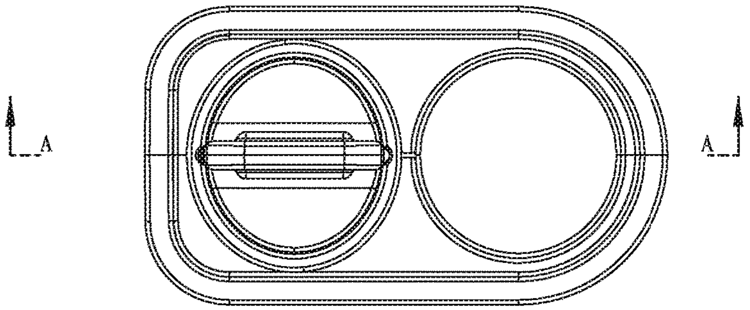
FIG. 29 illustrates a top view of an exemplary container assembly in accordance with the present invention.
Figure 31:
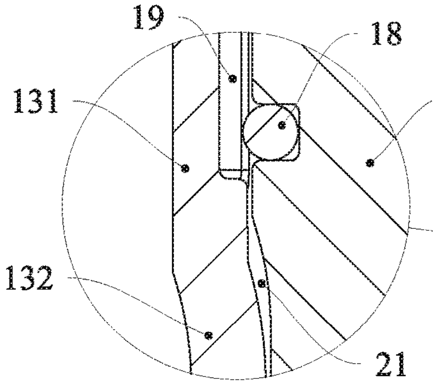
FIG. 31 illustrates a closed-up view of an exemplary container assembly or cartridge in accordance with the present invention.
Figure 30:
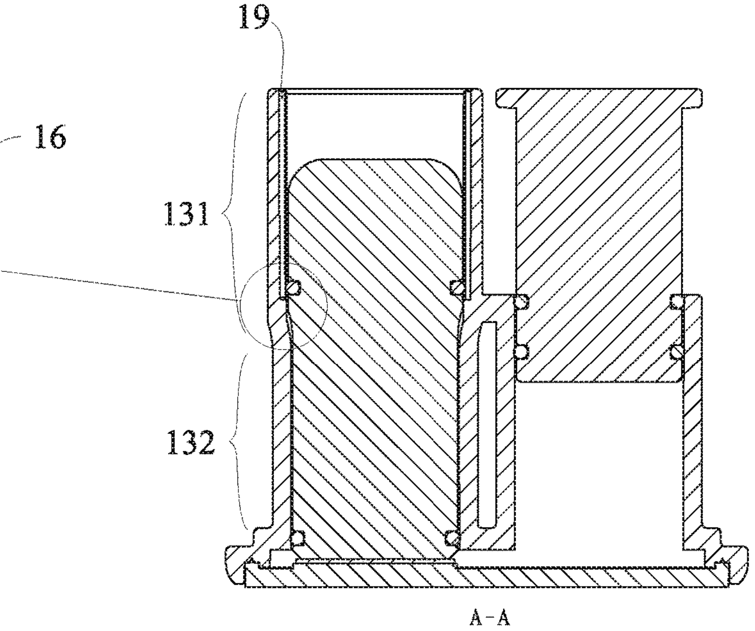
FIG. 30 illustrates a cross-sectional view of an exemplary container assembly in accordance with the present invention.

FIG. 29 illustrates a top view of the cartridge or container assembly 2600; FIG. 30 illustrates a cross-sectional view thereof; and FIG. 31 further illustrates a closed-up view of a side wall with a structural component adapted to eliminate or minimize undesirable effects of a negative pressure that may be formed inside a cavity of chamber 13.

As depicted in FIG. 29 and FIG. 30, due to the different shape of cap 161 and the main body of the platform 16, during the printing process, while the platform 16 is actuated upward, a negative pressure cavity 21 may be formed at the junction of the anti-rotating portion 131 and the cylindrical shaped portion 132 (i.e., with a circular cross-section). Negative pressure will undesirably block the movement of the platform 16, and affect the printing process; to solve the problem, the anti-rotation portion 131 provides several vertical linear air vents 19 to facilitate the flow of air, as shown in the close-up view of FIG. 28.

Accordingly, a container assembly for printing a 3D object in accordance with the present invention, may include: an enclosure housing a first chamber adapted to store a printing material and a second chamber adapted to receive a platform; a channel within the enclosure connecting a side wall of the first chamber with a side wall of the second chamber so that the first chamber and the second chamber are in fluid communication; and a structure, movable within the first chamber adapted to transfer a portion of the printing material from the first chamber to a printing area between a surface of a window and the platform in the second chamber for receiving a curing light for curing a layer of the printing material onto the platform or onto a cured layer of the printing material on the platform, in order to build the 3D object on the platform.

In some embodiments, the second chamber is adapted to limit or prevent a rotation of the platform; the second chamber may be a non-cylindrical chamber or have structures that prevent or limit the platform from rotating. The second chamber may include a circular cross-section extending a first length along an axis of the second chamber, and a non-circular cross-section extending a second length along the axis of the second chamber.

The platform may include a cylindrical portion adapted to register with the circular cross-section extending the first length along the axis of the second chamber. The platform may further include a portion that has a non-circular cross-section adapted to register with the non-circular cross section of the second chamber. In exemplary embodiments, the platform includes a seal adapted to hermetically seal the cylindrical cross-section extending the first length along the axis of the second chamber. In some exemplary embodiments, the second chamber includes one or more structures along one or more side walls adapted to alleviate a negative pressure during a movement of the platform—for example a negative pressure cavity and or air vents or the like along the one or more side walls of the second chamber.

In one exemplary embodiment, a container assembly for printing a 3D object, may include: a single-use enclosure housing a first chamber adapted to hermetically store a printing material and a second chamber adapted to receive a platform, wherein the second chamber is adapted to limit or prevent a rotation of the platform; a channel within the single-use enclosure connecting a side wall of the first chamber with a side wall of the second chamber so that the first chamber and the second chamber are in fluid communication; and a structure, movable within the first chamber adapted to transfer a portion of the printing material from the first chamber to a printing area between a surface of a window and the platform in the second chamber for receiving a curing light for curing a layer of the printing material onto the platform or onto a cured layer of the printing material on the platform, in order to build the 3D object on the platform.

Turning now to the next set of figures, FIG. 32-FIGS. 36-1, 36-2, illustrate an exemplary embodiment of a system in accordance with the present invention, which may provide improved effective sealing performance and fit, obviating the need for additional seals, and providing smoother linear movement and reducing resistance forces during a printing job.

In the exemplary embodiments shown in these views, system 3200 is disclosed; system 3200 may employ a printing device that includes a static support structure, such as a hoop or arm 8, which is adapted to support an actuating or moving device that is adapted to actuate or move a piston of a container assembly or cartridge 3201, in accordance with the present invention. In exemplary embodiments, the piston may be threaded to engage with the cartridge 3201. The piston may be connected to an output shaft of a moving unit, for example a device with a motor, such as—without limiting the scope of the present invention—a stepper motor; or the piston may be connected to the stepper motor via a connector. In addition to moving along a longitudinal axis of the chamber, the piston may be further adapted to rotate with the stepper motor and move downward, for example, although not necessarily, synchronously with the motor, in order to transfer a photosensitive resin, or printing material, from chamber 12 to chamber 13 within the cartridge 3201.

Figure 32:
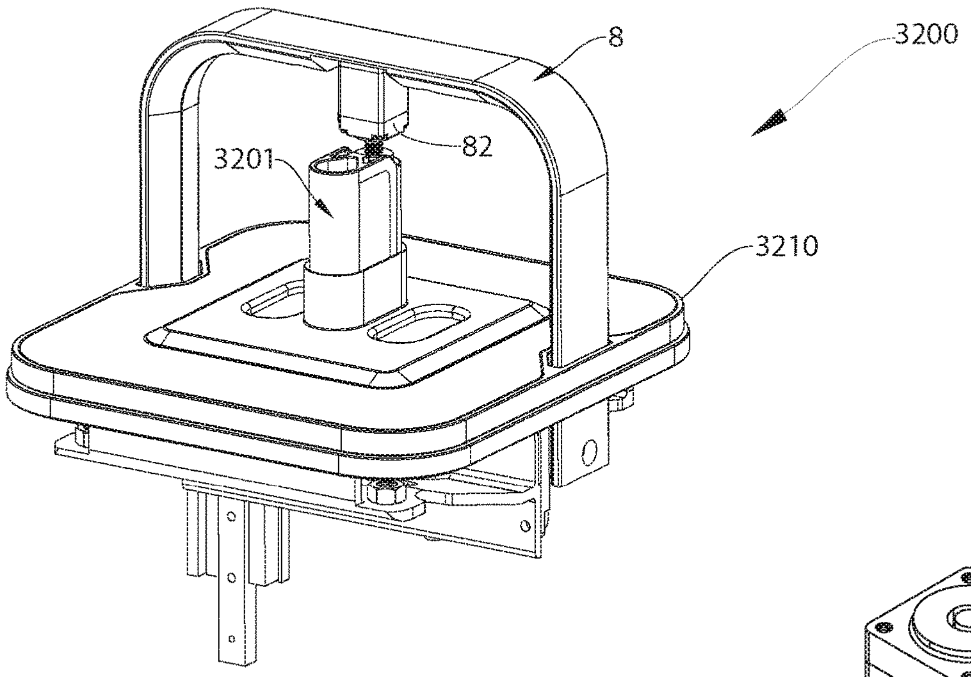
FIG. 32 illustrates an isometric side view of a portion of a 3D printing device in accordance with the present invention.
Figure 33:
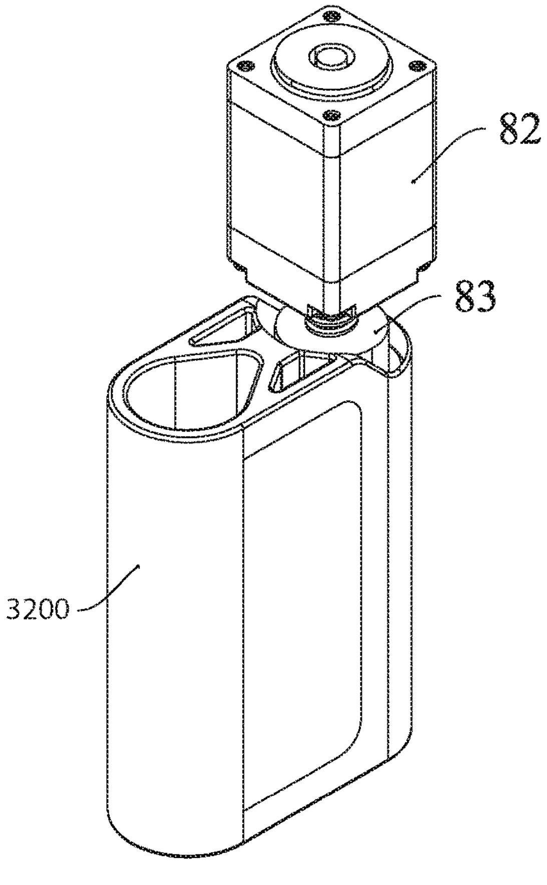
FIG. 33 illustrates a container assembly coupled to an actuator in accordance with some exemplary embodiments of the present invention.

FIG. 32 illustrates an isometric side view of 3D printer 3210 with cartridge 3201 coupled thereto, on a support surface of the 3D printer 3210. FIG. 33 illustrates cartridge 3201 coupled to actuator 82 in more detail. As depicted in FIG. 32 and FIG. 33, the 3D printer 3210 includes arm 8—by way of a non-limiting example shown as a hoop support structure onto which motor 82 may be coupled to and secured. A connector 83 may be employed to efficiently transmit torque from the motor's output shaft to the cartridge 3201 to facilitate the rotation of the piston. It should be understood that, in some cases, the use of connector 83 may not be essential, the piston of the hydraulic printing device may be instead directly connected to the output shaft of the motor 82.

Figure 34:
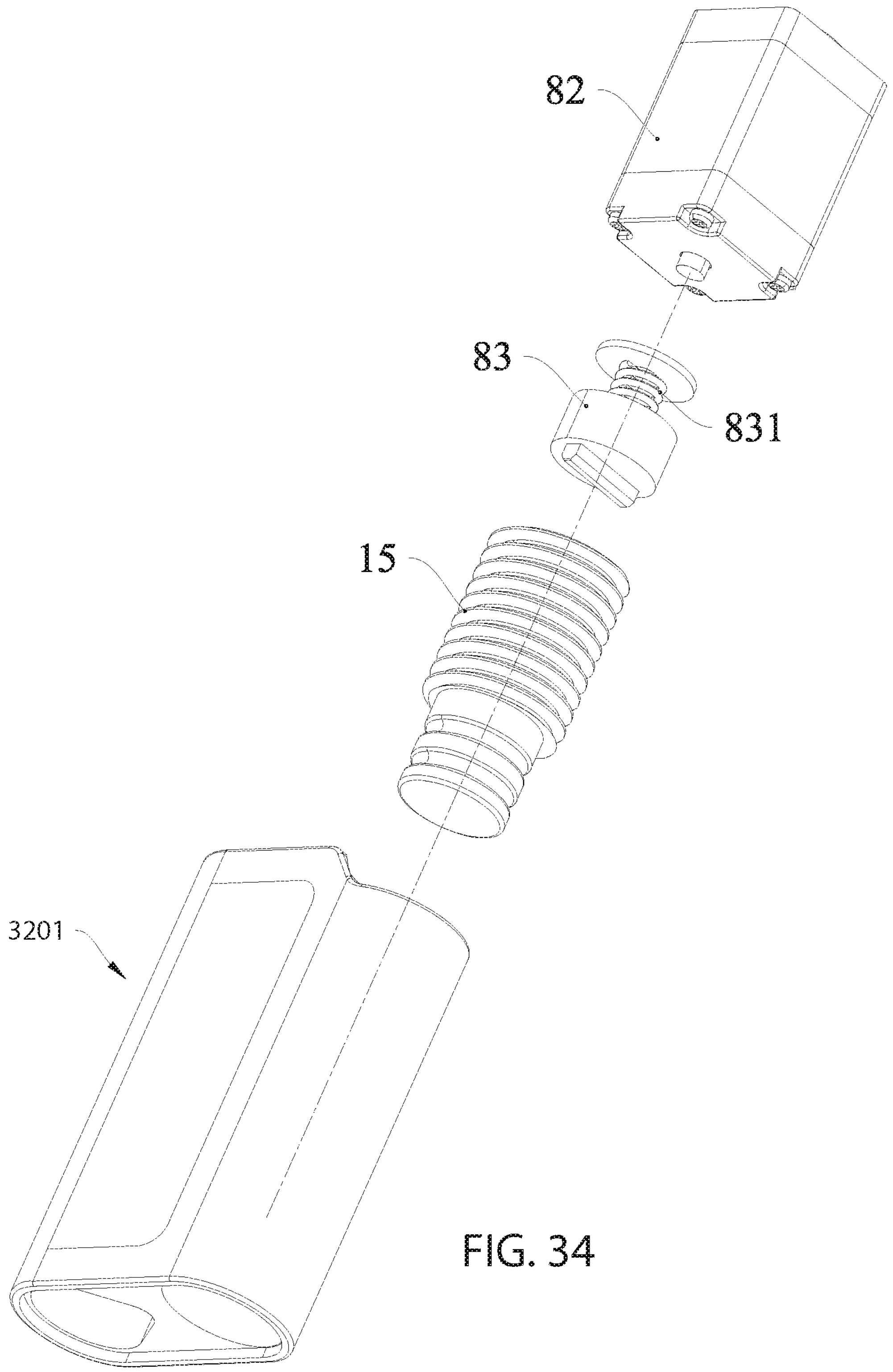
FIG. 34 illustrates an exploded view of a container assembly in accordance with some exemplary embodiments of the present invention.
Figure 35:
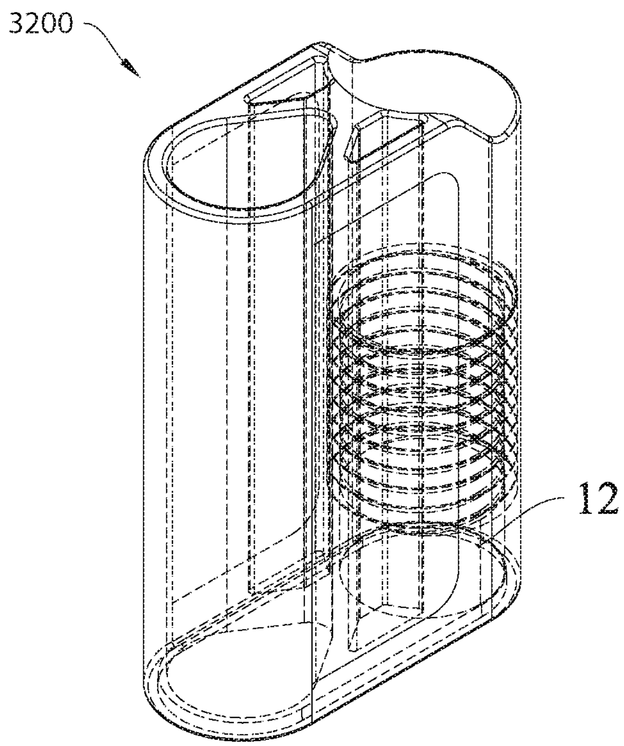
FIG. 35 illustrates a transparent view of a container assembly in accordance with some exemplary embodiments of the present invention.
Figures 1, 36:
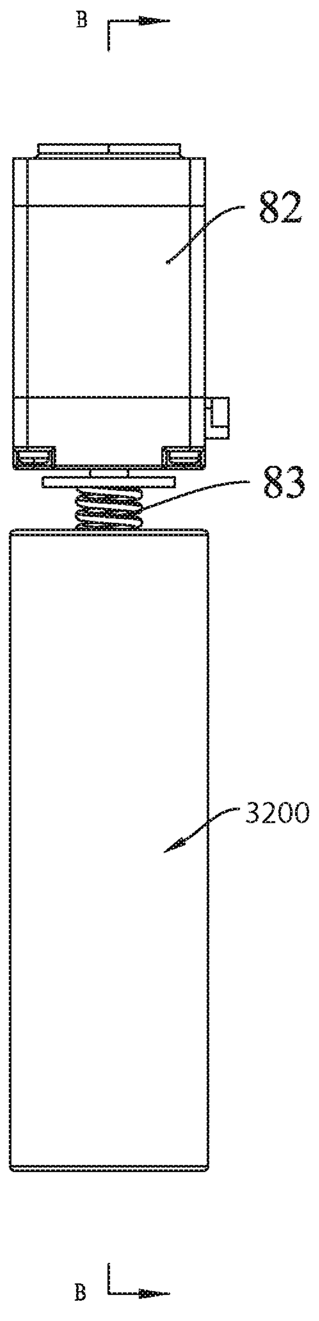
Figures 2, 36:
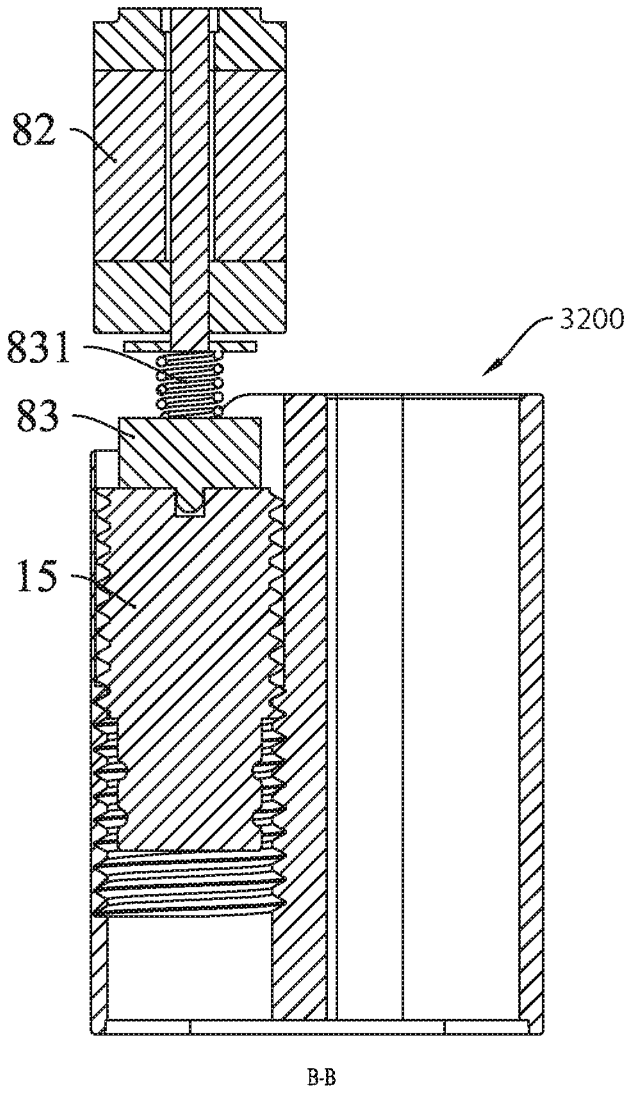

FIG. 34 illustrates an exploded view of cartridge 3201. FIG. 35 illustrates a transparent view of cartridge 3201, without the piston; FIG. 36-1 and FIG. 36-2 illustrate a side view and a cross-sectional view thereof. As depicted in these views, cartridge 3201 may include a threaded piston 15 and a threaded chamber 12, the piston 15 arranges one or several groove(s) at its upper portion, designed to interface with a convex edge of the connector 83; the device's platform is not shown in these views.

In exemplary embodiments of system 3200, the structural component securing the motor adapted to move piston 15—for example arm 8—remains stationary, while the connector 82 further includes a spring 831 to exert pressure on the piston 15, thereby facilitating the z-axis linear motion of the piston 15. Prior to initiating the printing process, the spring 831 may be pre-compressed to ensure optimal performance. During the printing process, as the motor 82 rotates, it impels the piston 15 along the threaded path, with the spring 831 continually exerting force on the piston, gradually releasing tension until the printing is completed. Preferably, the motor may be a stepper motor.

In some alternative embodiments, the connector 83 or its spring 831 may be omitted. Instead, another stepper motor may be employed to facilitate the piston's movement along the z-axis. Nevertheless, the motor 82, the threaded piston 15, and the threaded chamber 15 may still work as above.

Figure 37:
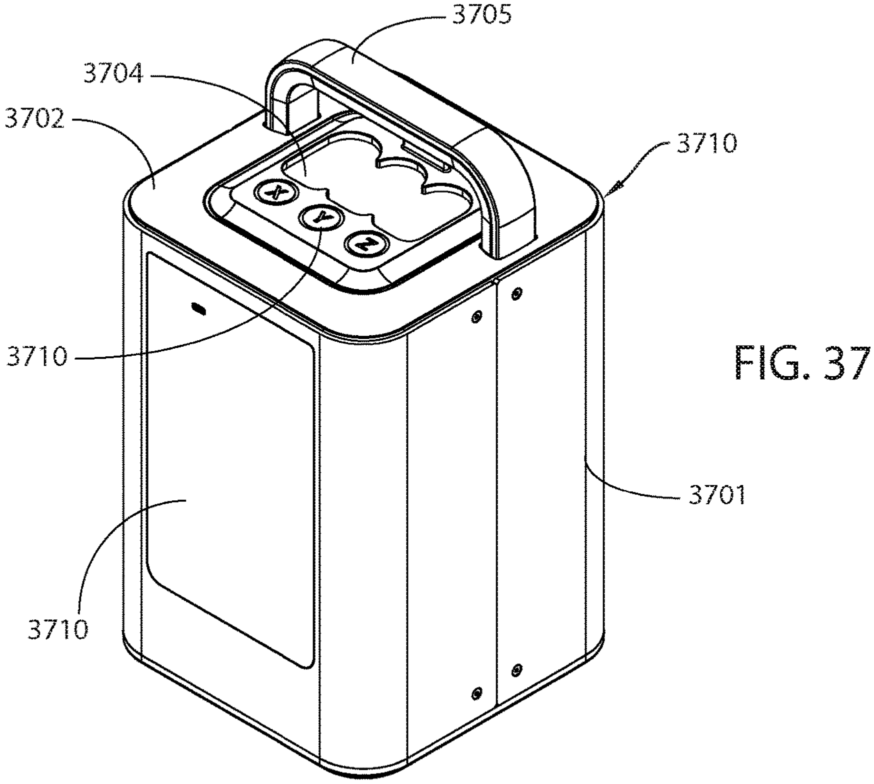
FIG. 37 and FIG. 38 illustrate a 3D printing system in accordance with some exemplary embodiments of the present invention.
Figure 38:
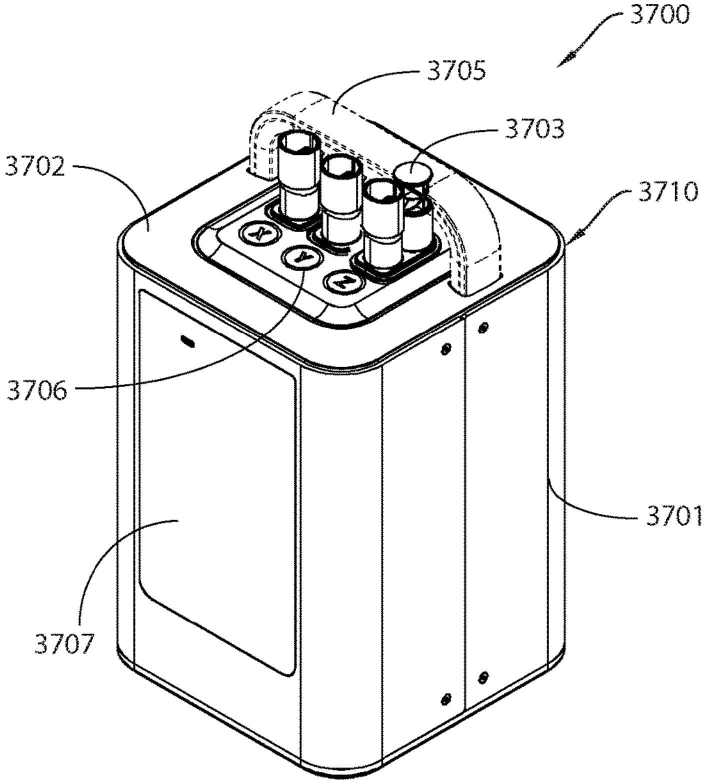

Turning now to the next set of figures, FIG. 37 and FIG. 38 illustrate system 3700, which includes a 3D printing device 3710 that employs a dynamic support structure adapted to move a structure on a container assembly for printing a 3D object, which may be a single-use or disposable cartridge. This embodiment is similar to the embodiments of FIG. 17, FIG. 18, and FIG. 19, whereby the 3D printing device 3710 includes a housing 3701 with a base or support surface 3702 that is generally on a top region of device 3710, which is configured to receive one or more container assemblies, such as container assembly 3703. The support surface 3702 is adapted to include a transparent base or have at least a transparent portion 3704 to enable a curing light module (not shown in this view) housed inside housing 3701 to direct a curing light into a printing area of the container assembly or container assembly 3703. Support surface 3702 may have a region that optionally, although not necessarily, registers with a base portion of container assembly 3703; this may be useful to secure container assembly 3703, and multiple other similar container assemblies or 3D-printing cartridges, to 3D printing device 3710 during a printing process, so that each container assembly or cartridge is secured and does not undesirably move to disrupt the printing process—i.e., enabling the curing light to be accurately projected during the printing process.

Moreover, a dynamic or movable structure, such as a moving or actuating arm or hoop 3705 is adapted to move a structure, for example a piston, of the container assembly in a manner as with the embodiments discussed above; that is, 3D printing device 3710 employs hoop 3705 instead of motor 83, in order to facilitate the 3D printing process—i.e., as may be appreciated from FIG. 38, when hoop 3705 is moved downwards, thereby pressing down on each piston of the one or more cartridges that may be secured to support surface 3702 of 3D printing device 3710, 3D printing material stored in the one or more cartridges is transferred into each chamber of each cartridge, disposing at least a layer on a printing area between a surface of a window and the platform of each cartridge. The 3D printing device 3710 emits a curing light through the transparent portion 3704 and window of the one or more cartridges to cure a layer of the printing material to the platform or to a previously cured layer of the printing material previously cured onto the platform of each cartridge, in order to build a 3D object inside each of the one or more cartridges.

3D printing device 3710 may include a user interface, such as UI 3706, which may include physical buttons to activate or otherwise initiate a printing process for an individual cartridge; similarly, UI 3706 may comprise indicators to facilitate use. In exemplary embodiments, a display or touch screen user interface, such as touch screen 3707 may be employed to enable user interaction with 3D printing device 3710.

In exemplary embodiments, each cartridge may be packaged separately or in batches of multiple cartridges. For example, FIG. 39 through FIG. 41 depict a container or packaging that may be sealed and adapted to hold three single-use or disposable cartridges therein, such as container assembly 3703.

Figure 42:
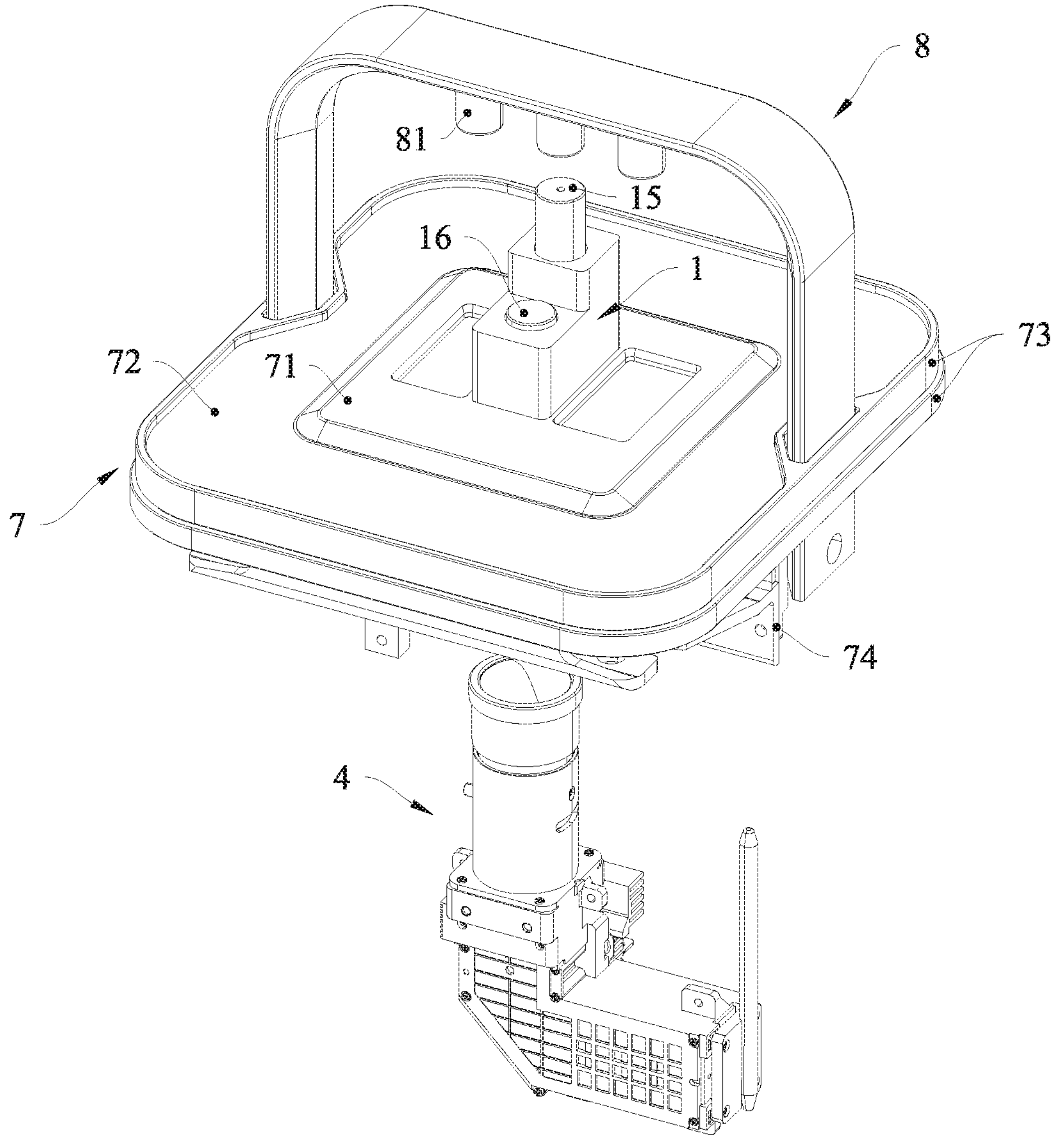
FIG. 42 illustrates a system in accordance with some exemplary embodiments of the present invention.
Figure 43:
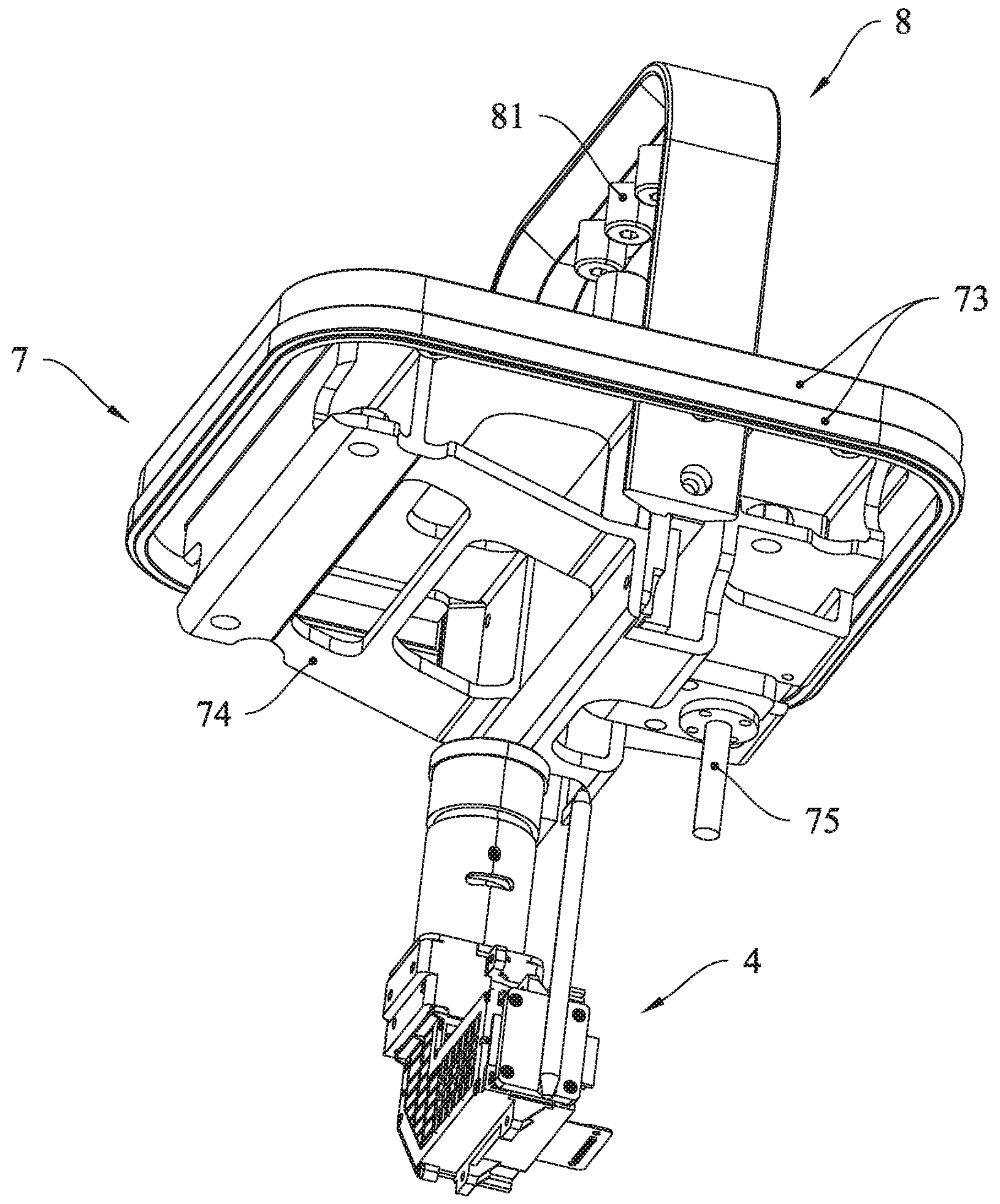
FIG. 43 illustrates a system in accordance with some exemplary embodiments of the present invention.

Turning now to the next set of figures: FIG. 42 displays an isometric side view of components of a 3D printer with a container assembly coupled thereto, in an exemplary embodiment; and FIG. 43 displays an isometric side view thereof from another perspective. As shown in FIGS. 42 and 43, a 3D printing system includes a container assembly 1, a light engine 4, a mounting base 7, and a hoop or arm 8. The mounting base 7 includes: a holding frame 71, which has several windows, configured to position the container assembly 1; a transparent substrate 72 configured to provide a flat plane, and support the holding frame 71 and the container assembly 1; a substrate frame 73, which includes a large opening to allow the light to pass through, as well as several edges to securely hold the transparent substrate 72 in place; a cradle chassis 74; a motor 75, which may be installed on the cradle chassis 74, configured to actuate the arm 8 in an upward or downward direction by several transmission mechanisms.

During a printing process, the curing light from light engine 4 passes through the windows/openings/paths of the cradle chassis 74, the substrate frame 73, the transparent substrate 72, and the holding frame 71 in turn, and finally form a pattern on the bottom of the container assembly 1.

The arm 8 includes several pistons 81; when arm 8 is actuated downwards, the pistons 81 apply pressure to the piston 15 of the container assembly 1, to transfer (i.e., and optionally continuously transfer) printing material from the stand-by chamber 12 to the printing chamber 13.

Figure 44:
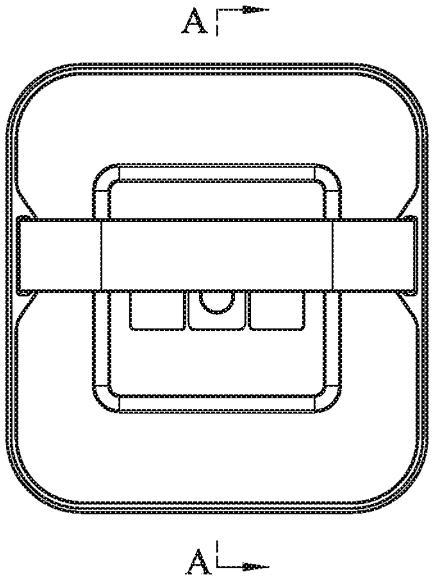
Figure 45:
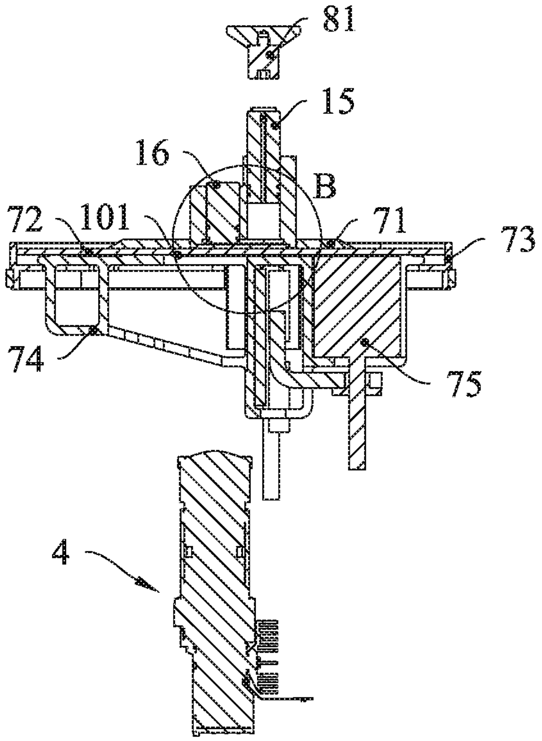
Figure 46:
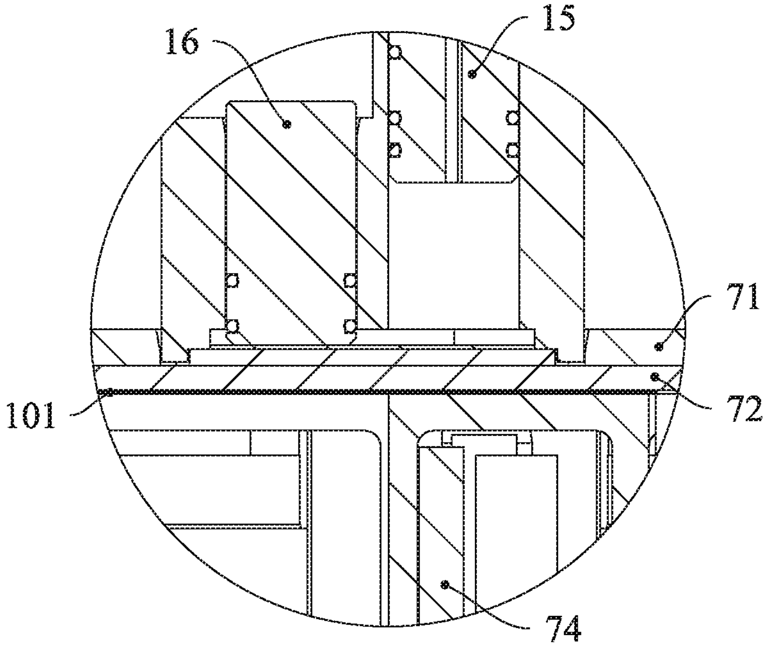

FIG. 44 displays a top view of the 3D printer, FIG. 45 displays a cross-sectional view along the A-A axis of FIG. 44, and FIG. 46 displays a close-up view of the area B shown in FIG. 45. As shown in FIG. 37 and FIG. 38, a housing such as housing 3701, may be adapted to house the controller, the motor, and light emitting module of the system.

As shown in FIGS. 45, and 46, the 3D printer further includes a transparent surface heater 101, the heater 101 is mounted the transparent substrate 72, and is tightly connected to it.

When an electric current is applied to the heater 101, it encounters resistance and heats up. The heat generated by the heater 101 is then transferred to the transparent substrate 72, which acts as a medium to distribute the heat evenly across its surface, and subsequently transfers the heat to the high-viscosity resin.

Figure 47:
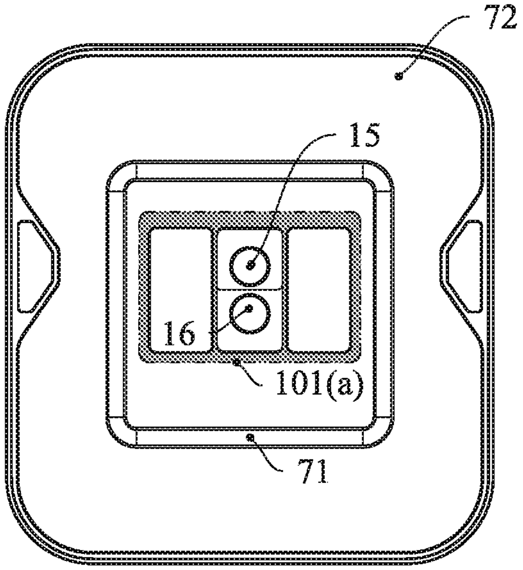

Preferably, the heater 101 may be selected as electrically conductive materials, particularly for example an Indium Tin Oxide (ITO) coating. FIG. 47 displays a top view of the work surface of the 3D printer in an exemplary embodiment, illustrating the arrangement of ITO coating 101(*a*), while FIG. 48 displays another arrangement.

Figure 48:
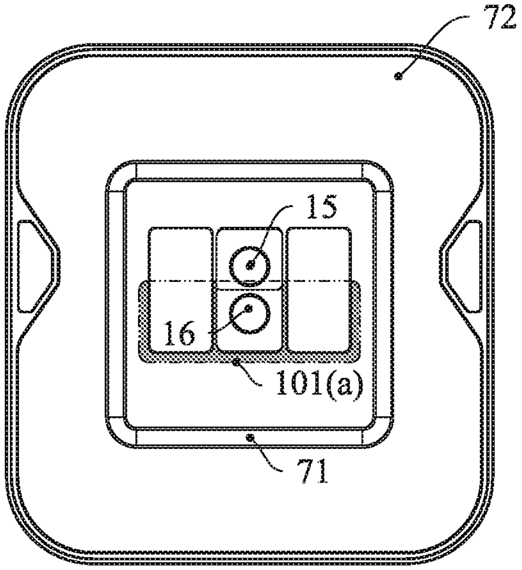

Since the ITO coating 101(*a*) allows curing light to pass through, it could be directly mounted beneath the transparent substrate 72, without any concern for the heater obstructing the light path. In the arrangement shown in FIG. 47, the ITO coating 101(*a*) at least covers the entire area of the all container assembly 1, so that the heated resin could be more smoothly transferred from the stand-by chambers 12 to the printing chambers 13; But in some cases, the ITO coating 101(*a*) may only cover the areas of the all printing chambers 13 and the channels 14, as shown in FIG. 48, which may not only reduce costs, but also be effective.

In addition, compared to other heating methods, the ITO coating 101(*a*) provides more stable and uniform heat to the resin contained into the container assembly. Preferably, the heater 101 may have built-in temperature sensors or thermostats to regulate the heat output, these controls ensure that the substance being heated remains within a desired temperature range. In some exemplary embodiments, the temperature range of the heater is 40° C.~60° ° C., preferably 48° C.~52° C.

Alternatively, in some exemplary embodiments, the ITO coatings maybe mounted above the transparent substrate 72, and the top surface of its directly contact with the bottom of the container assembly 1, this arrangement allows the heat to transfer to the hydraulic more efficient.

Figure 49:
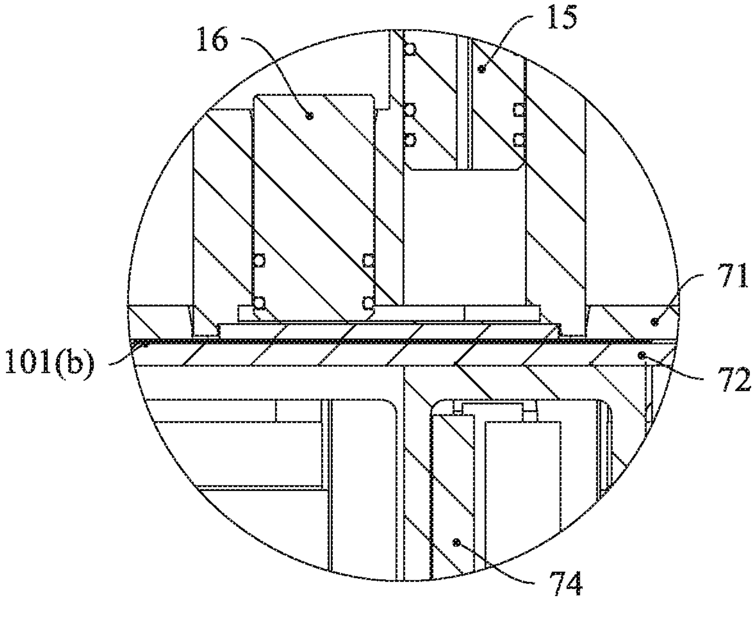
Figure 50:
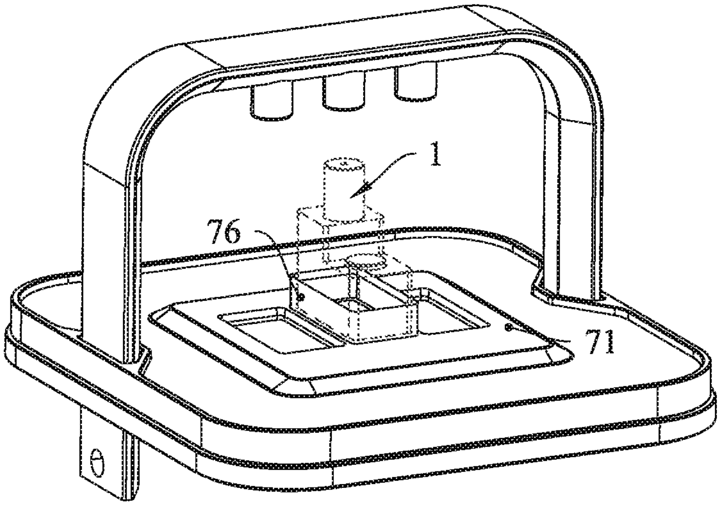

FIG. 49 displays a cross-sectional view of this arrangement in the above embodiment. FIG. 50 displays an isometric side view of 3D printer's work surface with an adapter 76 in an exemplary embodiment.

As shown in FIG. 50, the adapter 76 is connected to the holding frame 71, configured to provide a stable position for the container assembly 1, this configuration helps ensure that the container assembly 1 remains securely in place during printing process. It should be noticed that the adapter 76 may be a through structure, or may include a transparent bottom.

Figure 51:
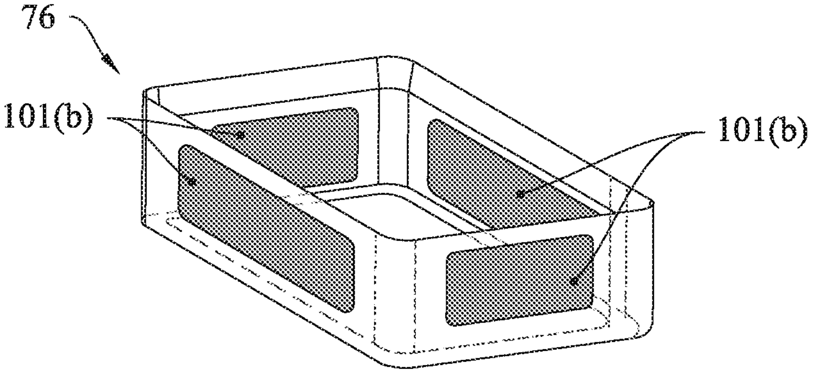
Figure 52:
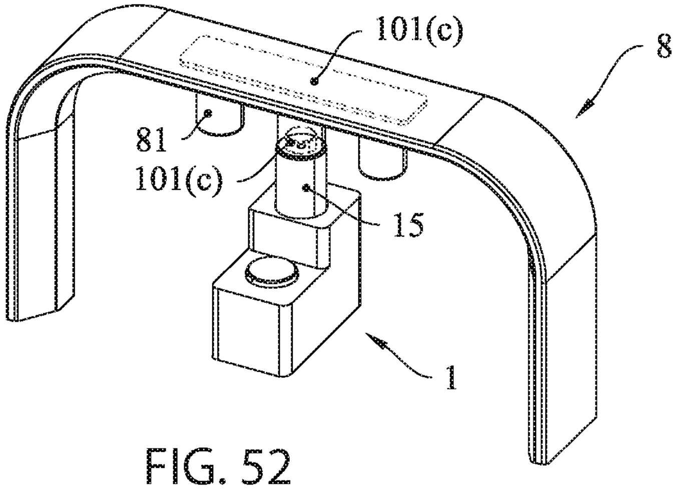

FIG. 51 displays the adapter 76 with several heaters 101(*b*). In addition, as shown in FIG. 52, the heaters 101(*b*) may be attached to the walls of the adapter 76, but there's no limitation on the number of the heaters 101(*b*) that may be utilized, and no limitation on whether the heaters 101(*b*) are transparent. The heaters 101(*b*) may include, but not limit to, any flexible heaters or any other type of surface contact heaters. If the adapter 76 includes a transparent bottom, the heater 101(*b*) may also be mounted on the bottom of the adapter 76, similarly, the bottom heater 101(*b*) should be transparent also, allowing the curing light to pass through. Alternatively, in some exemplary embodiments, the heater 101(*c*) may be integrated into the arm 8, or the hoop piston 81.

FIG. 52 displays a schematic diagram of the different arrangements of heaters 101(*c*) in an exemplary embodiment. In the printing process, there is a predetermined period of time that the hoop piston 81 will come into contact with the piston 15, and apply pressure to it. This makes it possible to transfer heat from the arm 8, or the hoop piston 81 to the high-viscosity resin through piston 15. In some cases, the arm 8 maybe actuated downward before the print starting, causing the hoop piston 81 to come into contact with the piston 15, and allowing heat the high-viscosity resin in a longer predetermined period. The heaters 101(*c*) may include, but not limit to, any flexible heaters, or any insertion heaters. Alternatively, in some exemplary embodiments, the heater 101(*c*) and its power connector may be integrated into the container assembly 1.

Figure 53:
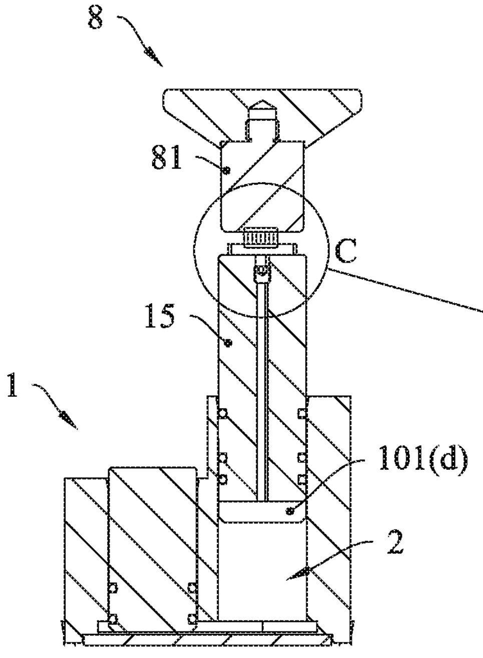
Figure 54:
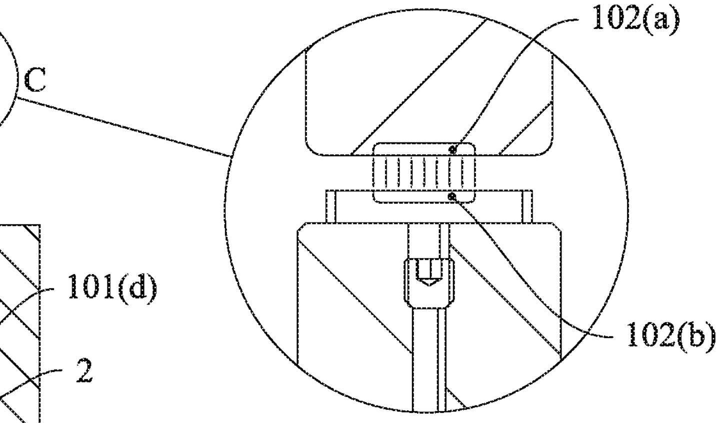
Figure 60:
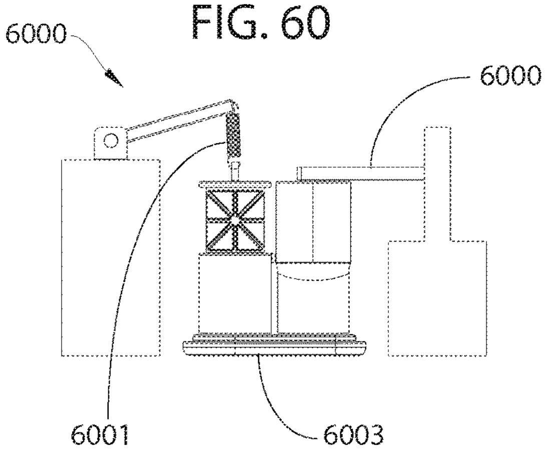
FIG. 60 through FIG. 64 illustrate a system in accordance with some exemplary embodiments of the present invention.
Figure 61:
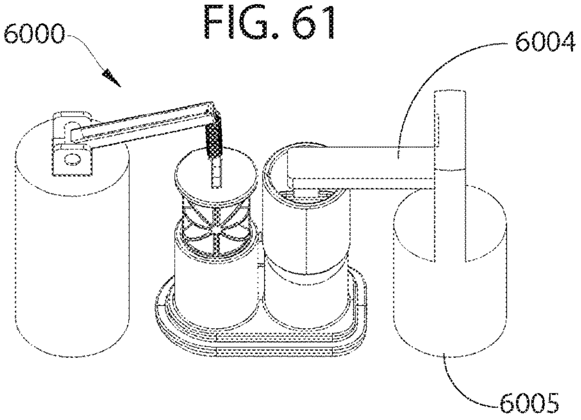
Figure 62:
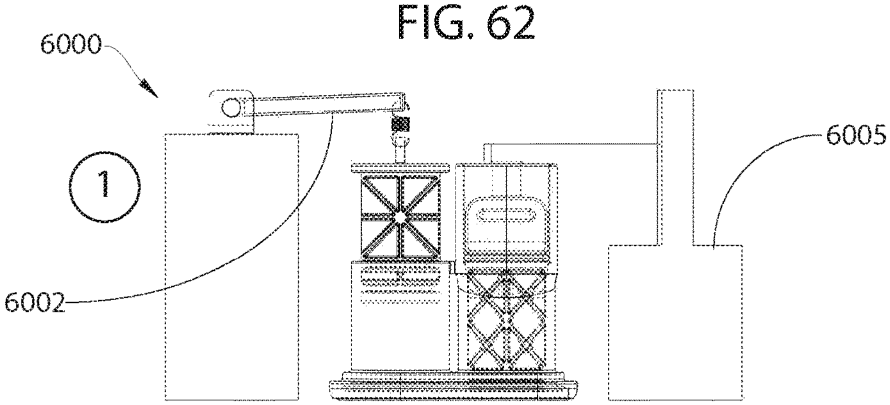
Figure 63:
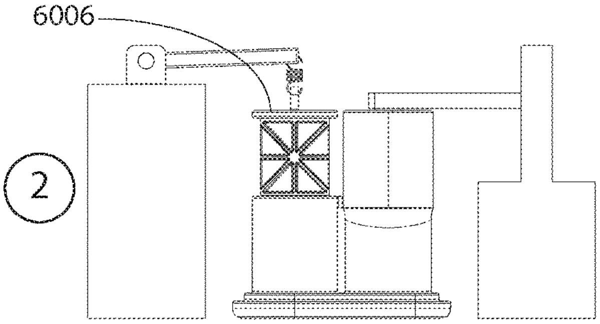
Figure 64:
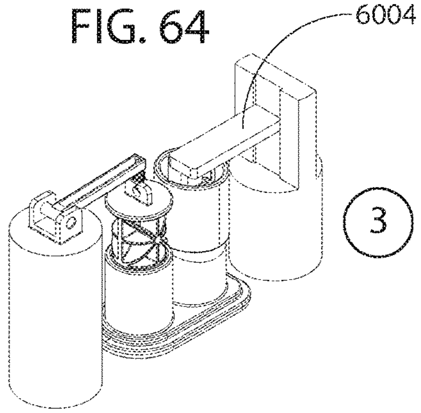
Figure 65:
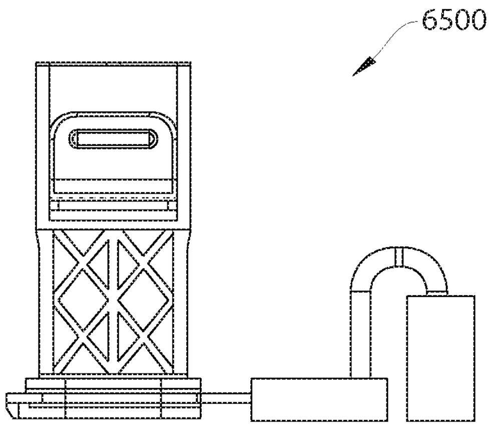
FIG. 65 through FIG. 68 illustrate a system in accordance with some exemplary embodiments of the present invention.
Figure 66:
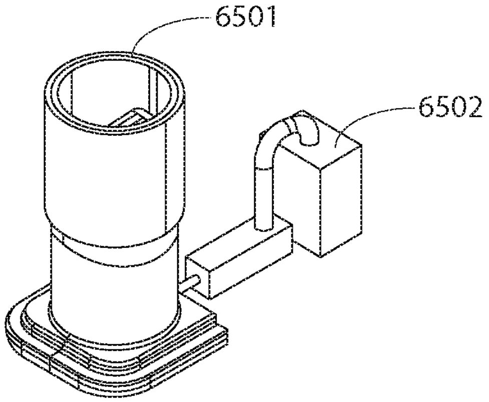
Figure 67:
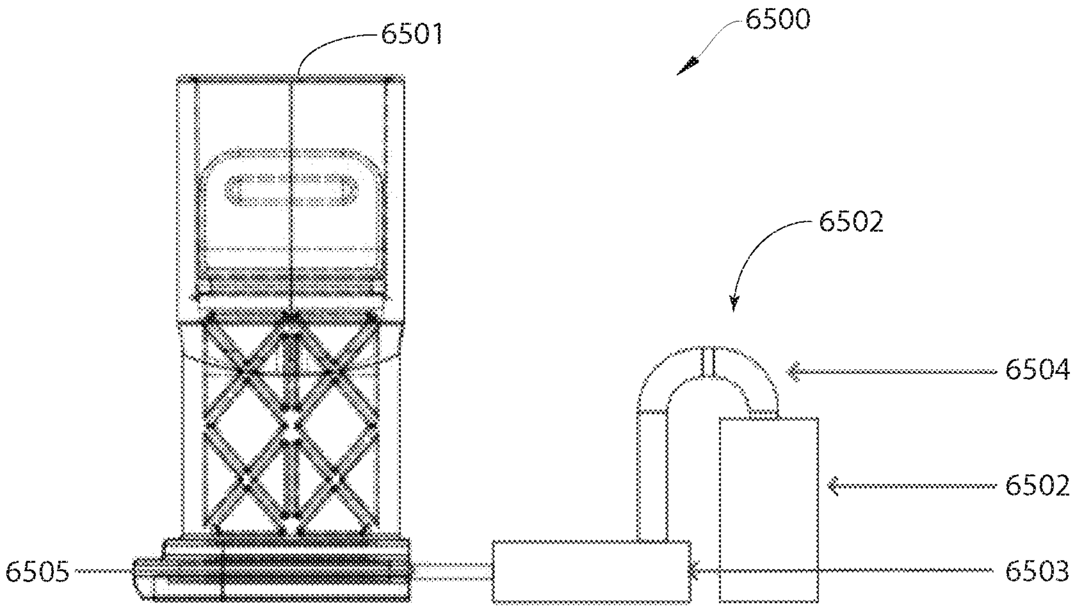
Figure 68:
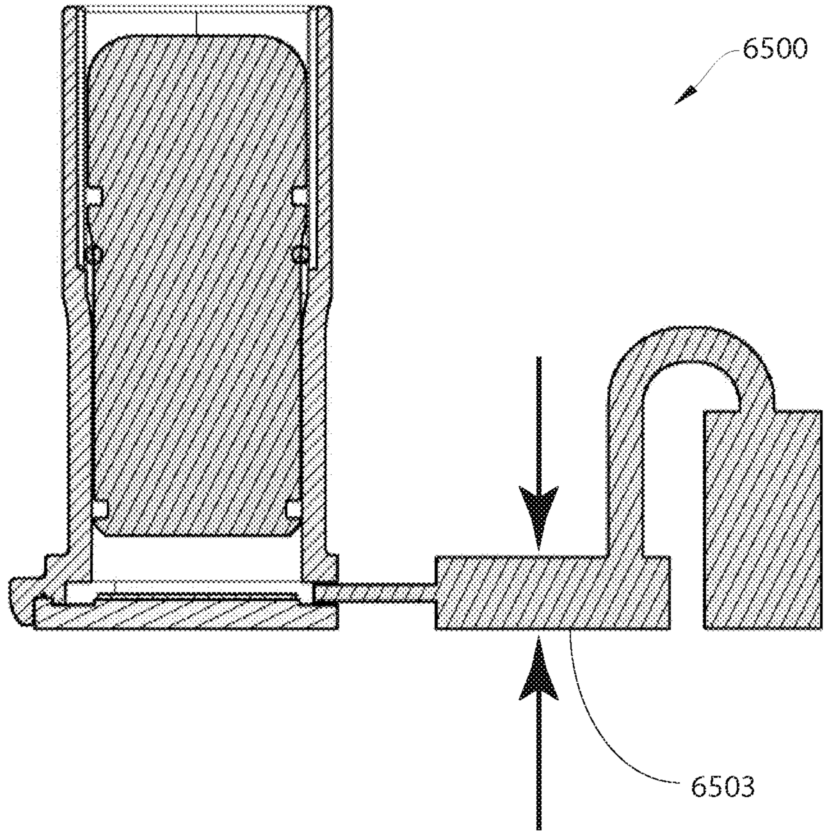

FIG. 53 and FIG. 54 display a cross-sectional view, and a close-up view, of another arrangement of the heater 101(*d*), which is integrated into the piston 15. In this exemplary embodiment, the heater 101(*d*) is located at the end near the high-viscosity resin 2, so that to transfer heat more efficiently. The piston 15, and the pistons 81 of the arm 8 may further include a power connector, allowing electrical current to be transmitted from piston 81 to the container assembly 1 via wired or wireless means. The above embodiment is for illustration purposes only, in fact, the output power connector 102(*a*) may be integrated into some other positions, for instance, the wall of the adapter 76, the top surface of the transparent substrate 72, or any other suitable positions. Similarly, the input power connector 102(*b*) is not limited to being integrated into the piston 15 of the container assembly 1 also. The heater 101(*d*) may include, but not limit to, any insertion heaters, flexible heaters, or any other type of surface contact heaters.

Alternatively, in some exemplary embodiment, if the heater 101(*e*) is opaque (non-transparent), then it cannot be mounted beneath the printing area to avoid interfering with the light path. However, it may still be possible to mount the heater 101(*e*) above/beneath the transparent substrate 72 out of printing area.

FIG. 55 displays a top view of the work surface of the 3D printer in an exemplary embodiment, illustrating the arrangement of the opaque heater 101(*e*). In the printing process, when the heat generated by the heater 101(*e*) will be transferred to the high-viscosity resin through the transparent substrate 72. Alternatively, in some exemplary, the heater 101 may be a contactless heater, mounted on the mounting base 7.

FIG. 56 illustrates a cross-sectional view and a close-up view of the container assembly 1 and the mounting base 7 in an exemplary embodiment, illustrating the arrangement of the contactless heater. In the exemplary embodiment as depicted in FIG. 56, the contactless heater may be a hot air blower that targets the container assembly 1. The hot air blower draws in ambient air from the surrounding inner space through an intake vent, creates airflow using fans 111, and propels the airflow 112 towards the transparent substrate 72 beneath the container assembly 1. The heat will be then transferred to the high-viscosity resin, which located in the container assembly 1. The contactless heater includes, but is not limited to, any air blowers, any infrared heater, or any indirect contact heaters. The placement of the contactless heater is not limited and can be positioned from the top, specifically targeting the container assembly 1 for hot air delivery.

The heating device may be used to heat up the precured resin contained in the container assembly, which enhances its flowability and improves the overall printing process. By improving the flowability of the resin, the print resolution is enhanced, print speed is increased, and the success rate of the printing process is raised. Therefore, the use of the heating device within the container assembly may enable more efficient and effective printing processes.

In the embodiment as depicted in FIGS. 42-46, or in any other embodiment in which the heat is conducted by a transparent substrate, the most challenge is substrate (e.g. glass) cracking during the heating process. The glass serves as a substrate piece under the container assembly, and we use it to conduct the heat through the container assembly to resin. The glass cracking depends on various factors, including the type and thickness of the glass, the temperature gradient applied, and the stress tolerance of the glass. The substrate glass is known for its poor thermal conductivity, which means it doesn't distribute heat evenly. When a localized area of the glass is heated while the surrounding areas remain cooler, thermal stress can build up within the glass. This stress can lead to cracks or even shattered glass.

To resolve this issue, several methods may be employed: A target temperature may be set to certain threshold to reduce the risk of cracking. A flexible heater and glass with similar thermal expansion coefficients may be utilized; mismatched coefficients can create additional stress points, increasing the likelihood of cracking. Further, by using gradual heating or the use of temperature control mechanisms, rapid and uneven temperature changes can be avoided in order to reduce stress on the glass. Moreover, a thicker glass may be used in order to increase resistance to cracking. Furthermore, an additional heating plate may be installed, which has a highly thermal conductive performance to dissipate or transfer the accumulated heat. In some exemplary embodiments, the 3D printer may employ a heating plate which has a highly thermal conductive performance to dissipate or transfer the heat to the container assembly.

Accordingly, a system for printing 3D objects in accordance with the present invention, may include: a controller; a container assembly adapted to hermetically store a printing material, including: an enclosure housing a first chamber adapted to store a printing material and a second chamber adapted to receive a platform; a channel within the enclosure connecting a side wall of the first chamber with a side wall of the second chamber so that the first chamber and the second chamber are in fluid communication; and a structure, movable within the first chamber adapted to transfer a portion of the printing material from the first chamber to a printing area between a surface of a window and the platform in the second chamber; a motor coupled to the controller and configured to move the structure; and a light emitting module, in communication with the controller, configured to emit a curing light through the window to cure at least a layer of the printing material to the platform or to a cured layer of the printing material on the platform, in order to build the 3D object on the platform.

In some exemplary embodiments, an arm may be coupled to the motor and adapted to press on the structure of the container assembly. A housing for the controller, the motor, and the light emitting module, may include, disposed on an exterior surface of the housing, a holding frame adapted to receive the container assembly. The housing may include one or more user interface devices, including but not limited to a touch screen interface disposed on an exterior of the housing.

In exemplary embodiments, the system may further include a heating module adapted to heat the printing material inside the container assembly. The heating module may include a transparent surface heater disposed over portion of the holding frame. The heating module may include a layer of an Indium Tin Oxide (ITO) coating. The heating module may include an adapter removably coupled to the holding frame, the adapter having heating elements disposed on walls of the adapter. The heating module may include a heating element disposed over the arm and adapted to transfer heat to the container assembly.

A system in accordance with the present invention may be said to be configured to introduce or inject additive manufacturing material to build a 3D object. For example, by introducing additive manufacturing material (i.e., 3D printing material) into a build chamber in accordance with the present invention, a method for replenishing additive manufacturing material may be facilitated; characterized by the process wherein said build material is introduced into the build chamber through the application of positive pressure. The build chamber may be hermetically sealed on a minimum of three sides, ensuring a controlled environment as discussed above. The fourth side of the build chamber may be designed for integration with the build material feeding path, facilitating a seamless and efficient transfer of the manufacturing material into the build chamber.

As mentioned above with reference to various figures throughout this disclosure, the second chamber adapted to receive the platform is a build chamber adapted to receive—via application of some pressure (for example, positive pressure)—building material that is introduced into the build chamber via a feeding path. Accordingly, many embodiments, adaptations, or configurations are possible. In these various embodiments, building of the 3D object in the build chamber is achieved through the application of pressure, such as a positive pressure, to facilitate the introduction of the build material into the build chamber where it is exposed to the curing light.

As such, a method for introducing additive manufacturing material to build a 3D object, in accordance with the present invention, may include the steps of: providing a build chamber that has a plurality of walls including a wall in common with a second chamber adapted to hold a building material, the plurality of walls sealed to ensure a controlled environment; and introducing the build material into the build chamber via a feeding path through the application of positive pressure to facilitate building of the 3D object in the build chamber.

One of the many advantages of the present invention, is that the controlled environment created by the hydraulic device—for example a hermetically sealed container assembly in accordance with the present invention—is that the build or printing process may be performed with the container assembly in any orientation; the container assembly may be positioned upside down, on a side, at an angle—without limitation—but the controlled environment therein will allow the build process to the achieved nonetheless. This facilitates various designs—for additive manufacturing systems and devices (i.e., 3D printers, etc.) that may be incorporated depending on the needs of the environment in which a device in accordance with the present invention is desirably used.

FIG. 58 through FIG. 59 illustrate different possible positions or orientations for a hydraulic device in accordance with the present invention to illustrate this benefit. The controlled environment in which the build material or 3D printing material is stored within the container assembly obviates the need for positioning the "tank" of the system in accordance with this invention in any particular orientation. Where traditional additive manufacturing systems, especially those using resins, may require a leveled orientation to avoid spills and allow for a layer to be accurately printed onto a platform, the present invention, by employing aa controlled environment within the container assembly, obviates that restriction.

In some exemplary embodiments, for example, a system 5800 for building 3D objects may include a holding frame 5802 adapted to hold a container assembly 5801 upside down as shown in FIG. 58. In some exemplary embodiments, a system 5900 for building 3D objects may include a holding frame 5902 adapted to hold a container assembly 5901 at an angle or on an angled position as shown in FIG. 59.

As may be appreciated from this disclosure, alternative configurations for practicing the present invention are possible. For example, and without limiting the scope of the present invention, FIG. 60 through FIG. 64 illustrate a system in which a spring device and a motor may be employed to facilitate movement of a container assembly.

In this embodiment, system 6000 is shown with a spring 6001 on an arm 6002 coupled to a structure 6006 (such as a piston or the like) of a container assembly 6003 in accordance with the present invention. Another arm 6004 coupled to a motor or actuator module 6005 may be coupled to a platform of the container assembly. In such system, the following method may be performed: at step (1) arm 6002 may be (automatically, mechanically, or manually) positioned so that spring 6001 may be in a "loaded" position; in step (2) the spring is loaded but notably, because the motor or actuator module 6005 has not been activated, arm 6004 prevents movement of structure 6006 (i.e., the hydraulic system within container assembly 6003 is a controlled system so that no movement (and hence transfer of a building material in the storage chamber cannot be effectuated); in step (3) motor or actuator module 6005 may be deployed so that enough movement of arm 6004 along a z-axis is facilitated, hence allowing the loaded spring 6001 to apply a positive pressure and transfer or introduce build material into the build chamber of container assembly 6003. Notably, as with other embodiments described in this disclosure, a z-axis along the build platform is passive since it is the positive pressure applied to introduce or transfer the build material into the build chamber that moves the platform.

FIG. 65 through FIG. 68 illustrate another system in accordance with some exemplary embodiments of the present invention. In this system 6500, a build chamber may be coupled to a build material source (such as a pressurized container, or container with a controlled environment including for example, and without limiting the scope of the present invention, a squeezable container.

As such, in the embodiment shown in these figures, a single cavity cartridge or container assembly 6501 may be employed. In some embodiments of this configuration, a resin liquid may be compressed by a liquid actuating system 6502, can be pump, air compressor, etc. A resin container 6503 may include a tube 6504 coupled to the liquid actuating system 6502; the liquid resin may be introduced into the build chamber through an injector 6505. In some embodiments, as shown in the cross-sectional view of FIG. 68, the container 6503 may be squeezable, and liquid actuating system 6502 may simply squeeze container 6503 in order to inject or otherwise introduce the build material into the single cavity or chamber of container assembly 6501.

Figure 69:
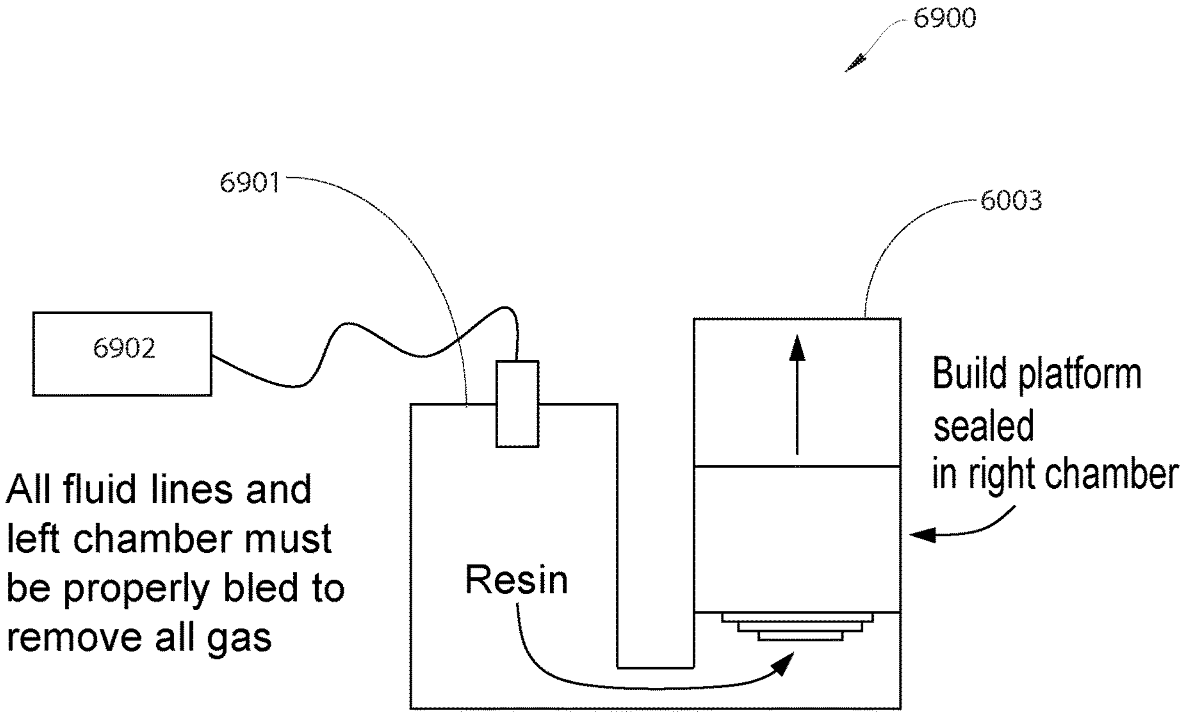
FIG. 69 illustrates a system in accordance with some exemplary embodiments of the present invention.

FIG. 69 illustrates a system in accordance with some exemplary embodiments of the present invention. In this embodiment, a system 6900 includes a storage chamber 6901 in which a structure such as a piston may be replaced with a non-piston-based precision hydraulic pump 6902 (e.g., external/internal gear pump, rotary vane pump, gerotor pump, screw pump, etc.). The precision hydraulic pump 6902 may be configured to control pressure in storage chamber 6903 to hydraulically actuate the build platform in the build chamber.

Figure 70:
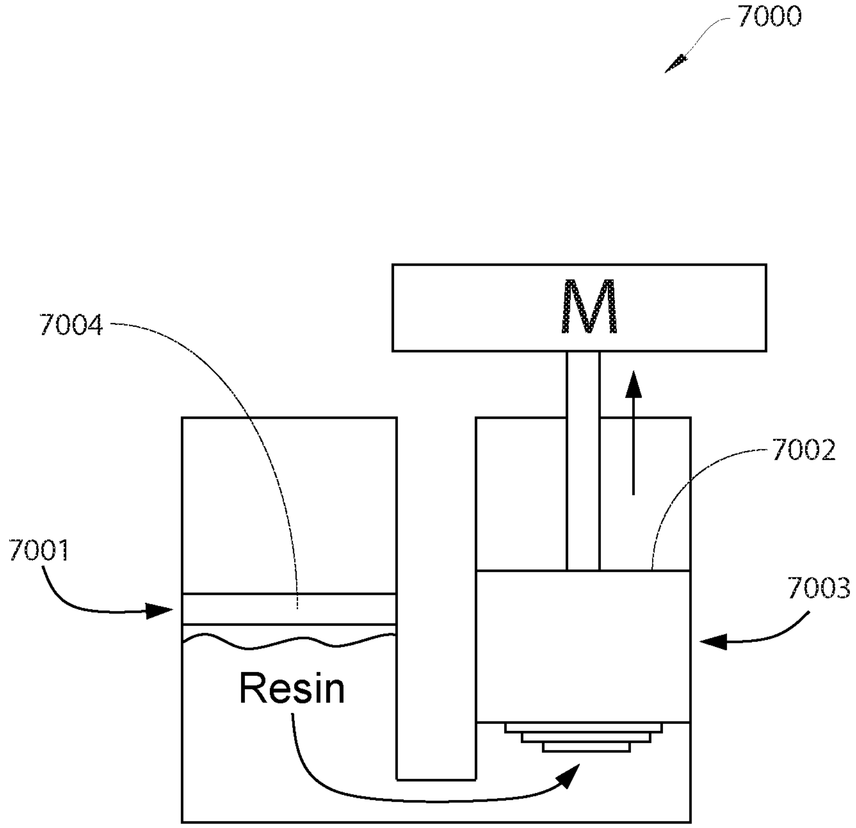
FIG. 70 illustrates a system in accordance with some exemplary embodiments of the present invention.

FIG. 70 illustrates a system in accordance with some exemplary embodiments of the present invention. In this embodiment, a system 7000 includes a storage chamber 7001 in which a structure such as a piston may be eliminated; movably seal the build platform 7002 in the build chamber 7003 so that it acts as a hydraulic piston, and incrementally lift the build platform upward (with a motor M, for example) to hydraulically draw resin from the left chamber into the right chamber layer-by-layer. This variation may include, without limiting the scope of the present invention, a follower seal 7004 in the storage chamber that follows the top level of the resin to keep it from exposure to air.

As may be appreciated, many embodiments, adaptations, or configurations are possible. In the various embodiments, building of the 3D object in the build chamber is achieved through the application of pressure, such as a positive pressure, to facilitate the introduction of the build material into the build chamber where it is exposed to the curing light. The structures employed are adapted to ensure a sealed, controlled environment, that both protects the efficacy of the building material prior to use, as well as facilitate the design of the additive manufacturing system.

A hydraulic 3D-printing system and method has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A container assembly for printing a three-dimensional (3D) object, comprising:

an enclosure housing a first chamber adapted to store a printing material and a second chamber adapted to receive a platform;

a channel within the enclosure connecting a side wall of the first chamber with a side wall of the second chamber so that the first chamber and the second chamber are in fluid communication; and a structure, movable within the first chamber adapted to hydraulically move the platform in the second chamber and transfer a portion of the printing material from the first chamber to a printing area between a surface of a window and the platform in the second chamber for receiving a curing light for curing a layer of the printing material onto the platform or onto a cured layer of the printing material on the platform, in order to build the 3D object on the platform.

2. The container assembly of claim 1, wherein the second chamber is adapted to limit or prevent a rotation of the platform.

3. The container assembly of claim 1, wherein the second chamber is a non-cylindrical chamber.

4. The container assembly of claim 1, wherein the second chamber includes a circular cross-section extending a first length along an axis of the second chamber, and a non-circular cross-section extending a second length along the axis of the second chamber.

5. The container assembly of claim 4, wherein the platform includes a cylindrical portion adapted to register with the circular cross-section extending the first length along the axis of the second chamber.

6. The container assembly of claim 4, wherein the platform includes a seal adapted to hermetically seal the circular cross-section extending the first length along the axis of the second chamber.

7. The container assembly of claim 4, wherein the second chamber includes one or more structures along one or more side walls adapted to alleviate a negative pressure during a movement of the platform.

8. The container assembly of claim 7, wherein the one or more structures includes a negative pressure cavity or air vents along the one or more side walls of the second chamber.

9. The container assembly of claim 1, further comprising a handle portion coupled to the platform for removing the platform from the second chamber to facilitate removal of the 3D object built onto the platform.

10. The container assembly of claim 1, wherein the enclosure is adapted to receive heat from a heat source external to the container assembly.

11. A system for printing three-dimensional objects, comprising:

a controller;

a container assembly adapted to hermetically store a printing material, including:

an enclosure housing a first chamber adapted to store a printing material and a second chamber adapted to receive a platform;

a channel within the enclosure connecting a side wall of the first chamber with a side wall of the second chamber so that the first chamber and the second chamber are in fluid communication; and a structure, movable within the first chamber adapted to hydraulically move the platform in the second chamber and transfer a portion of the printing material from the first chamber to a printing area between a surface of a window and the platform;

a motor coupled to the controller and configured to move the structure; and a light emitting module, in communication with the controller, configured to emit a curing light through the window to cure at least a layer of the printing material to the platform or to a cured layer of the printing material on the platform, in order to build the 3D object on the platform.

12. The system of claim 11, further comprising an arm coupled to the motor and adapted to press on the structure of the container assembly.

13. The system of claim 12, further comprising a housing for the controller, the motor, and the light emitting module, an exterior surface of the housing including a holding frame adapted to receive the container assembly.

14. The system of claim 13, further comprising a touch screen interface disposed on an exterior of the housing.

15. The system of claim 13, further comprising a heating module adapted to heat the printing material inside the container assembly.

16. The system of claim 15, wherein the heating module comprises a transparent surface heater disposed over portion of the holding frame.

17. The system of claim 15, wherein the heating module includes a layer of an Indium Tin Oxide (ITO) coating.

18. The system of claim 15, wherein the heating module comprises an adapter removably coupled to the holding frame, the adapter having heating elements disposed on walls of the adapter.

19. The system of claim 15, wherein the heating module comprises a heating element disposed over the arm.

20. A container assembly for printing a three-dimensional (3D) object, comprising:

a single-use enclosure housing a first chamber adapted to hermetically store a printing material and a second chamber adapted to receive a platform, wherein the second chamber is adapted to limit or prevent a rotation of the platform;

a channel within the single-use enclosure connecting a side wall of the first chamber with a side wall of the second chamber so that the first chamber and the second chamber are in fluid communication; and a structure, movable within the first chamber adapted to hydraulically move a platform in the second chamber and transfer a portion of the printing material from the first chamber to a printing area between a surface of a window and the platform in the second chamber for receiving a curing light for curing a layer of the printing material onto the platform or onto a cured layer of the printing material on the platform, in order to build the 3D object on the platform.

* * * * *